United States Patent
Crayford et al.

(10) Patent No.: US 9,800,429 B2
(45) Date of Patent: Oct. 24, 2017

(54) ADAPTIVE HOME AND COMMERCIAL AUTOMATION DEVICES, METHODS AND SYSTEMS BASED ON THE PROXIMITY OF CONTROLLING ELEMENTS

(71) Applicant: Smartbotics Inc., Los Gatos, CA (US)

(72) Inventors: Ian Crayford, Saratoga, CA (US); Kelly Coffey, Los Gatos, CA (US); Speros Koulouras, Los Gatos, CA (US)

(73) Assignee: SMARTBOTICS INC., Los Gatos, CA (US)

( * ) Notice: Subject to any disclaimer, the term of this patent is extended or adjusted under 35 U.S.C. 154(b) by 492 days.

(21) Appl. No.: 14/214,158

(22) Filed: Mar. 14, 2014

(65) Prior Publication Data

US 2015/0120000 A1    Apr. 30, 2015

Related U.S. Application Data

(60) Provisional application No. 61/799,522, filed on Mar. 15, 2013.

(51) Int. Cl.

| | |
|---|---|
| *G06Q 30/00* | (2012.01) |
| *H04L 12/28* | (2006.01) |
| *G05B 15/02* | (2006.01) |
| *H04L 29/08* | (2006.01) |
| *H04L 12/64* | (2006.01) |
| *H04W 4/00* | (2009.01) |
| *H04W 4/02* | (2009.01) |
| *H04W 12/04* | (2009.01) |
| *H04W 84/18* | (2009.01) |

(52) U.S. Cl.
CPC .......... *H04L 12/2803* (2013.01); *G05B 15/02* (2013.01); *H04L 12/6418* (2013.01); *H04L 67/10* (2013.01); *H04W 4/008* (2013.01); *H04W 4/023* (2013.01); *H04W 12/04* (2013.01); *H04W 84/18* (2013.01)

(58) Field of Classification Search
CPC .......... G06Q 30/0241; G06Q 30/0261; G06Q 30/0269; H04L 67/025
USPC ................................ 705/14.4; 340/551, 552
See application file for complete search history.

(56) References Cited

U.S. PATENT DOCUMENTS

| | | |
|---|---|---|
| 6,529,128 B2 | 3/2003 | Weng |
| 7,866,838 B2 | 1/2011 | Wang et al. |

(Continued)

OTHER PUBLICATIONS

Hill, Joshua S., "RoboSmart Bluetooth Smart Wireless LED Light Bulb," Clean Technica, Smart Home Labs Press Release dated Dec. 27, 2012. Retrieved from https://cleantechnica.com/2012/12/27/robosmart-bluetooth-smart-wireless-led-light-bulb/; 7 pages.

(Continued)

*Primary Examiner* — Thuy Vinh Tran
(74) *Attorney, Agent, or Firm* — Dentons US LLP; Peter Su

(57) ABSTRACT

A LED based illumination source with integrated communications and processing functions, which can communicate via wireless communications to a mobile phone, smart phone, smart pad, notebook, tablet, desktop or other computing device. The LED based illumination source is programmed to operate autonomously, and is able to alter its behavior, based on the proximity of a controlling element. The communications and processing functions can also be integrated into other household and commercial electrical devices, such as wall outlets, light switches, plug in timers, appliances, and the like.

21 Claims, 33 Drawing Sheets

(56) References Cited

U.S. PATENT DOCUMENTS

| | | | |
|---|---|---|---|
| 8,531,319 B2* | 9/2013 | Ku | G06F 1/1624 340/407.2 |
| 8,725,113 B2* | 5/2014 | Gargi | H04M 1/67 380/247 |
| 9,400,985 B2* | 7/2016 | Dobyns | G06Q 30/0234 |
| 2006/0268746 A1 | 11/2006 | Wijting et al. | |
| 2007/0242643 A1 | 10/2007 | Chandra et al. | |
| 2008/0092800 A1 | 4/2008 | Smith | |
| 2009/0059603 A1 | 3/2009 | Recker et al. | |
| 2010/0327766 A1 | 12/2010 | Recker | |
| 2012/0098439 A1 | 4/2012 | Recker et al. | |
| 2016/0239874 A1* | 8/2016 | Avalos | G06Q 30/0255 |

OTHER PUBLICATIONS

Morelli, Bill, "Internet Connected Devices: Evolving from the "Internet of Things" to the "Internet of Everything,"" IHS, SEMI Texas Fall Outlook, presentation dated Oct. 30, 2013; 13 pages.

Gomez, Carles et al., "Overview and Evaluation of Bluetooth Low Energy: An Emerging Low-Power Wireless Technology," Sensors 2012, 12, published Aug. 29, 2012, ISSN 1424-8220, pp. 11734-11753; 20 pages.

Decuir, Joe, "Changing the Way the World Connects: Bluetooth 4.0: Low Energy," CSR 2010 presentation; 62 pages.

Smith, Phill. "Comparisons Between Low Power Wireless Technologies: Bluetooth low energy, ANT, ANT+, RF4CE, ZigBee, Wi-Fi, Nike+, IrDA and NFC," Issued May 24, 2011; 29 pages.

Hesse, Gavin, "Building Blocks of Intelligent Lighting Design Help Create Successful LED Products," LEDs Magazine Editorial Digest, Lighting Networks and Controls, and Intelligent LED Drivers, Jul./Aug. 2011 Issue; 24 pages.

McKinsey & Company, Inc., "Lighting the Way: Perspective on the Global Lighting Market," Second Edition, Issued Aug. 2012, Design by Visual Media Europe; 58 pages.

"Getting Started with iBeacon Version 1.0." Jun. 2, 2014. Retrieved from https://developer.apple.com/ibeacon/Getting-Started-with-iBeacon.pdf; 11 pages.

"Cisco iBeacon—Frequently Asked Questions." 2014. Retrieved from http://www.cisco.com/c/dam/en/us/solutions/collateral/enterprise-networks/connected-mobile-experiences/ibeacon_faq.pdf; 13 pages.

* cited by examiner

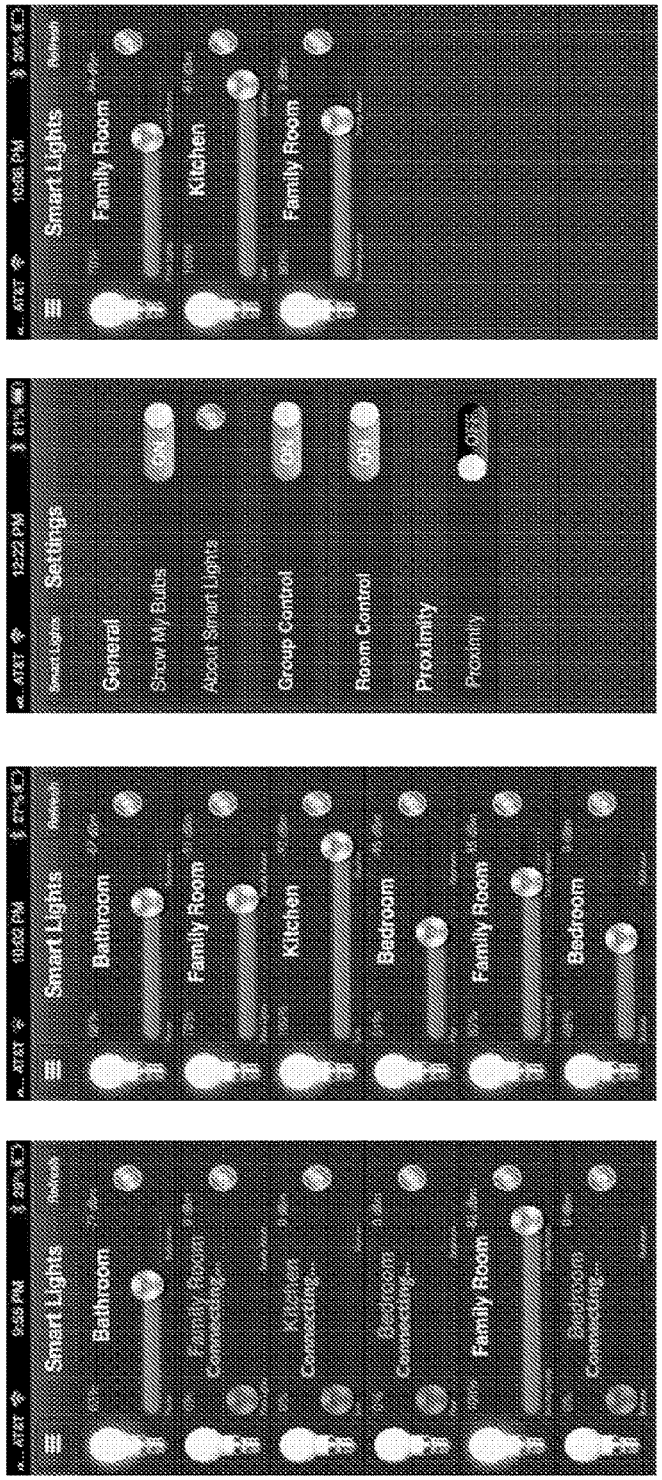
FIG. 5 – Screen Shots of 1st Generation App

LIGHT NAME 1

LIGHT NAME 2

GROUP SETTINGS

EXIT

ADAPTIVE HOME AND COMMERCIAL AUTOMATION DEVICES, METHODS AND SYSTEMS BASED ON THE PROXIMITY OF CONTROLLING ELEMENTS

CROSS REFERENCE TO RELATED APPLICATIONS

This application claims priority to U.S. Provisional Application Ser. No. 61/799,522 entitled "Adaptive Home and Commercial Automation Devices, Methods and Systems Based on the Proximity of Controlling Elements," filed on 15 Mar. 2013, the disclosure of which is incorporated herein by reference in its entirety. This application is also related to U.S. Non-Provisional Application No. 14/210,018 entitled "LED Light Bulb Construction and Manufacture," filed on 13 Mar. 2014, now U.S. Pat. No. 9,644,799 issued on 9 May 2017, which claims priority to U.S. Provisional Application Ser. No. 61/779,586, filed on 13 Mar. 2013.

TECHNICAL FIELD

This disclosure relates generally to intelligent household and commercial electrical products, such as wireless LED light bulbs, incorporating computational processing, and wireless communications technology. More particularly, the present disclosure describes a system and method to allow commercial and/or residential electrical devices and systems, to be directly or indirectly controlled by a mass market computational device capable of wireless communication.

BACKGROUND

Residential and commercial electrical systems have been in existence for many decades. Little has changed in the operation, installation, and expectations of such systems.

Home automation systems have also been available for many years. Such systems may be programmed to allow household devices to be turned on or off at predetermined times, regardless of whether the premise is occupied; allow lights to be controlled from a central location in the premises, or multiple locations; or allow control of devices and/or lighting via a remote connection such as via a cellular modem or Internet connection. However, all of these systems suffer significant disadvantages, including expensive proprietary hardware and software, complicated setup and maintenance such as (Wi-Fi or Ethernet) network administration, lack of interoperable standards, dissimilar user interfaces, and monthly fees for subscription services. Many of these systems are primary focused on other capabilities, such as security/alarm monitoring, surveillance systems, Internet service, etc., and home automation is an augmentation to this. Regardless, these systems do not address a fundamental change in the way electrical fixtures and appliances are controlled.

Typical home automation systems require expensive, dedicated, proprietary user interfaces (UIs) and/or additional hardware, such as touch screens, remote control devices, switch plates, etc., to be installed in the home. Such systems are generally expensive and complex, and are therefore restricted to high end homes, or early adopter users. Further, once the equipment is installed, especially in the case of the user interface, adopting new, lower cost technology as it becomes available is highly problematic. The disclosed embodiment uses a standard smart phone, tablet, laptop, or desktop computer as the UI, and utilizes the native communications protocols embedded in such devices.

While home automation was previous a convenience only considered in high end properties, or early technology adopters, rising utility costs are moving the focus to energy saving as a true financial benefit. Operators of commercial and industrial properties in particular, are extremely conscious of the cost of utilities to operate their buildings.

Commercial building control systems are also high capital cost items, and require dedicated personnel to operate and maintain them. Arguably, while the building utilities are managed, such as heating and ventilation, this is not always perceived to be to the benefit or comfort of the individual in the location.

This disclosure identifies a fundamentally new approach to home automation. While this disclosure references residential light bulbs as one embodiment, this same technology is equally applicable to a wide range of residential and industrial products, either as an add-on, external function, or integrated within the product itself. The light bulb embodiment is used to exemplify the fact that this technology can be integrated extremely cost effectively, and add enormous user benefits such as convenience, energy savings, and security.

The simple light bulb exemplifies the technology transformation in devices previously assumed to be passive, throw away devices. If a simple light bulb can be made intelligent, accessible from a hand held device via a free smart phone App, able to meet the rigorous engineering challenges of miniaturization, and able to operate in a hostile heat environment; while simultaneously meeting consumer expectations for low cost and long lifetime, then this technology is clearly applicable to other, less hostile, long-life, cost sensitive applications.

Within the past 5 years, semiconductor light emitting diode (LED) based lights have moved from novelty to mainstream. While LED bulbs are currently more expensive than incandescent or CFL bulbs, they have much longer operating lifetimes. LED bulbs have typical operational lifetimes of 30,000 hours or more, compared with CFLs at around 8,000 hours, and incandescent light bulbs at around 1,000 hours.

Bluetooth wireless technology is well understood as a communications system to connect cellular/mobile phones to external devices such as headsets, speakers, and hands-free in-car systems. Bluetooth Low Energy (BLE), also referred to as Bluetooth Smart and/or Bluetooth 4.0, is a version of the Bluetooth wireless technology that is specifically optimized for very low power consumption and short, bursty message traffic, typical of control data network communications. Advances in semiconductor technology have driven down the cost of BLE interfaces, and these are now commonly available as a native communications function in mainstream computer and communications platforms.

The incremental cost of adding integrated intelligence and communications such as Bluetooth Low Energy, to an LED light bulb, is modest and can be amortized over a much longer lifespan, not possible in short lifetime/cheap incandescent and CFL bulbs.

The creation of an intelligent wireless LED light bulb (referred to herein as a "smart bulb") is disclosed as a non-limiting example. The smart bulb can be individually addressed, controlled, and monitored wirelessly, from a simple mainstream communications device, such as a cellular or mobile smart phone, tablet, laptop, or desktop computer. The mechanical construction of such a device is disclosed by example, in U.S. Provisional Patent Application Ser. No. 61/779,586, entitled "LED Light Bulb Construction and Manufacture", and U.S. Non-Provisional patent application Ser. No. 14/210,018, entitled LED Light Bulb Construction and Manufacture, now U.S. Pat. No. 9,644,799.

Further, the use of multiple low-cost and high volume standardized mobile platforms, allows simple software applications ("Apps") to be developed, to control these individually addressable light bulbs, using common and intuitive user interfaces.

While wireless controlled automation devices and systems have been disclosed previously, these do not teach the use of detecting the received signal strength of the controlling device, to determine the presence, absence, or relative location of said controlling device, and adapting the response of the automation device or system accordingly.

These limitations are solved by the present invention in the manner described below.

SUMMARY OF THE DISCLOSURE

The present subject matter is generally directed to system hardware, software, firmware and user interface techniques, to wirelessly communicate with, and control, a low cost, household or commercial electrical device, such as an LED light bulb. Such an LED light bulb encompasses communications and intelligence functions, to produce an LED smart bulb. Such an LED smart bulb, as disclosed, is capable of supplanting standard incandescent, CFL, or standard LED bulbs, with minimal additional cost, but with substantial feature and user benefits.

The LED smart bulb takes advantage of the presence of integrated communications within mobile/cellular handsets, as well as other mobile (such as notebook, tablet, and laptop) and desktop computing devices. Such devices include native wireless communications capabilities such as 802.11/Wi-Fi, Bluetooth, Bluetooth Low Energy (BLE), Near Field Communications (NFC), and other wireless technologies to provide local (close physical/geographic distance) communications, typically within a 100 m radius.

In one embodiment, the LED smart bulb integrates a microprocessor with Bluetooth wireless networking technology (referred to alternatively as Bluetooth 4.0, Bluetooth Smart, and/or Bluetooth Low Energy (BLE)). Firmware executed on the microprocessor enables the LED smart bulb to make decisions on lighting control autonomously.

In another embodiment, the user is able to utilize a conventional mainstream computing and communications platform, such as a cellular or mobile smart phone, tablet, laptop, or desktop computer, running a software application, to program and control the LED smart bulb. Further, the ubiquitous acceptance of smart phones and tablets, allows simple software applications ("Apps") to be developed, to control these individually addressable smart bulbs, using common and intuitive user interfaces.

In another embodiment, the smart bulb augments fixed placement light switches and the like, conventionally used to control residential and commercial lighting devices, with the mobile communications device running an appropriate App, and based on the presence/absence of the mobile device and integrated App.

In another embodiment, the presence of the mobile/app device overrides the default operation of the lighting devices, dependent on multiple factors, such as proximity, priority (access authority/security), time of day, external conditions (day/night), etc.

In yet another embodiment, behavior of the lighting system is fundamentally changed by the proximity, location, preferences, and permissions associated with the mobile device and its App.

In another embodiment, the same capabilities of existing home automation systems can be executed (turn lights on/off via internet, monitor condition of devices remotely). In addition, the fundamental behavior of the home automation system can be customized to behave differently based on the presence of the mobile/app device(s), and its dynamically changing location. Each smart bulb (or appliance) in the premise/location can be programmed to behaves independently, based a combination of its in built intelligence, and the location of mobile/app devices in the premise.

In another embodiment, the automation system interfaces with another network system, such as an Ethernet and/or Wi-Fi network, to provide increased range and/or Internet connectivity.

In another embodiment, the smart bulbs or devices incorporate a parallel wired path as well as a wireless connectivity path, such as Ethernet over powerline.

In a further embodiment, using a software application, a user can assign a name to an individual bulb, assign its physical location name, assign multiple smart bulbs into a single group, assign a room name, make access to the smart bulb "private", assign different users different access levels, write capabilities to the smart bulb to be executed routinely, and many other functions.

In a further embodiment, using a software application, a user can configure their lighting or home automation system using simple "drag and drop" menus, move devices into a room or group location, assign behavior based on the presence or absence of users (or their mobile devices), and assign behavior to the premise in their absence.

In yet another embodiment, users are presented menus to manage the most relevant devices in the premise, based on their location within the premise.

In another embodiment, the user of a mobile communication device within a certain distance from a business or service can have specific targeted data directed to their mobile device, based on the user's preferences to receive such data, and their presence, and/or location in, or distance from, a specific premise.

In yet another embodiment, the user of a mobile/app or keyfob device can control the local lighting surrounding the user, in a commercial office building, warehouse, data center or the like. The user's location/proximity to the lighting fixtures throughout the location will allow either the users own lighting preference, or a pre-assigned lighting preference, dependent on security and access control levels. Further, in the event on an emergency situation, it is possible to locate the user, by using a differentiated illuminated path or route, to assist emergency personal to locate a specific user in a large building or campus environment.

The specification discloses a system and method to wirelessly communicate with, control, and monitor multiple LED light bulbs, light fixtures, or other electrical devices, using a conventional computing platform running a software application.

BRIEF DESCRIPTION OF DRAWINGS

FIG. 22A through FIG. 22C are views of the User Manual for the RoboSmart Lighting System.

DETAILED DESCRIPTION

Figure 1:
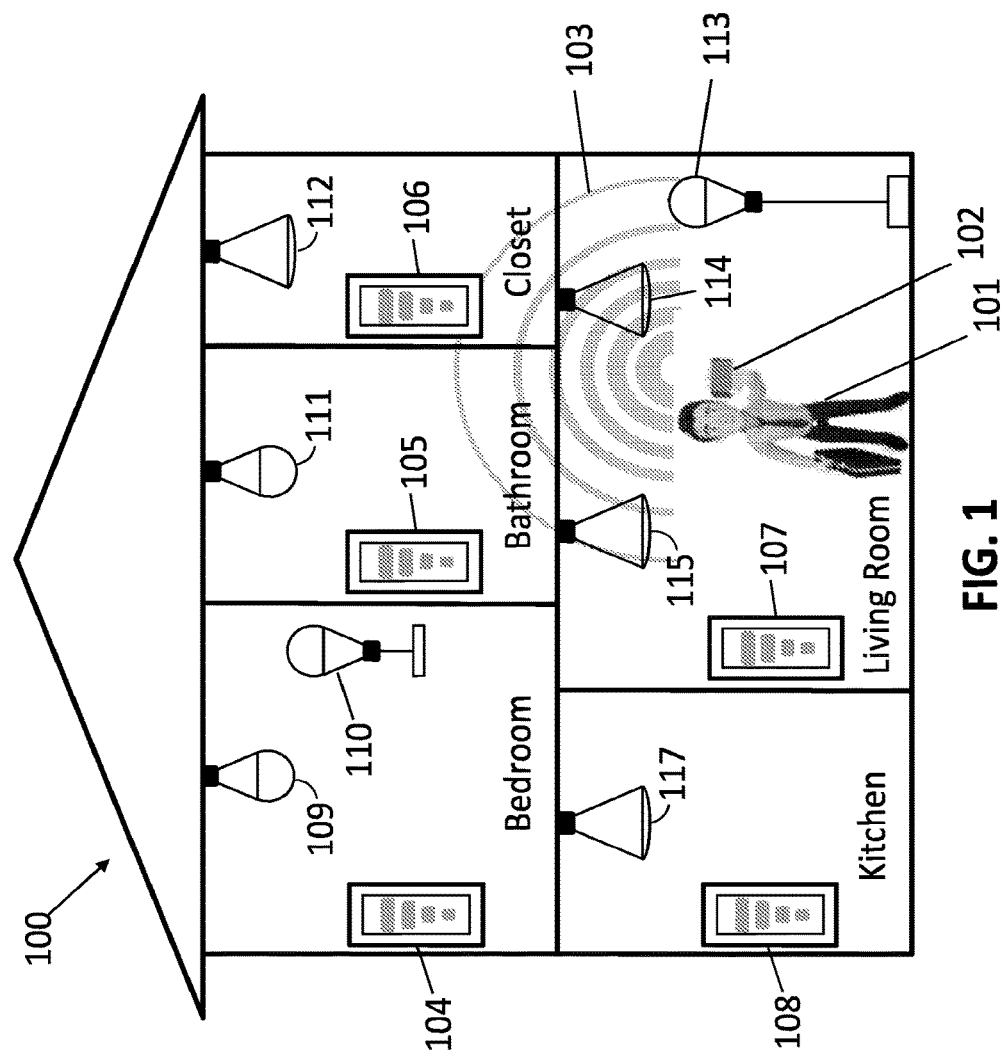
FIG. 1 is an illustration of a simple household lighting system based on smart bulb technology.

To provide an overall understanding of the innovative aspects of the subject matter, certain illustrative embodiments are described; however, one of ordinary skill in the art would understand that the embodiments described herein may be adapted and modified as is appropriate for the specific application being addressed, and that alternative implementations may be employed to better serve other specific applications, and that such additions and modifications will not depart from the overall scope hereof.

Terminology

In the following detailed description, terminology had been adopted to describe aspects of the disclosure. Since this disclosure defines a new class of lighting product, some new terms and phrases have been defined, such that a consistent nomenclature is used throughout this description. Other descriptive terms and phrases are used to convey a generally agreed upon meaning to those of ordinary skill in the art, unless a different definition is given in this specification. The following paragraphs identify these terms for clarity.

The term "LED" generally refers to semiconductor diode devices that emit non-coherent light in the visible spectrum, and are encased in a polymer package. However, it also includes other semiconductor diode devices that emit light, whether in the visible, infrared or ultraviolet spectrum, and whether coherent or non-coherent. It also includes LED devices that use various phosphors or other chemicals to modify the spectral output of the emitted light, are not encased in a polymer package, or may be groups or arrays of multiple individual LED devices mounted in a single package or on a substrate.

The term "wireless" generally refers to a through-the-air, communications system, which is bidirectional, and can be master-slave or peer-to-peer. While one embodiment described is based on the Bluetooth Low Energy (BLE) protocol (also known as Bluetooth 4.0 and/or Bluetooth Smart), other wireless communications or networking protocols could be substituted such as (but not limited to) 802.11/Wi-Fi, ZigBee, Z-Wave, Insteon, etc.

The term "LED bulb" generally refers to a standard LED light bulb, designed to replace an existing incandescent or CFL bulb, and fits into a residential or commercial lighting fixture or free standing luminaire. While one embodiment refers to a form factor typical for a standard incandescent bulb replacement, other form factors may clearly be developed using the techniques described herein.

The terms "intelligent wireless LED light bulb," "LED smart bulb," and "smart bulb" are used interchangeably to generally refer to a light bulb with an LED based illumination source, which also incorporates intelligence in the form of a microprocessor or microcontroller, running a software or firmware based program, and also incorporating a wireless communications capability, such as (but not limited to) Bluetooth Low Energy (BLE). The wireless communications capability allows one or more functions of the bulb to be remotely controlled via said wireless communications path. While not required, the intelligent wireless LED light bulb may also incorporate other communications capabilities such as (but not limited to) Ethernet over powerline, and/or sensors/transducers that operate in the audio, infrared or ultrasonic spectrum. While one embodiment refers to an LED smart bulb with a form factor typical for a standard incandescent bulb replacement, other form factors may clearly be supported using the techniques described herein.

The term "smart switch" or "smart I/O" device generally refers to a generic version of the wireless communications enabled hardware, which is not bulb specific, and would be embedded in an alternate (non LED smart bulb) piece of residential or commercial electrical equipment. The smart switch or smart I/O device would implement wireless communications technology, such as (but not limited to) Bluetooth Low Energy (BLE), and could optionally include other communications capabilities such as (but not limited to) Ethernet over powerline. Physically, this may be a module integrated into the enclosure of the equipment/appliance, or it may be a stand-alone device to which the equipment/appliance is connected or plugged in to. Typical examples of a smart switch would be a 120V/240V switched (on/off) relay function, a non-wetted relay function, programmable timer, sprinkler timer, etc. Typical examples of a smart I/O module would be a motion and/or PIR detector, temperature monitor, thermostat, ambient light detector, audio/audible detector, smoke/gas detector, voltage, current and/or power meter, etc.

The terms "mobile/app", "mobile/app device", "User Central" and/or "UC", generally refers to a mobile and/or easily transportable computing device, typically hand held or wearable, such as (but not limited to) a smart phone, smart pad, tablet computer, laptop computer, smart watch, wrist band, wearable computer, etc., which is capable of running an application program (or "App"), as well understood by those of skill in the art. Such a mobile/app device would generally be expected to provide a graphical and/or touch activated display or screen, where the User Interface (UI) would be presented. The UI would typically allow configuration of the application program, perform specific immediate operations on the smart bulb, or smart switch or smart I/O devices (such as turn on/off), and also configure, program, read status from, write status to, and/or generally interact with the current and future state of the smart device.

The terms "fob/app," or "fob/app device" generally refers to a miniaturized form factor mobile computing device, typically intrinsically carried or worn about the body of the user, such as (but not limited to) a key chain, key fob, access card, key card, wrist band, necklace, wearable device, etc., which is capable of running a limited or fixed function program. Such a fob/app device would generally have a very limited User Interface (UI), ranging from buttons and status indicators, to perhaps no externally available user control or status. The fob/app would generally be expected to provide access to and authentication with a building security (commercial or hospitality industry access control for instance) and/or building management (environmental or energy management for instance) control system. Access to such management systems is typically administered using additional levels of security, such as being a verified employee, resident, customer, or visitor to the premise. The fob/app generally offers no user programmable features, and is a fixed configuration device, allowing a limited, predefined subset of interaction with any smart bulb, smart switch, smart I/O device, or building service, dependent on prescribed rules (such as authorization, security, time of day, etc.).

The terms "host/app," or host/app device" generally refers to a static, non-transportable computing device, typically (but not limited to) a desk top, server etc., which may be capable of running an application program (or "App"), identical to or substantially equivalent to a mobile/app counterpart. Counter intuitively, this includes remote Internet access devices, even though these same devices when physically present at the premise may be authorized to interact with the smart bulbs. The key difference is that the static or remotely located host/app device, may be able to change the programming of the smart device, but the behavior of the smart bulb or smart switch, or smart I/O device is otherwise unaltered by the location of the host/app device (i.e., proximity, and other location based information, is irrelevant to the local operation of the smart device).

The term RoboSmart™ is used to refer to an embodiment of an intelligent wireless LED light bulb.

The term Smart Lights™ is used to refer to an embodiment of an App for a mobile device to control RoboSmart intelligent wireless LED light bulbs.

Home Lighting & Automation Examples

Referring to FIG. 1, a simple residential house hold lighting system (100) is shown, based on the installation of the smart bulb technology, and the use of a controlling device such as (but not limited to) a smart phone or tablet computer. The occupant (101) has a smart phone (102) which communicates directly with each of the smart bulbs in a master-slave relationship, and is able to locate and program the bulbs though the use of an application program ("App") executing on the smart phone (102), and using wireless communications (103), such as BLE. Dependent on the size, construction materials and general topology of the premises, the smart phone's wireless signals (103) will be able to communicate with anything from one, to a subset, to all, of the smart bulbs in the premise, which may also vary dependent on the user's (101) geographic location in the premise (100).

A mix of wireless smart bulbs, conventional wired bulbs, and smart switch technology may be present. For instance, in the Living Room, floor lamp (113) contains a smart bulb, and is connected to a power outlet (not shown), and can be controlled from the smart phone (102) of the occupant (101). However, conventional ceiling lights (114, 115) are controlled from a light switch (107). Light switch (107) may be a conventional light switch, or a smart switch, which can also be controlled from the smart phone (102) of the occupant (101). In the Bedroom, bedside lamp (110) contains a smart bulb, and is connected to a power outlet (not shown), whereas ceiling light (109) which also contains a smart bulb, is wired through a conventional light switch (104). If light switch (104) is switched off, power to the smart bulb (109) is removed, and the bulb illumination will be off and wireless communication will not be possible. When power is reapplied through the light switch (104), to the smart bulb (109), the bulb illumination turns on and wireless communication resumes. While the power remains on through light switch (104), smart bulb (109) can be controlled from the smart phone (102) of occupant (101), including dimming the bulb, and turning the bulb illumination off, while retaining the wireless communication, independent of the illumination function. In a similar fashion, other rooms can be augmented with smart bulbs or smart switches. In the Kitchen, light switch (108) controls the ceiling light (117); in the Bathroom, light switch (105) controls the ceiling light (111); and in the Closet, light switch (106) controls closet light (112). Any of these lights are candidates for smart bulbs, as are light switches candidates for smart switches.

Figure 2:
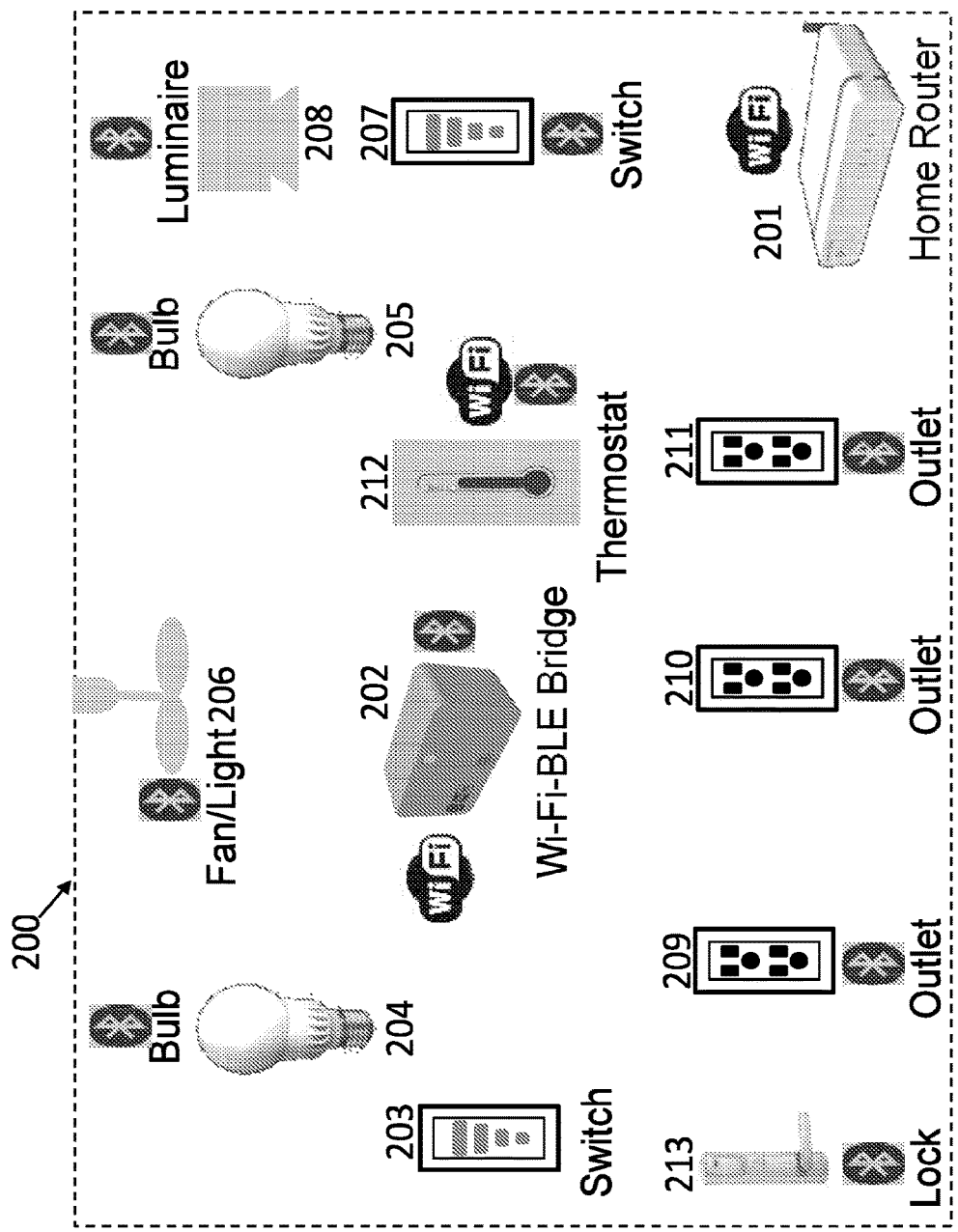
FIG. 2 is a diagram of a more advanced home automation and lighting system incorporating smart bulb technology.

Referring to FIG. 2, a typical home automation ecosystem example is shown, where additional smart devices are introduced into the household or premise (200). The smart devices in the home are accessible via local mobile/app device, as well as host/app devices, which may access the smart device(s) from a static location in the premise, or from a remote location via the Internet.

Home Router (201) is a conventional Wi-Fi-to-Cable or Wi-Fi-to-xDSL router (or any other service provider WAN technology), providing basic Internet access. The Wi-Fi-to-BLE Bridge (202) provides a gateway for BLE devices located within range, to allow their data to be converted for transport over the home Wi-Fi network, and ultimately allow the BLE devices in the home to be accessed from the Internet as well as have their data moved to and stored in the Cloud. More than one Wi-Fi-to-BLE Bridge may be necessary in a large premise, to facilitate communication with all the dispersed BLE smart devices.

Light switch (203) is a conventional light switch, controlling the power to smart bulbs (204, 205). If power to the smart bulbs (204, 205) is removed, the bulb illumination will be off and wireless communication will not be possible. When power is reapplied through the light switch (203) to the smart bulbs (204, 205), the bulbs illumination turns on and wireless communication resumes. While the power remains on through light switch (203), smart bulbs (204, 205) can be controlled from a local mobile/app device or a remote host/app device over the Internet.

Fan (206) is a smart device and is hard wired to the AC power. Fan (206) is typically only controllable from a local mobile/app device or a remote host/app device over the Internet. Light switch (207) is a smart switch, and controls Luminaire (208) via BLE, so while both are connected to the AC supply for power, there is no direct AC wiring between the two devices. A local mobile/app (for instance) communicates with the switch (207), and the switch communicates via BLE to the Luminaire (208). Outlets (209, 210 and 211) are smart switches, which can have the AC power to the outlet receptacle turned off via BLE communications, for a variety of reasons. Thermostat (212) is a smart I/O device which can programmed and/or controlled by BLE communications, and optionally may also have Wi-Fi communications instead of, or as well as BLE. Lock (213) is an entry way security lock that can be accessed via BLE, to allow keyless entry to the premise. As can be seen, many other possibilities and capabilities for household automation could be included.

Smart Bulb Hardware

Figure 3A:
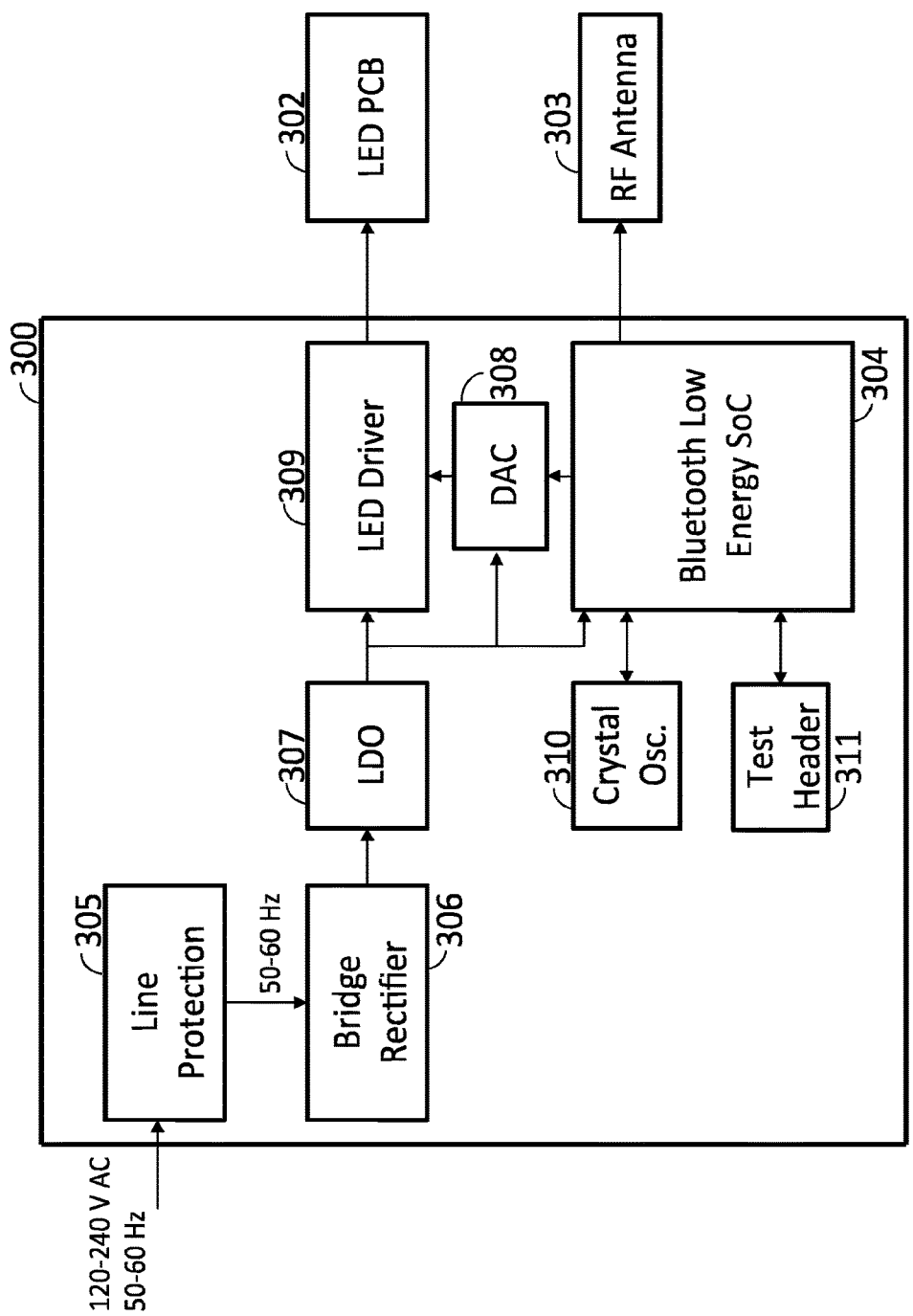
FIGS. 3A, 3B, and 3C are respectively, a block diagram of the electrical/electronic hardware incorporated in a smart bulb, a block diagram of Bluetooth module incorporated in a wall adapter, a block diagram of the hardware for a specific smart bulb device.

Referring to FIG. 3A, a block diagram of the hardware in the smart bulb is shown. The LED light bulb consists of two PCBs. The main PCB (300) encompasses a microprocessor based System on a Chip (SOC) (304) which contains the Bluetooth MAC and PHY, as well as Flash memory, RAM, serial interfaces and general purpose I/O (GPIO). Power to the smart bulb, typically 120-240 V AC, enters the main PCB (300) through a line protection circuit (305), and then to a bridge rectifier (306) and a Low Drop Out (LDO) (307) regulator, to generate the DC voltages for the LED drive and the integrated circuit (IC) supplies. The antenna (303) is also connected directly via the main PCB (300) to the SoC (304). A serial signal from the SoC (304) is used to control an external Digital to Analog Convertor (DAC) (308), the output voltage of which is used as a reference input, in order to set the output current of an LED driver IC (309). Crystal oscillator (310) generates reference clocks for the SoC (304) microprocessor and the Bluetooth radio. A test header (311) provides interface signals to/from the SoC (304) to allow for programming, debugging and testing.

The LED PCB (302) only contains the LEDs, connected in series, which are connected to the LED driver (309) on the main PCB by simple hard wired interconnect. There may be more than one chain of series connected LEDs. In one embodiment, the LED PCB contains multiple LEDs, or an array of LEDs, to produce the desired lighting pattern and lumens rating. In an alternate embodiment, separate LED chains may be present, to provide LEDs of different color on each serial chain, to be illuminated individually or in combinations, to permit any light color to be generated. In a further embodiment, at least one LED may be connected in a non-series configuration, where at least one LED is separately and individually controlled by a dedicated LED driver (309) circuit.

Firmware, executed in the microprocessor of the SoC (304), is used by the device to operate (initially) as a BLE slave device, to both monitor for local (proximity based) communications and control the underlying hardware specific functions dependent on the device type (smart bulb, smart switch, smart I/O, etc.). On encountering a compatible, in range BLE master device, such as in a smart phone, the LED bulb can be remotely controlled by a custom App, resident on the smart phone, to program and control various features of the bulb, such as its on/off state, brightness, etc.

Generic Appliance Hardware

Figure 3B:
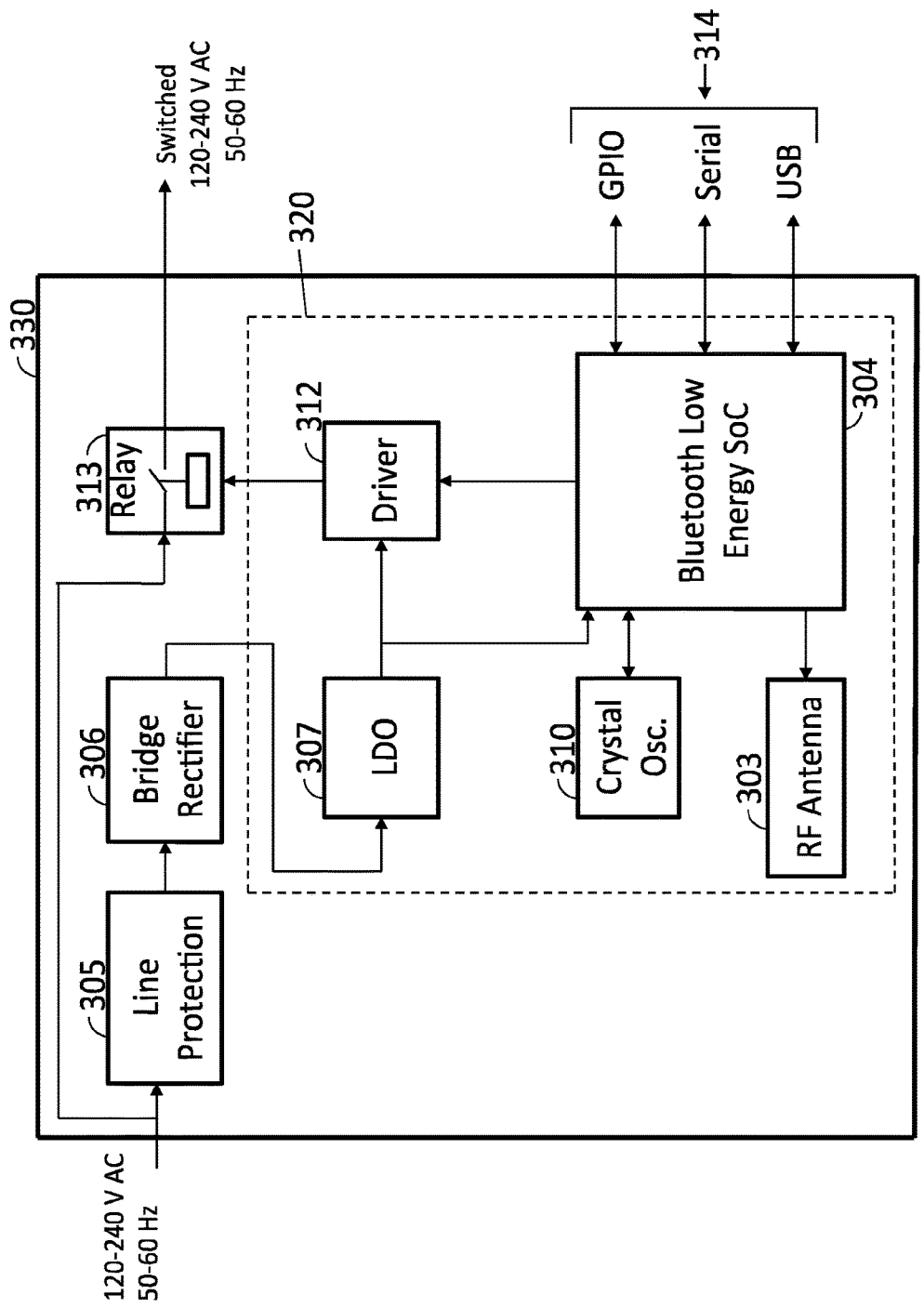

Referring to FIG. 3B, a block diagram of the hardware for a generic smart switch or smart I/O device is shown. The smart switch or smart I/O device hardware is essentially split into two major components or sub-assemblies, generally each on their own separate PCBs. This modular architecture is a direct result of the need to apply the technology across multiple products, form factors, and markets, including the LED smart bulb, smart switch, and smart I/O devices, while minimizing the number of different hardware implementations.

The main PCB (330) essentially encompasses the high voltage components of the design. A separate, and self-contained module, referred to as the Bluetooth Module (or "BT Module") (320), encompasses a microprocessor based SOC (304), which contains the BLE MAC and PHY, as well as Flash memory, RAM, serial interfaces and GPIO. In addition, present in the BT Module (320) are the relevant parts to make it a generic, self-contained, multipurpose wireless enabled I/O component. These include the necessary oscillators (310) for clock generation, an LDO (307) for power supply regulation, and driver IC (312) to enable a high voltage/current load to be driven. The RF antenna (303) is designed to be on-board the module to minimize cost, but in alternate embodiments, can be relocated to the exterior of the module. Various input/output (I/O) (314) are also brought out external to the BT Module, from the SoC (304), which enables other interfaces, such as serial, GPIO, and Universal Serial Bus (USB) to be provided directly from the SoC.

Power to the smart switch or smart I/O device, typically 120-240 V AC, enters the main board (330) through a line protection circuit (305), and then to a bridge rectifier (306) and a Low Drop Out (LDO) (307) regulator on the BT Module (320), to generate the DC voltages for the integrated circuit (IC) supplies and any off-module supplies. A GPIO serial signal from the SoC (304) is used to activate a driver (312) to drive an external relay (313) mounted on the main board (330).

The main PCB (330) only contains the line protection (305), bridge rectifier (306), and the high voltage relay (313). In an alternate embodiment the LDO (307) regulator may be relocated to the main PCB (330) and/or replaced by another power supply generation component.

Firmware, executed in the microprocessor of the SoC (304), is used by the device to operate (initially) as a Bluetooth slave device, to both monitor for local (proximity based) communications and control the underlying hardware specific functions dependent on the device type (smart bulb, smart switch, smart I/O, etc.). On encountering a compatible, in range Bluetooth master device, such as in a smart phone, the smart switch or smart I/O device can be remotely controlled by a custom App, resident on the smart phone, to program and control various features of the device, such as its on/off state, etc.

The exemplary embodiment identified in FIG. 3B is a simple plug-in, programmable residential or commercial wall outlet. However, those of ordinary skill in the art will understand that with minor modifications, the identified BT Module (320) can be integrated into many different form factors for residential and industrial electrical equipment. In addition, the BT Module can, with minimal modifications, be adapted to incorporate many different input devices, such as (but not limited to) serial data, voltage and current inputs, contact inputs, sensor inputs, etc., either integrated on the BT Module, or on a companion board, or external to the physical device. It can also accommodate a wide variety of outputs, such as (but not limited to) 0-10V, 4-20 mA, PWM, contact outputs, etc., either integrated on the BT Module, or on a companion board, or external to the physical device.

Smart LED Bulb with Backup Power

Figure 3C:
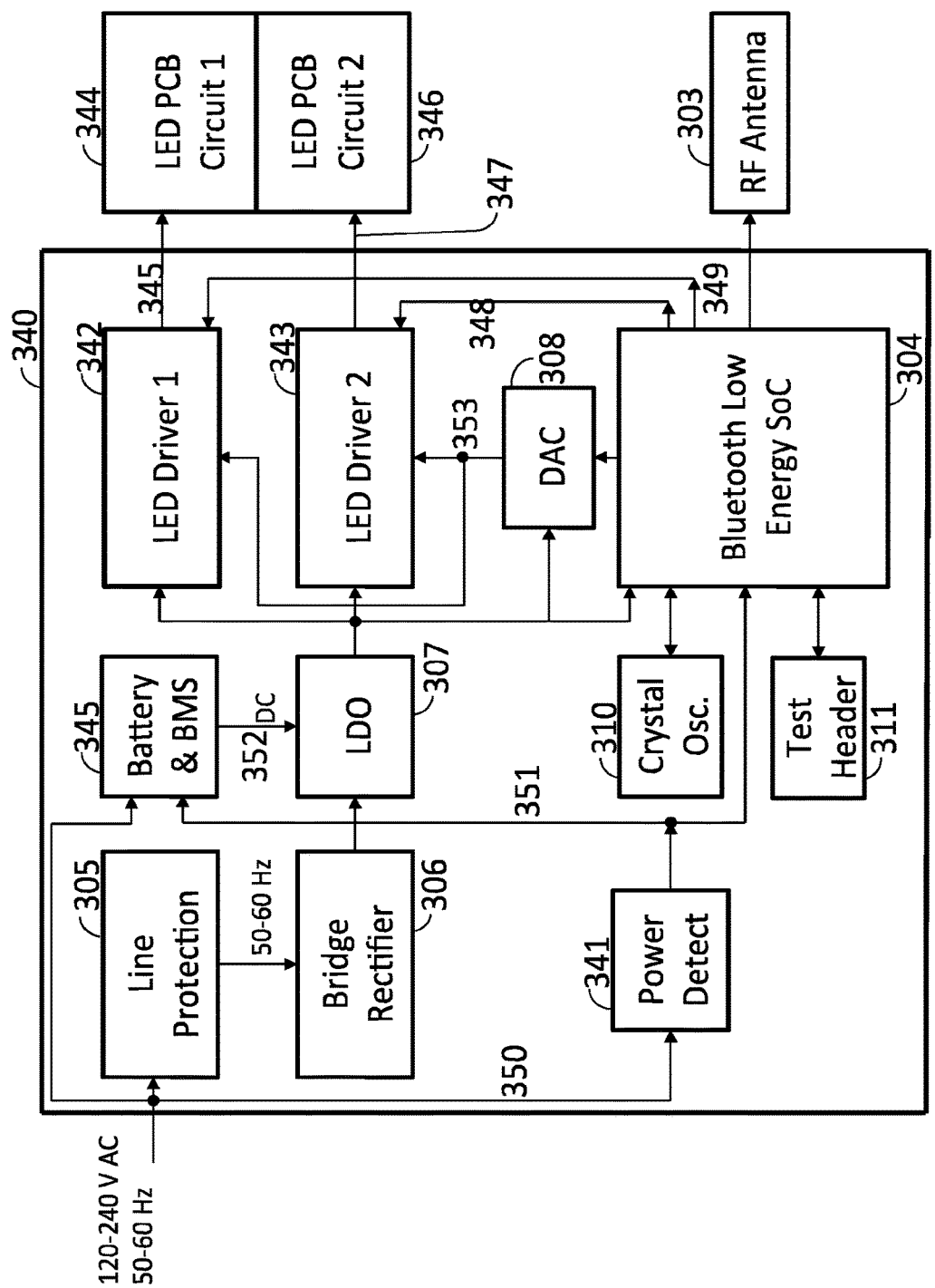

Referring to FIG. 3C, a block diagram of the hardware for a specific smart bulb device is shown. The intent of the device is to provide backup or emergency lighting in the event of AC power disruption. To this end, the device incorporates a rechargeable battery, and power monitoring circuitry, to operate all, or a subset of the LEDs, during a power failure.

This version of the smart bulb consists of two PCBs. The main PCB (340) encompasses a microprocessor based System on a Chip (SOC) (304) which contains the Bluetooth MAC and PHY, as well as Flash memory, RAM, serial interfaces and general purpose I/O (GPIO). Power to the smart bulb, typically 120-240 V AC, enters the main PCB (340) through a line protection circuit (305), and then to a bridge rectifier (306) and a Low Drop Out (LDO) (307) regulator, to generate the DC voltages for LED Driver 1 (342), LED Driver 2 (343) and the DAC (308) and SoC (304) integrated circuit (IC) supplies. The antenna (303) is also connected directly via the main PCB (340) to the SoC (304). A serial signal from the SoC (304) is used to control an external Digital to Analog Convertor (DAC) (308), the output voltage (353) of which is used as a reference input, in order to set the output current of two LED driver ICs (342, 343). Crystal oscillator (310) generates reference clocks for the SoC (304) microprocessor and the Bluetooth radio. A test header (311) provides interface signals to/from the SoC (304) to allow for programming, debugging and testing.

The LED PCB (344,346) only contains the LEDs, connected in series. The board is a single Metal Core PCB (MCPCB) used for its high thermal efficiency to dissipate the heat generated by the LEDs when illuminated. While it is a single MCPCB, the traces to the LEDs are broken into two separate serially connected chains (in this case, by way of example). The first chain (345) is driven by LED Driver 1 (342) located on the main PCB (340) and connected to the top half of the LED MCPCB (344). The second chain (347) is driven by LED Driver 2 (343) located on the main PCB (340) and connected to the bottom half of the LED MCPCB (346).

On the main board (340), a Power Detect (341) circuit monitors the incoming AC power (350), which also supplies the Battery and Battery Management System (BMS) (345) circuit when AC power (350) is available. The Power Detect (341) circuit is connected (351) to the SoC (304) and the Battery and BMS (345) circuit, and on detection of power failure, will inform both devices of the condition. In an alternate embodiment, the Power Failure (341) circuit may be integrated into the functionality of the SoC (304), since many such devices provide the capability to detect supply failure. The Battery and BMS (345) circuit contains a rechargeable battery (typically Lithium Iron, LiFe, or similar chemistry), as well as the recharging circuitry such that the battery is recharged appropriately when normal AC power is applied. The Battery and BMS (345) circuit is connected (352) to and powers the LDO (307) when AC power failure is indicated by the Power Detect (341) circuit via the interconnect (351). Separate enable lines (348, 349), from the SoC (304) determine which of the two LED Drivers (342, 343) will be active. In this exemplary implementation, during normal AC power supply, both LED Driver 1 (342) and LED Driver 2 (343) will be active, and the Battery and BMS (345) circuit will be recharging. In the event of an AC power failure, in one preferred embodiment, LED Driver 1 (342) will be enabled by the SoC (304) using the enable/disable signal (349), the LEDs located on LED PCB Circuit 1 (344) will be powered on, LED Driver 2 (343) will be disabled by the SoC (304) using the enable/disable signal (348), the LEDs located on LED PCB Circuit 2 (346) will be powered off, and the Battery and BMS (345) circuit will be supplying power to all active components on the board.

Firmware, executed in the microprocessor of the SoC (304), is used by the device to operate (initially) as a Bluetooth slave device, to both monitor for local (proximity based) communications and control the underlying hardware specific functions for the smart bulb. On encountering a compatible, in range Bluetooth master device, such as in a smart phone, the smart bulb can be remotely controlled by a custom App, resident on the smart phone, to program and control various features of the device, such as its on/off state, etc.

The exemplary embodiment identified in FIG. 3C is provided as an example, and one of ordinary skill in the art would understand that other improvements could be made, including (but not limited to) dimming the LEDs which remain on during the power fail to further conserve power/battery life, or increasing either the illumination level and/or the number of LEDs that are powered during a power fail condition to increase the illumination, when a representative mobile device/app is either in range, or is specifically instructing the smart bulb to do so.

Basic 1$^{st}$ Generation Device & App Features

Bluetooth Stack & Mobile App Interaction

Figure 4:
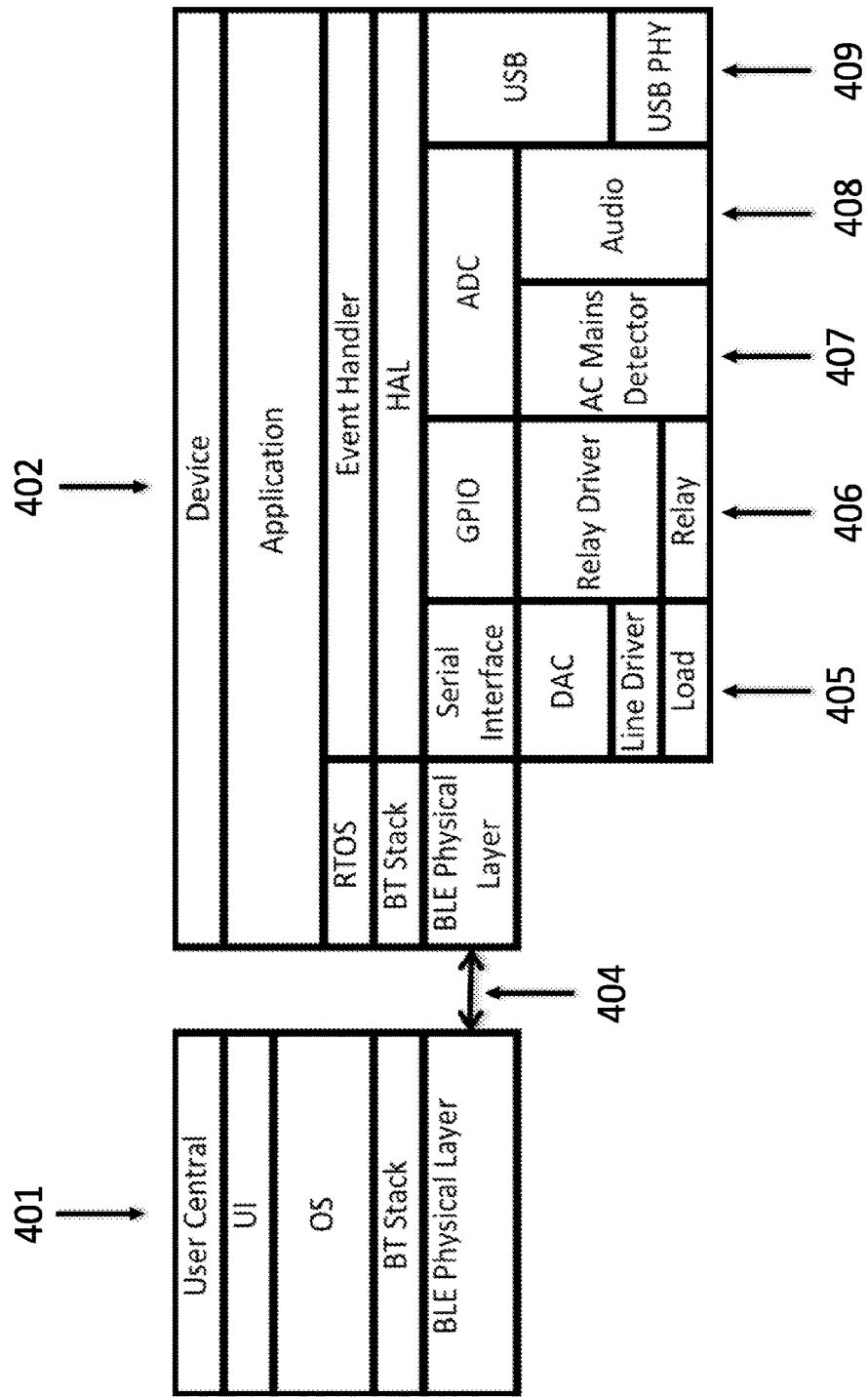
FIG. 4 is a block diagram of the software/firmware in a smart bulb and the interaction with the App.

Referring to FIG. 4, a block diagram of the interrelationship between the mobile app or host/app device, the Bluetooth stack in the mobile/app or host/app device, and the software/firmware in the smart bulb or smart I/O device, is shown.

The following components are defined in FIG. 4. The User Central (UC) stack (401) is comprised of several protocol layers. The User Interface (UI), the Operating System (OS), the Bluetooth Stack (BT Stack), and the BLE Physical Layer.

The communication between the UC and the Device is performed over the BT Stack Protocol and through the BLE physical layer (404).

The Device stack (402) has the BLE Physical layer and the BT stack, which interfaces to the Device Real Time Operating System (RTOS). The Device contains Application code to process all incoming and outgoing data, process actions and responses, and maintain timing for devices. The application can access trigger hardware input and output events with an Event Handler algorithm and Hardware Abstraction Layer (HAL). Messages from the Application can trigger the Serial Interface to program the Digital to Analog Converter (DAC) to generate a voltage or current to control the power delivered to a load (405) (i.e., LEDs, motor, etc.). The Application can likewise trigger a similar action to close a relay by messaging down to the GPIO interface to generate a signal to the relay driver (406). The AC mains can be detected by sending a read message to the Analog to Digital Converter (ADC) to read the analog signal from the AC Mains Detector (407). Audio signals can also be detected through the same ADC (408). The Application has access to a USB interface for bi-directional data traffic utilizing the USB MAC and USB PHY Interface (409).

Device Autonomy

Each smart bulb (or slave device) incorporates a microprocessor, with associated memory, peripheral, and communications functions, to operate as a stand-alone computer. Local non-volatile (FLASH) memory stores certain characteristics about the smart bulb (or device) and the smart bulb's (or device's) capabilities, which will be retained in the absence of power. Through wireless communications between the bulb and an external mobile/app device, the microprocessor can accept data and store that data permanently into the bulb's memory. The smart bulb (or appliance) operates autonomously, based on its own programming, in the absence of a local mobile/app master controller. Dependent on the proximity of the mobile/app device, the smart bulb can also operate differently based on different mobile/app controllers being present, their proximity, or other factors such as user (smart phone), priority, security/authentication, time of day, environmental conditions (i.e., daylight, temperature), etc.

The smart bulb or smart device generally acts as a slave device, and broadcasts an advertisement periodically. The advertisement contains information about the slave device, which the UC gathers and uses to both determine the type of device, and initiate further communications to gather additional details information about the smart bulb or smart device. See the "Bulb Discovery" section and FIG. 6 for additional information. Note that in general the smart bulb or smart device advertises a basic, constant set of features. However, it is permissible to have a vendor specific field in the advertisement which can indicate that a key parameter has changed (such as a measurement that the device is monitoring), or the device needs some attention (such as a timer is about to expire, the device's power was interrupted, etc.) This acts as a flag to any UC, to indicate that the device has updated status and requires attention.

App Behavior

Foreground:

When the Smart Lights App is launched in the foreground, it starts a scan process to locate advertising RoboSmart devices.

When the App finds nearby RoboSmart devices it will initiate a request to gain more information before creating a connection. The data retrieved from the request is used for, but not limited to, pre-populating the UI, determining geo-location, indoor location, proximity detection, network connections and status.

After all the devices have been discovered the App makes a determination on which devices to connect to, based on but not limited to, RSSI values, Light Name, Group Name, Room Name, available services, or other criteria. The connection process is monitored for missed connections and a retry is started if there is no connection after the connection timer expires. If the connection timer expires after there is no connection for a set number of times the App will stop attempting to connect to the device.

During this process, the App will display all discovered devices, the state of the device, and connection status based on, but not limited to, the icon displayed in the UI. A powered off or out of range device is displayed greyed on the UI screen, with a label stating, "Powered Off", "Out of Range", or alternating between these two labels. An advertising bulb should be displayed with a greyed icon, and a label stating "Discovered". If the App is actively trying to connect to a device, the label should state "Connecting". Other labels, based on the state of the device and/or communication, may be displayed, and are both contemplated and obvious.

After a connection is made, the App will determine if the device was previously discovered, and if so, the App will retrieve the device information from the App's permanently stored core data. If the App determines the device has not been previously discovered, it will discover all available device characteristics for the App to manipulate. In an alternate embodiment, the App may only discover a single, or a subset of, the device characteristics, in order to speed up the device discovery time.

After a connection is successful and the device history has been determined, the App will immediately write a real time clock (RTC) value to ensure the device has an accurate time reference based on that of the App.

When connected, the App will present the device on the UI as, but not limited to, an icon, a cell, a member of a list, or a dedicated view.

Background:

When the Smart Lights App is in the background (so it is running but it is not the App presented on the screen, since the mobile/app device has another App or function in the foreground) it may, as an advanced configurable option (which may or may not be available to all users) maintain existing connections to devices that remain in range, or drop connections to all devices, or drop connections only to those devices that become out of wireless range.

The App can optionally be configured to actively scan for bulbs, to determine the proximity of neighboring devices, and to make a decision on which UI is presented to the user the next time the application is brought to the foreground. This is covered in additional detail in the "Proximity/Indoor Location" section.

When the App does not detect any RoboSmart devices for a period of time, it will stop all activity to minimize power consumption. In one embodiment, the App may move to a mode where it will monitor the geo-location of the mobile/app device based on GPS signaling, to detect if it is approaching and/or has arrived at a preconfigured location.

Remote/Re-Launch

In one embodiment, the mobile/app can be automatically re-launched based on geo-fencing (GPS coordinates). This is to say, when the mobile/app gets to a specific location (or any one of a number of predetermined locations), or it gets to within predetermined distances from preconfigured locations (learned or programmed), the GPS location services in the mobile/app device can be utilized to re-launch the App and/or bring it to the foreground. An alternate embodiment is that based on the geo-fencing information, the mobile/app will remain in the background mode, but start scanning for RoboSmart bulbs immediately that a location is matched or it gets within a predetermined distance. In this manner, in range smart bulbs (or appliances) can be turned on for security and/or convenience (such as driveway, porch or interior lights, for instance), as the user approaches a known (pre-programmed or learned) GPS location.

App User Interface (UI) & Capabilities

Figures 5A, 5B, 5C, 5D:
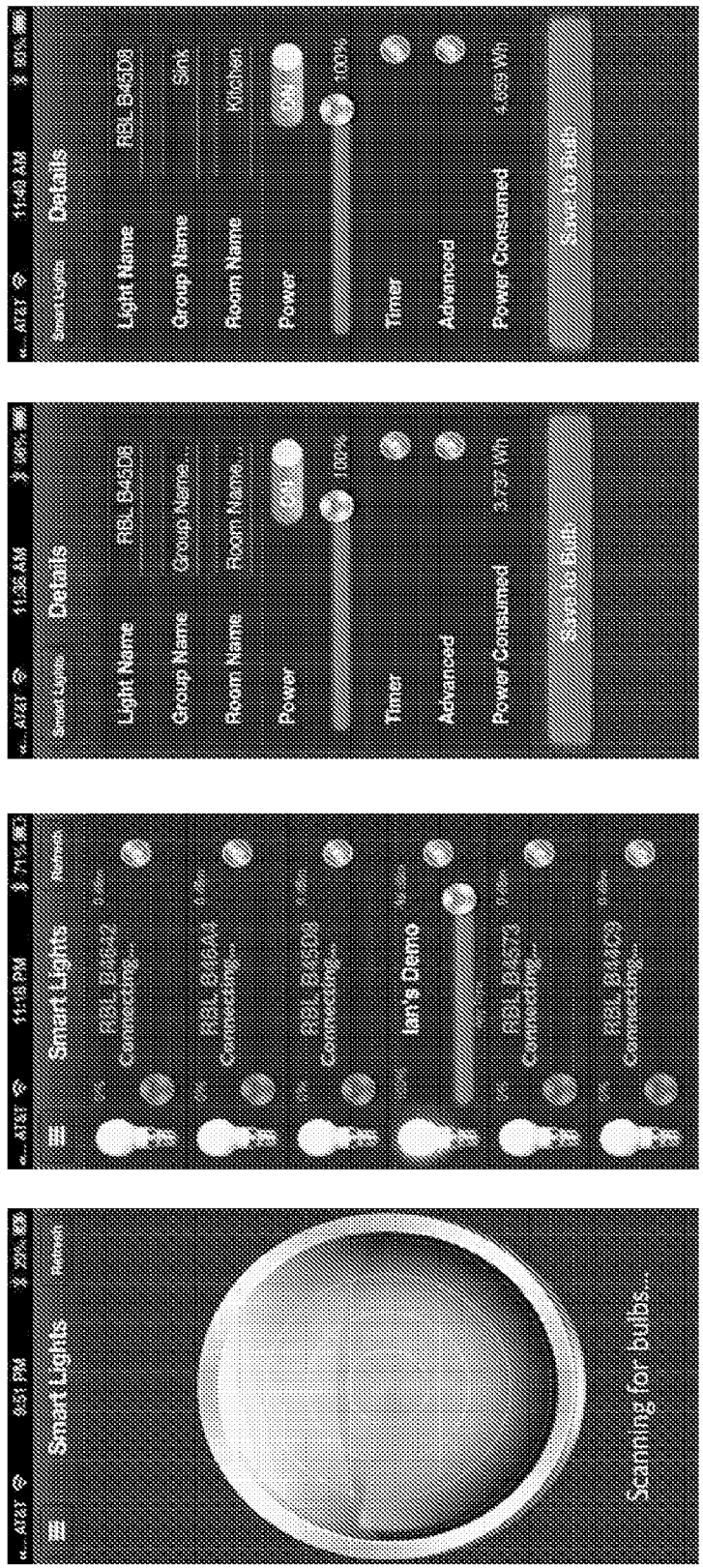
FIG. 5A through FIG. 5Z are illustrations of various screen shots of the Smart Lights™ App.
Figure 5H:
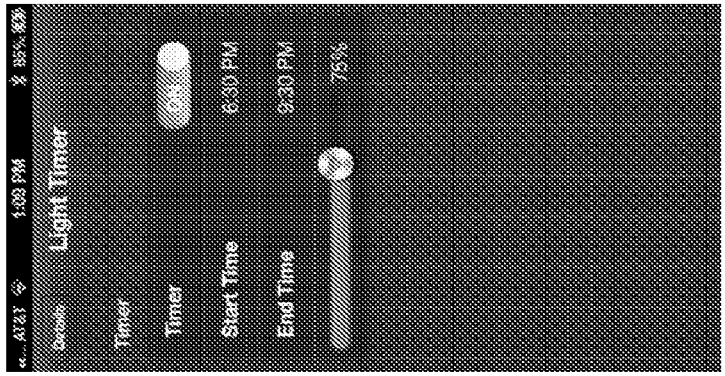
Figure 5G:
Figure 5F:
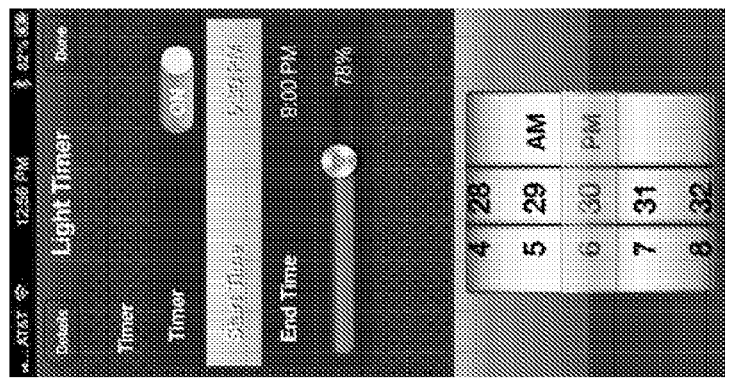
Figure 5E:
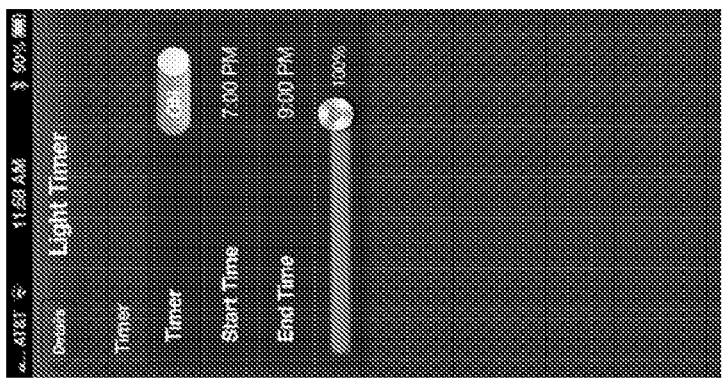
Figure 5L:
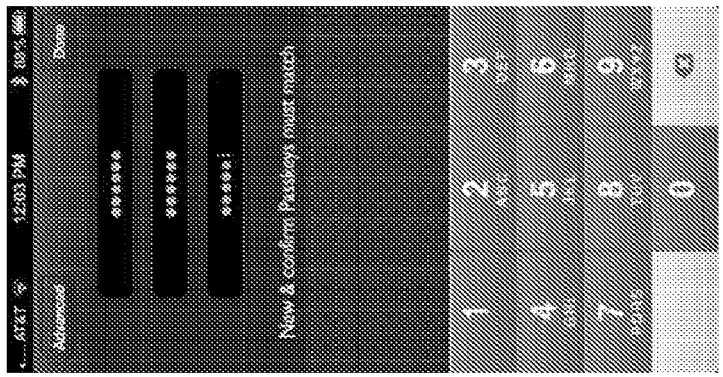
Figure 5K:
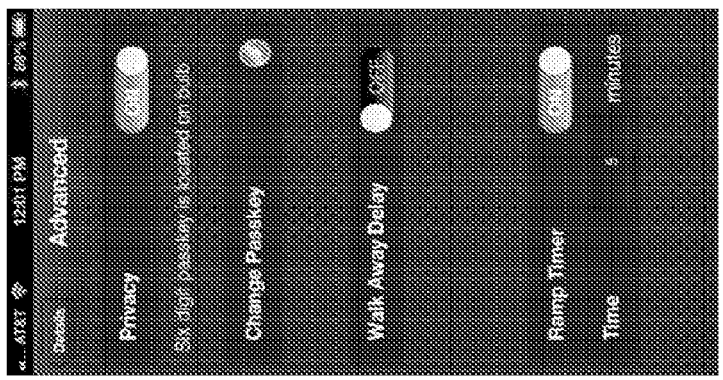
Figure 5J:
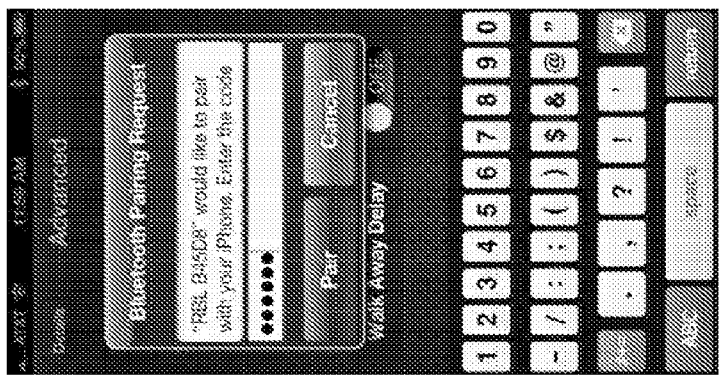
Figure 5I:
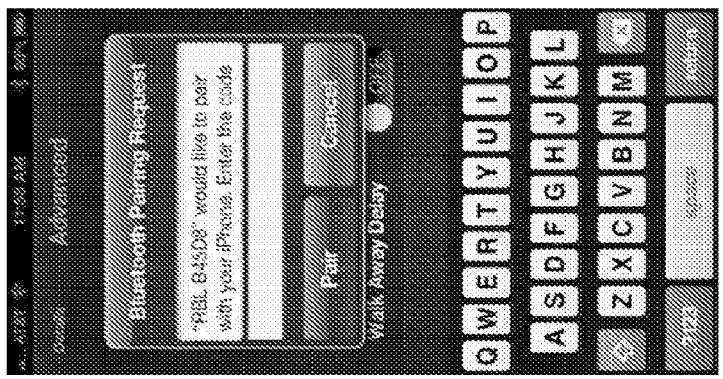
Figures 5Q, 5R, 5S, 5T:
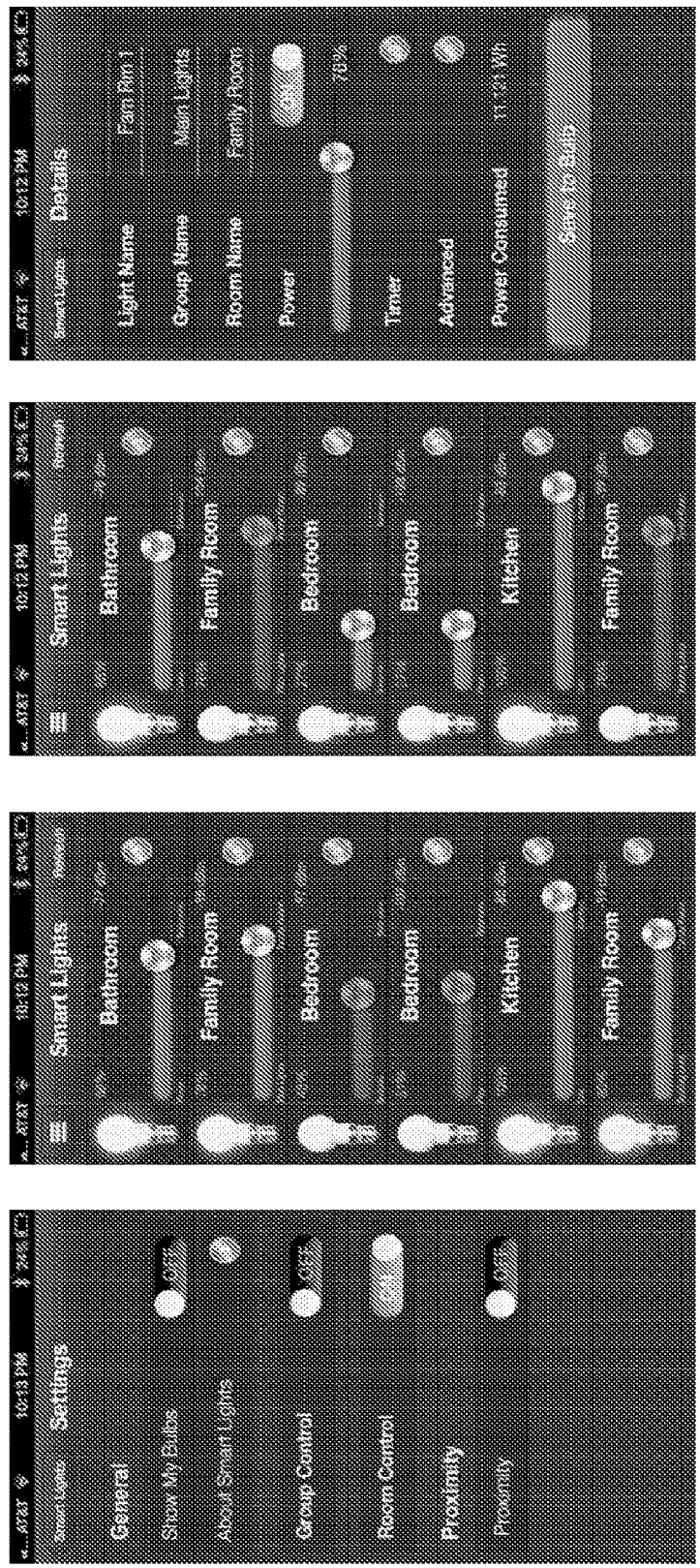
Figures 5U, 5V, 5W, 5X:
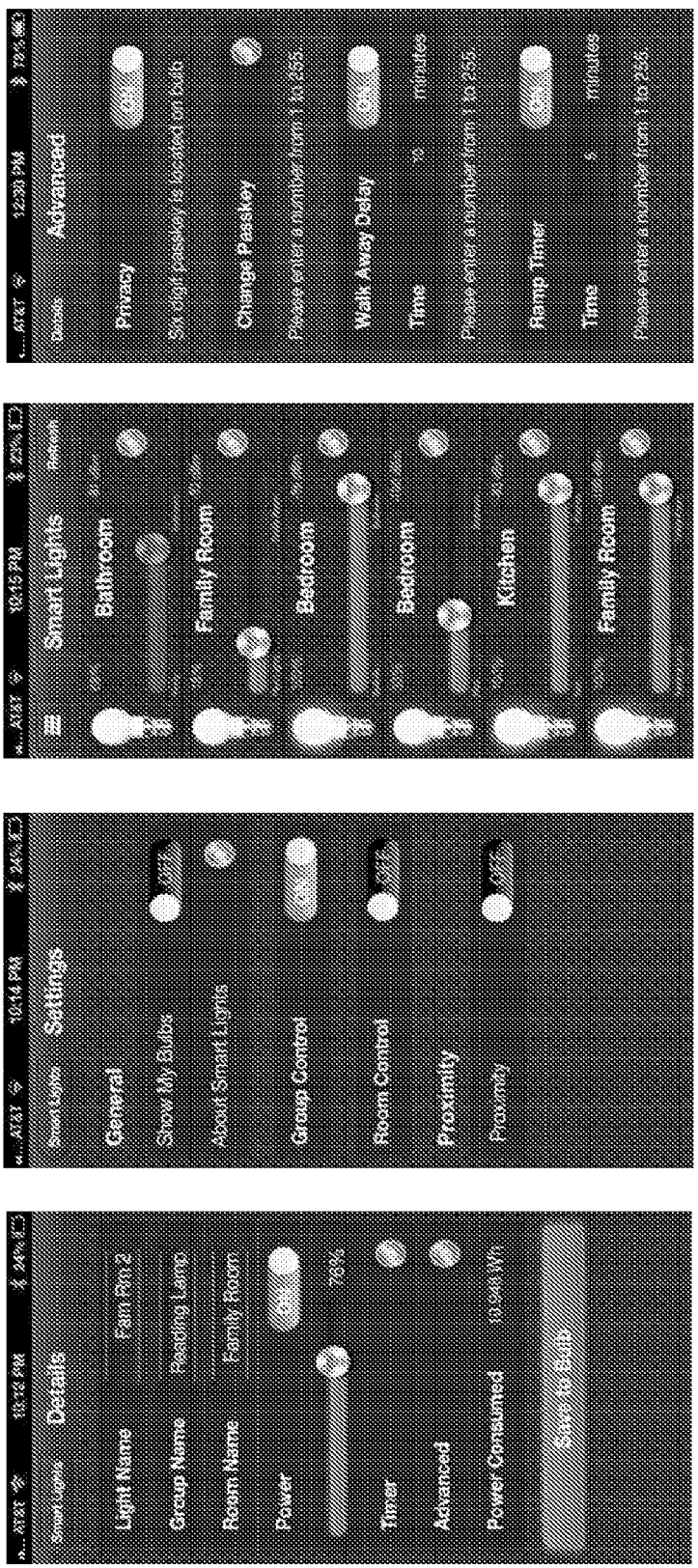
Figures 5Y, 5Z:
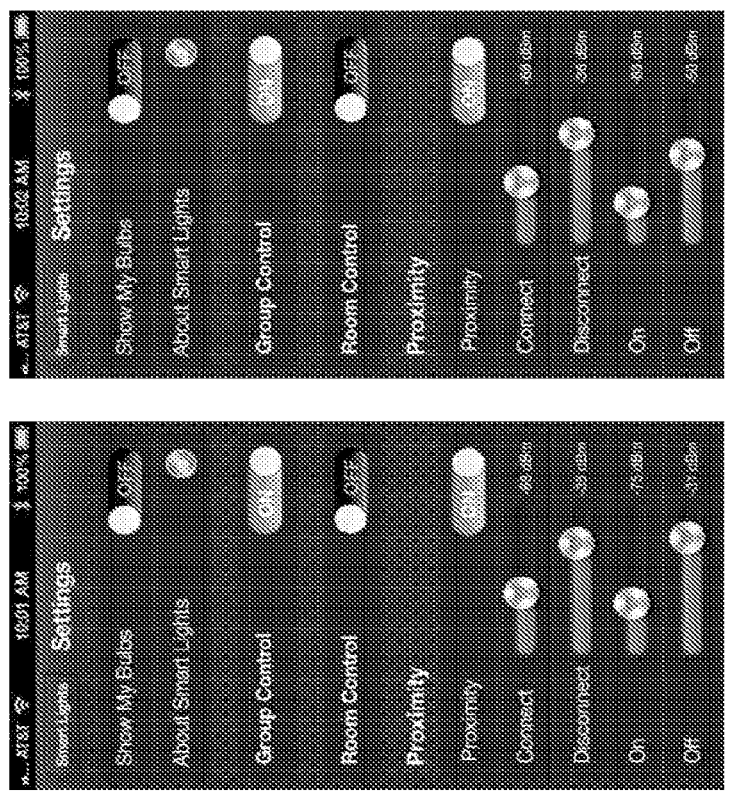

Referring to FIGS. 5A through 5Z, screen shots captured from a representative smart phone are shown, exhibiting some of the primary user interface (UI) views for one embodiment of an application program (App) running on the smart phone.

Launch

Referring to FIG. 5A, on launching the App, the user is first presented with a "Radar Screen" which emulates the rotational sweep pattern expected of a traditional avionics radar system, while the mobile/app searches for smart bulbs (or other devices) via the Bluetooth wireless communication embedded in the smart phone.

Smart Lights Screen

The Smart Lights screen shows the bulbs that are trying to connect, or are connected. Examples are shown in the following: FIG. 5B—Smart Lights; FIG. 5M—Smart Lights—showing 6 renamed bulbs connecting; and FIG. 5N—Smart Lights—showing 6 bulbs connected.

Access to the Details screen for each specific bulb is via the ">" icon above right of the dimmer slider bar, in the Smart Lights Screen.

Figure 22A:
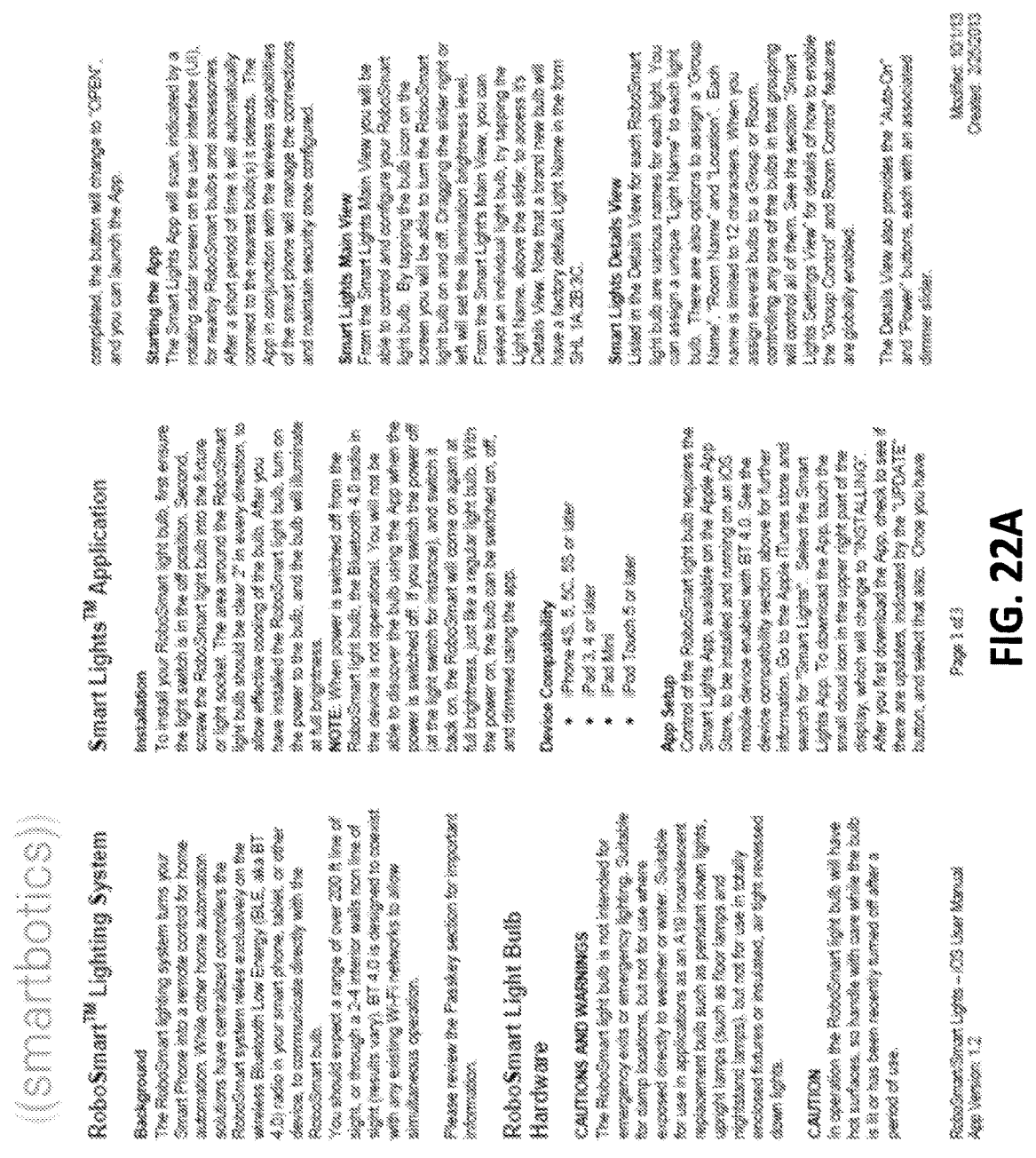

Access to the Settings screen is via the icon in the top left of the Smart Lights screen. Note that on this version of the App, the estimated RSSI value (in dBm) for each bulb appears to the top right of each bulbs slider control. Future versions may have this display feature moved, removed, or displayed in an alternate form (i.e., a signal strength bar) or only provide the RSSI value based on a user configurable parameter, elsewhere in the App. The Smart Lights screen is also described in the User Manual of one embodiment as shown in the "Smart Lights Main View" section in FIG. 22A column 3.

Details Screen

Figure 22B:
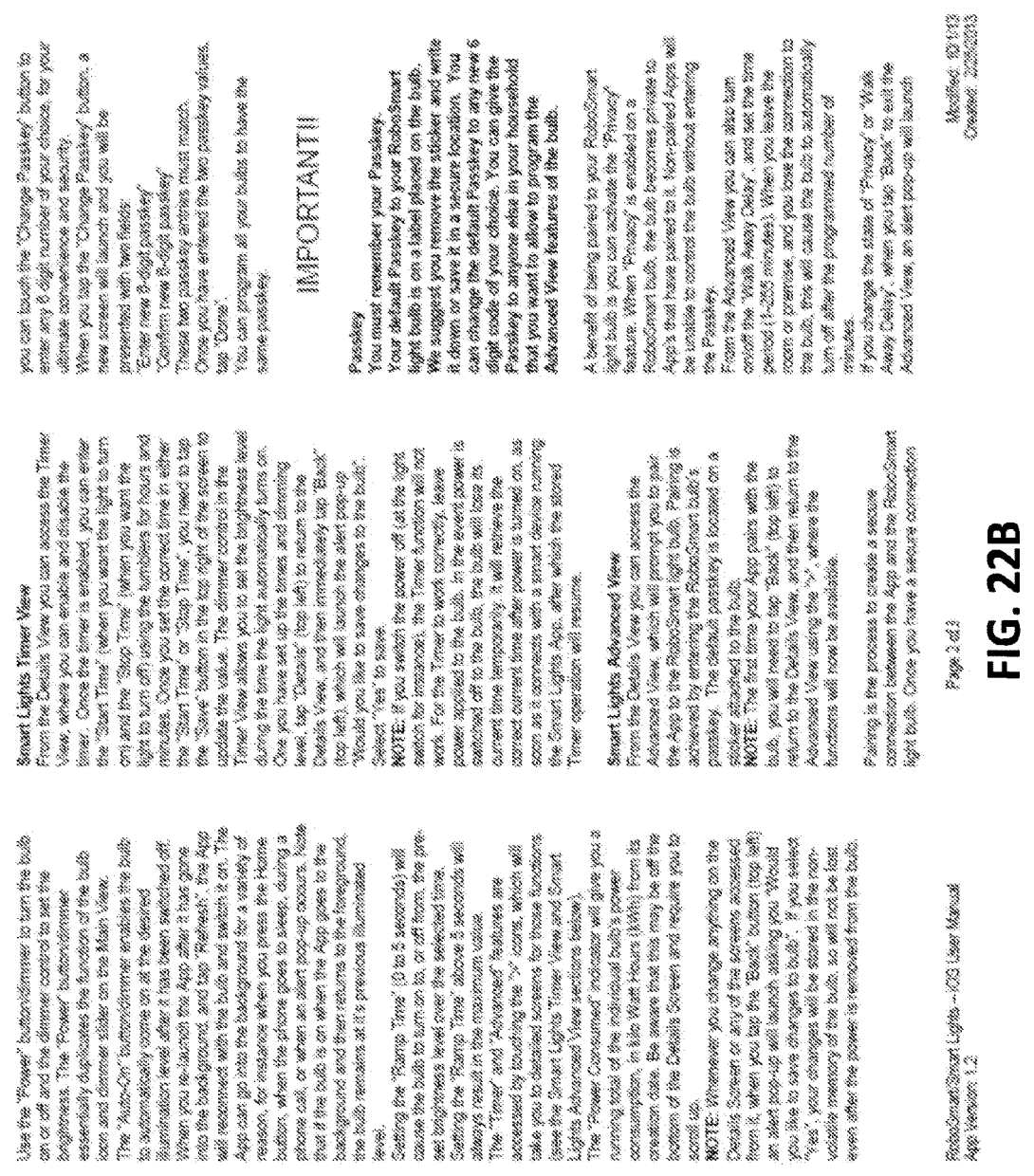

Access to the Details screen for each specific bulb is via the ">" icon above right on the dinner slider, in the Smart Lights Screen. When a new bulb is first discovered, it will have a factory default Light Name (the example shown is RBL B45D8, and the Room and Group names will be blank). Examples are shown in the following: FIG. 5C—Details—showing a new bulb; FIG. 5D—Details—showing a Group & Room label programmed. The Details screen also allows the Light Timer to be programmed; access to the Advanced screen, which requires the Passkey; allows the bulb to be turned on, off, and dimmed; and shows the estimated power consumed by the bulb. The Details screen is also described in the User Manual of one embodiment as shown in the "Smart Lights Details View" section in FIG. 22A column 3 and FIG. 22B column 1.

Naming Bulbs

The Light Name, Room Name and Group Name of a bulb can be assigned, from the Details Screen. Examples are shown in the following: FIG. 5C—Details Screen—showing a new bulb, and FIG. 5D—Details—showing a Group & Room label programmed.

In this example, the Light Name RBL B45D8, Room Name was assigned as Kitchen, and Group Name was assigned as Sink.

When the device is connected, when Light Name, Room and Group are assigned, they are written to the bulbs volatile memory (RAM). When the Save to Bulb icon is touched, the assigned Light Name, Room Name and Group Name are written from the bulb's volatile memory (RAM), to non-volatile memory (FLASH) and will be retained if power is interrupted to the bulb. The naming bulbs function is also described in the User Manual of one embodiment as shown in the "Smart Lights Details View" section in FIG. 22A column 3.

Light Timer

The bulb (or appliance) can be programmed to turn on and off at specific times of the day, and at a specific brightness. This can be overridden (or reprogrammed) by a device in close proximity. Examples are shown in the following: FIG. 5E—Timer Screen; FIG. 5F—Timer Screen—showing Set Start Time; FIG. 5G—Timer Screen—showing Set End Time; and FIG. 5H—Timer Screen—showing Timer/Dimming Set. The Light Timer is also described in the User Manual of one embodiment as shown in the "Smart Lights Timer View" section in FIG. 22B column 2.

Pairing

Accessing any of the Advanced features from the Details screen requires a Passkey entry.

The default Passkey is assigned at final test after manufacture.

Once the correct Passkey is entered, the Private Services of the bulb will be accessible, and the bulb and the mobile/app are now paired. Examples are shown in the following: FIG. 5I—Advanced Screen—showing Bluetooth Pairing Request; FIG. 5J—Advanced Screen—showing Passkey Entry. The Pairing function is also described in the User Manual of one embodiment as shown in the "Smart Lights Advanced View" section in FIG. 22B column 2 and 3.

Passkey Entry/Change

Once the correct factory Passkey has been entered, a new personal Passkey can be entered by the user. The bulb and the mobile/app will now be paired with the new Passkey. Examples are shown in the following: FIG. 5K—Advanced Screen—showing Select Change Passkey; FIG. 5L—Advanced Screen—showing Enter New Passkey. The Passkey entry/change function is also described in the User Manual of one embodiment as shown in the "Smart Lights Advanced View" section in FIG. 22B column 2 and 3.

Settings Screen

Access to the Settings screen is via the icon in the top left of the Smart Lights screen. An example is shown in the following: FIG. 5Q—Settings Screen—showing Show My Bulbs Off, Group Control Off, Room Control On. From the Settings Screen; Show My Bulbs can be turned on/off; Group Control and Room Control can be turned on/off; and Proximity can be turned on/off. The Settings screen is also described in the User Manual of one embodiment as shown in the "Smart Lights Settings View" section in FIG. 22C column 2.

Show My Bulbs (Privacy Mode)

When Show My Bulbs is on, bulbs that have been paired will show on the Smart Lights screen, bulbs that are not paired, will not be shown. When Show My Bulbs is off, all bulbs that can be detected will be shown on the Smart Lights screen. Examples are shown in the following: FIG. 5O—Settings Screen—showing Show My Bulbs On; FIG. 5P—Smart Lights—showing 3 Private Bulbs Connected (versus the 6 that were previously shown in FIGS. 5M and 5N, indicating that 3 were not private to this UC).

Group/Room Control

Bulbs assigned to the same Group or Room will be controlled together from the on/off and slider controls of the Smart Lights screen, when Group Control and/or Room Control is turned on from the Settings screen. The Group/Room control function is also described in the User Manual of one embodiment as shown in the "Smart Lights Settings View" section in FIG. 22C column 2.

From the examples, Group Control and Room Control are both operated upon.

FIG. 5Q—Settings Screen—showing Show My Bulbs Off, Group Control Off, Room Control On The bulbs in the Family Room example operate together.

FIG. 5R—Smart Lights—showing Family Room On, Bedroom Off

FIG. 5S—Smart Lights—showing Family Room Off, Bedroom On

FIG. 5T—Smart Lights—showing Family Room 1 in Room Name=Family Room

FIG. 5U—Smart Lights—showing Family Room 2 in Room Name=Family Room

With Room Control is off, the lights in the same group behave independently from the Smart Lights screen.

FIG. 5V—Settings Screen—showing Group Control On, Room Control Off

FIG. 5W—Smart Lights—showing Family Room/Bedroom Individual Control

"Walk Away Delay"

When the App is paired to a device, it will be able to write to the Private Characteristic "Walk Away Delay". When the Walk Away Delay is enabled, and the value is 0 (zero) the Walk Away Delay characteristics will leave the bulb turned on indefinitely after the App loses connection to the device or smart bulb. When the Walk Away Delay is enabled, and the value is a non-zero number of minutes, the Walk Away Delay characteristics will turn the bulb off after the App loses connection to the device or smart bulb and the specified time has elapsed. An example is shown in the following: FIG. 5X—Advanced Screen—showing Walk Away Delay=On, Time=10 Minutes. The Walk Away Delay function is also described in the User Manual of one embodiment as shown in the "Smart Lights Advanced View" section in FIG. 22B column 3.

Ramp Time Characteristic

The Ramp Time can be enabled, and programmed to the time it takes for the bulb to turn on or off, to the desired brightness. An example is shown in the following: FIG. 5X—Advanced Screen—showing Ramp Timer=On, Time=5 minutes.

The Ramp Time will cause the lamp to gradually ramp on to the programmed brightness level over the specific time period, or gradually turn off from the programmed brightness level over the specific time period. The Ramp Time function is also described in the User Manual of one embodiment as shown in the "Smart Lights Details View" section in FIG. 22B column 1.

Proximity

Proximity can be enabled from the Settings screen. When enabled, it allows the RSSI settings for Connection/Disconnection to the bulb, and On/Off control, to be programmed. Examples are shown in the following: FIG. 5Y—Smart Lights—Settings Screen—showing Proximity=On, and FIG. 5Z—Smart Lights—showing Settings Adjusting Control, Connect/Disconnect levels, On/Off levels.

When enabled, if the bulb goes out of range of the mobile/app, it will be turned off, and when it comes back in ranged, it will be turn on. The proximity/Auto-On function is also described in the User Manual of one embodiment as shown in the "Smart Lights Details View" section in FIG. 22A column 3 and FIG. 22B column 1.

Bulb Discovery

Figure 6:
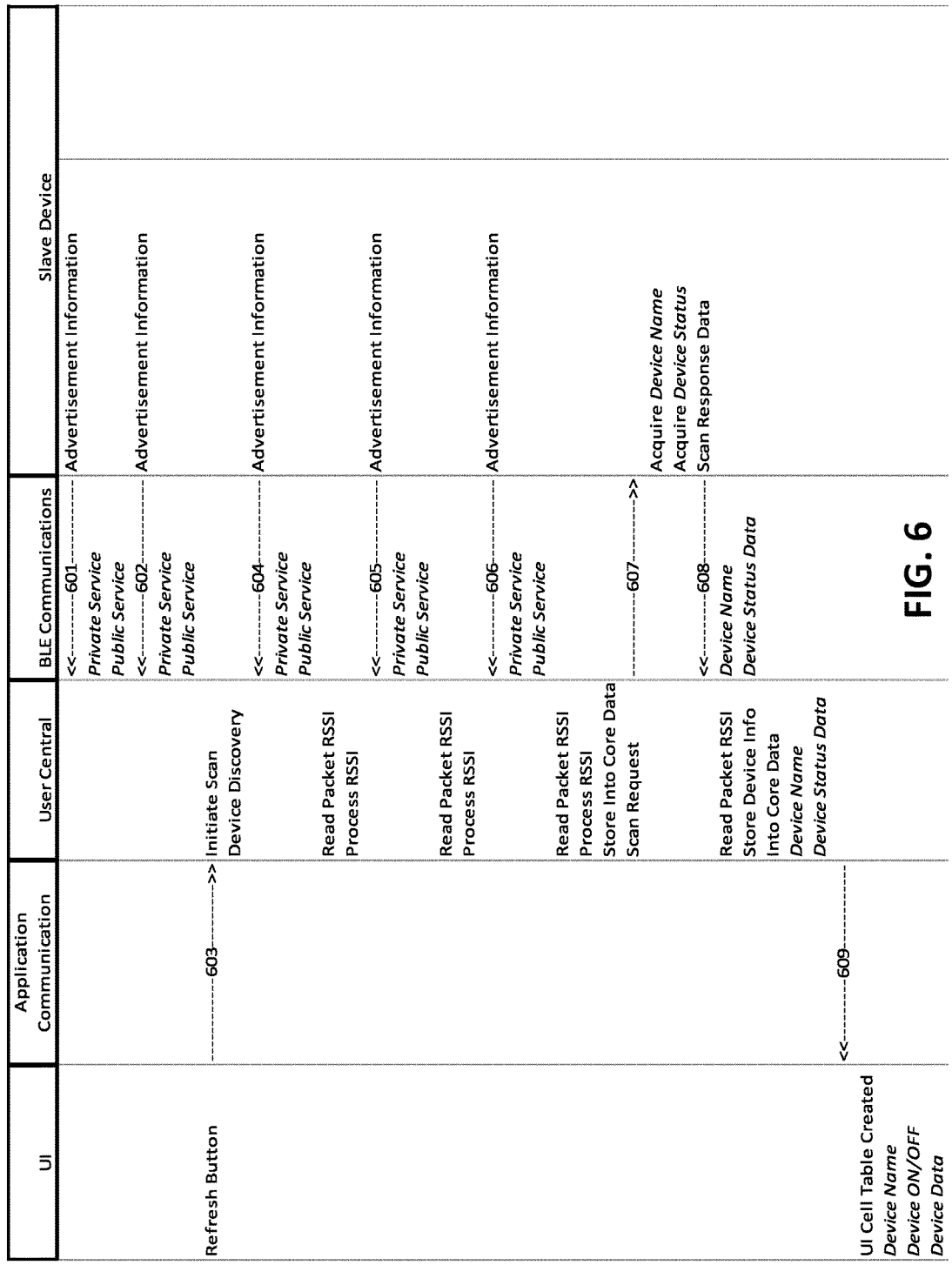
FIG. 6 is a flow diagram of the software/firmware algorithm for a smart bulb for Bulb Discovery.

Referring to FIG. 6, a flow diagram of the interaction between the UI, Application Communication, UC, BLE Communications, and Slave Device (the smart bulb) for "Bulb Discovery" is defined. The Slave Device advertises automatically at a constant period (601, 602). When the user presses the Refresh Button or when the Application algorithm requires, the UC will initiate a Scan Device Discovery (603). The UC will listen for the Slave Device Advertisements (604, 605, 606) gathering data for the Discovered Device Table stored in core data.

The UC will query the Slave Device further (607) to obtain additional advertisement data via the Scan Request and Scan Response (608) exchange. All data retrieved from the exchanges are saved in Discovered Devices Table stored in core data.

The Application will create an object for the discovered device, which will include a UI object. The UC updates the UI (609) with the newly learned data and the UI object.

Proximity Based Connection

Figure 7:
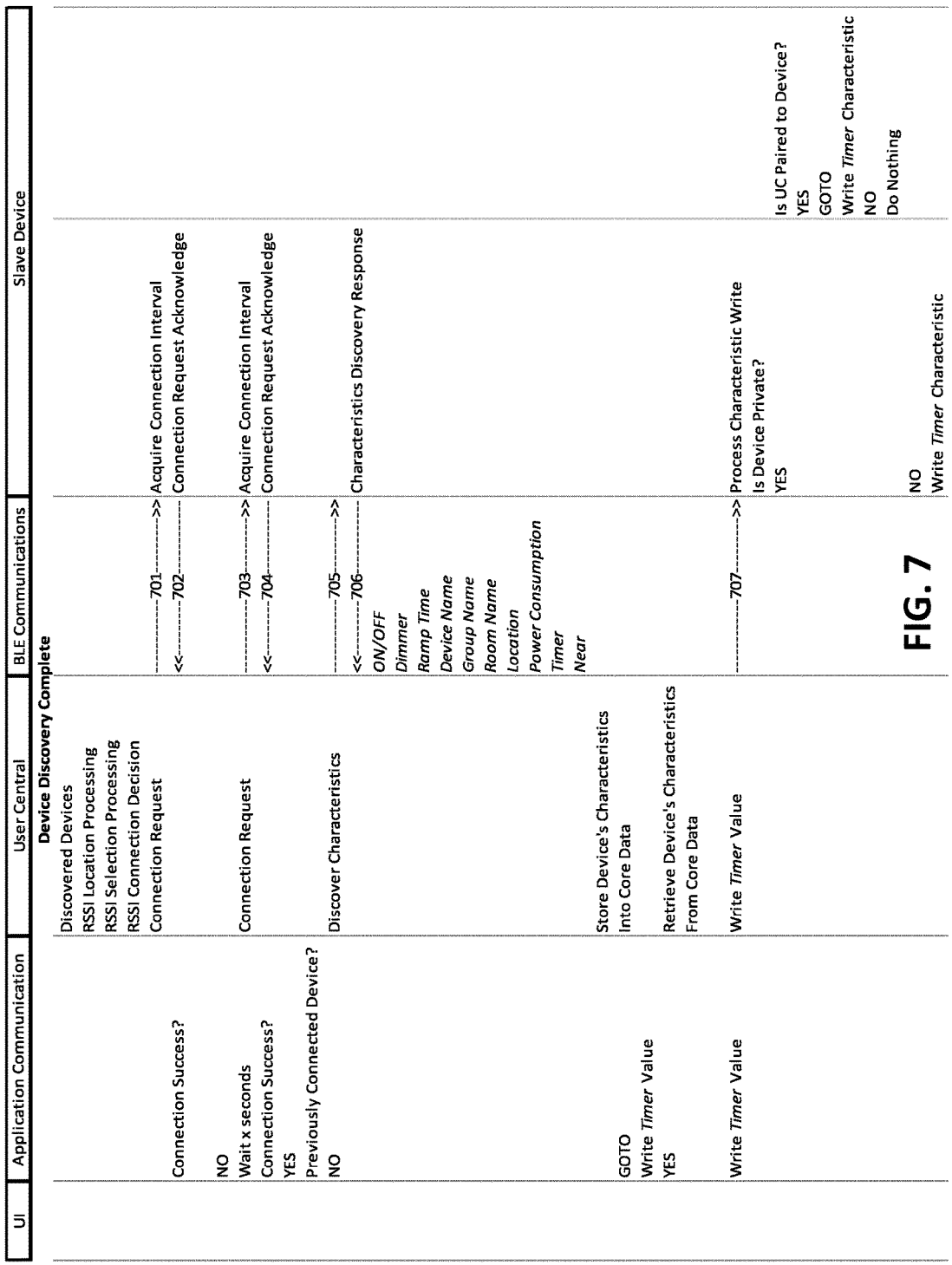
FIG. 7 is a flow diagram of the software/firmware algorithm to establish a proximity based connection between a mobile device and a Slave Device.

Referring to FIG. 7, a flow diagram of interaction between the Application Communication, UC, BLE Communications, and Slave Device (the smart bulb) for a "Proximity" based connection between UC and a Slave Device is defined.

After the Device Discovery is complete, the UC will process all RSSI measurements algorithmically with which to select the nearest devices. Once the nearest neighbors have been prioritized in ranking, the UC will process which Slave Devices to issue Connections Requests. Rules are based on, but not limited to, data from a single Slave Device or data from a set of Slave Devices (i.e., Group or Room).

Once a connection list of Slave Devices has been generated, the UC will request a connection to the Slave Device (701, 703). The Slave device acknowledges the connection request (702, 704) and subsequently follows the UC timing for the connection. When the application detects the connection is successful, the UC will request Discovery Characteristics (705) from the Slave Device. The Slave Device will respond with the handle of the various Characteristics in the Discovery Characteristics Response (706).

After the Characteristics have been discovered, the Application will initiate a write to the Slave Device's local Timer (707), to insure the Slave Device is synchronized to the system time.

Read Device Characteristics

Figure 8:
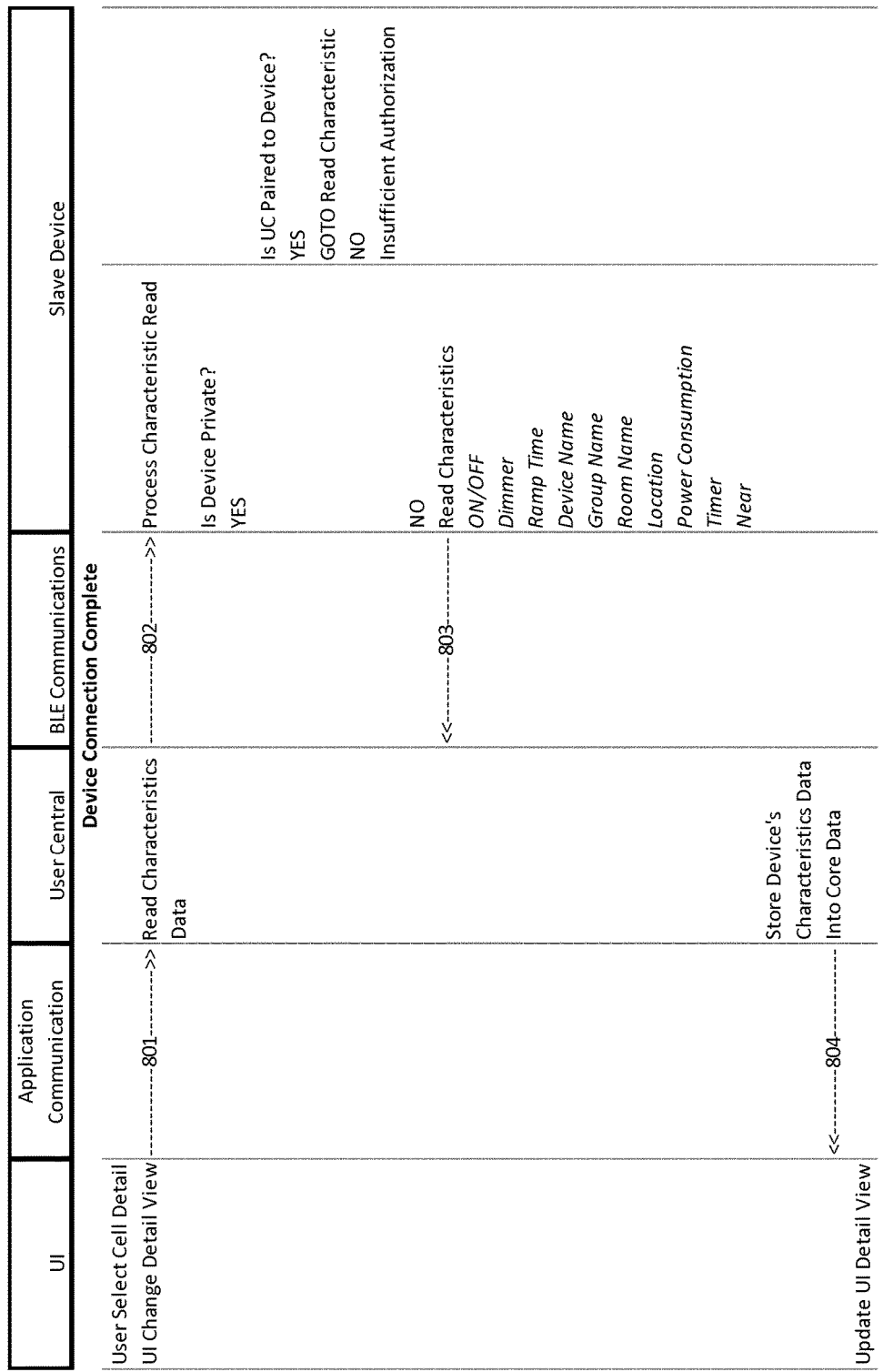
FIG. 8 is a flow diagram of the software/firmware algorithm to read device characteristics.

Referring to FIG. 8, a flow diagram of the interaction between the UI, Application Communication, UC, BLE Communications, and Slave Device (the smart bulb) for a "Read Device Characteristics" is defined.

After the UC has written the Device's Timer characteristic to the Slave Device (see 707, FIG. 7 for details), the UC will remain connected to the Device. The Slave Device will respond to all inquiries coming from the UC. In the example in FIG. 8, the UI has selected the Cell Detail ">" Icon (801) to get the UC to read the characteristics before the Detail View is brought to the foreground. The UC issues a Characteristic Read (802) and the Device will first determine if the Device is configured to be Private. When a device is Private, all Public Characteristics are disabled. Note that this is a behavior of the preferred embodiment, and in many other BLE Slave Device implementations, when the Device is not paired, only the Private Characteristics are disabled, not the Public Characteristics. The UC must be paired to the Device to be able to access Private Characteristics that mirror the functionality of the previous Public Characteristics. If the UC is not paired to the Device then the Device will respond with an Insufficient Authorization message.

If the Device is not configured to be Private, or if it is Private and the UC is paired to the Device, the Device will respond with the requested Device Characteristics Values (803) to the UC. The Application will take the data from the UC (804) and update the UI Detail View based upon the values.

Write Device Characteristics

Figure 9:
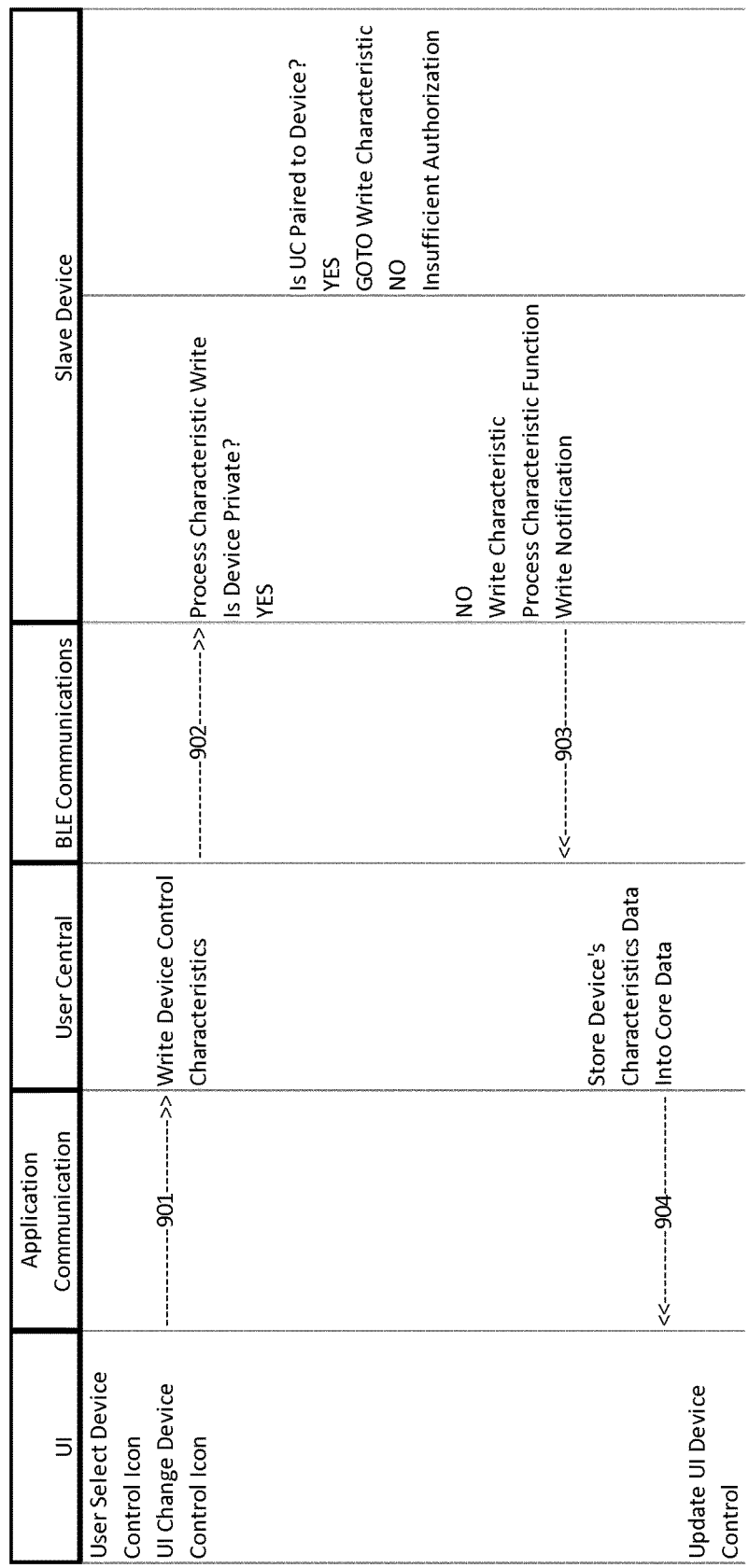
FIG. 9 is a flow diagram of a system algorithm to write a Device Characteristic Privacy Value.

Referring to FIG. 9, a flow diagram of the interaction between the UI, Application Communication, UC, BLE Communications, and Slave Device (the smart bulb) for the "Write Device Characteristic Privacy Value" is defined.

After the UC has written the Device's Timer characteristic to the Slave Device (see 707, FIG. 7 for details), the UC will remain connected to the Device. The Device will respond to all inquiries coming from the UC. In the example in FIG. 9, the user UI has selected the Device Control Icon (901) to get the UC to write a characteristic to the Device. The UC issues a Characteristic Write (902) and the Device will first determine if the Device is configured to be Private. When a device is Private, all Public Characteristics are disabled. Note that this is a behavior of the preferred embodiment, and in many other BLE Slave Device implementations, when the Device is not paired, only the Private Characteristics are disabled, not the Public Characteristics. The UC must be paired to the Device to be able to access Private Characteristics that mirror the functionality of the previous Public Characteristics. If the UC is not paired to the Device then the Device will respond with an Insufficient Authorization message.

If the Device is not configured to be Private or if the Device is Private and the UC is paired to the Device, the Device will process the written Characteristic from the UC. The Device will respond with a notification (903) once the Characteristic is accepted. The Application will take the data from the UC (904) and update the UI Detail View based upon the values.

Write "Walk Away Delay Value"

Figure 10:
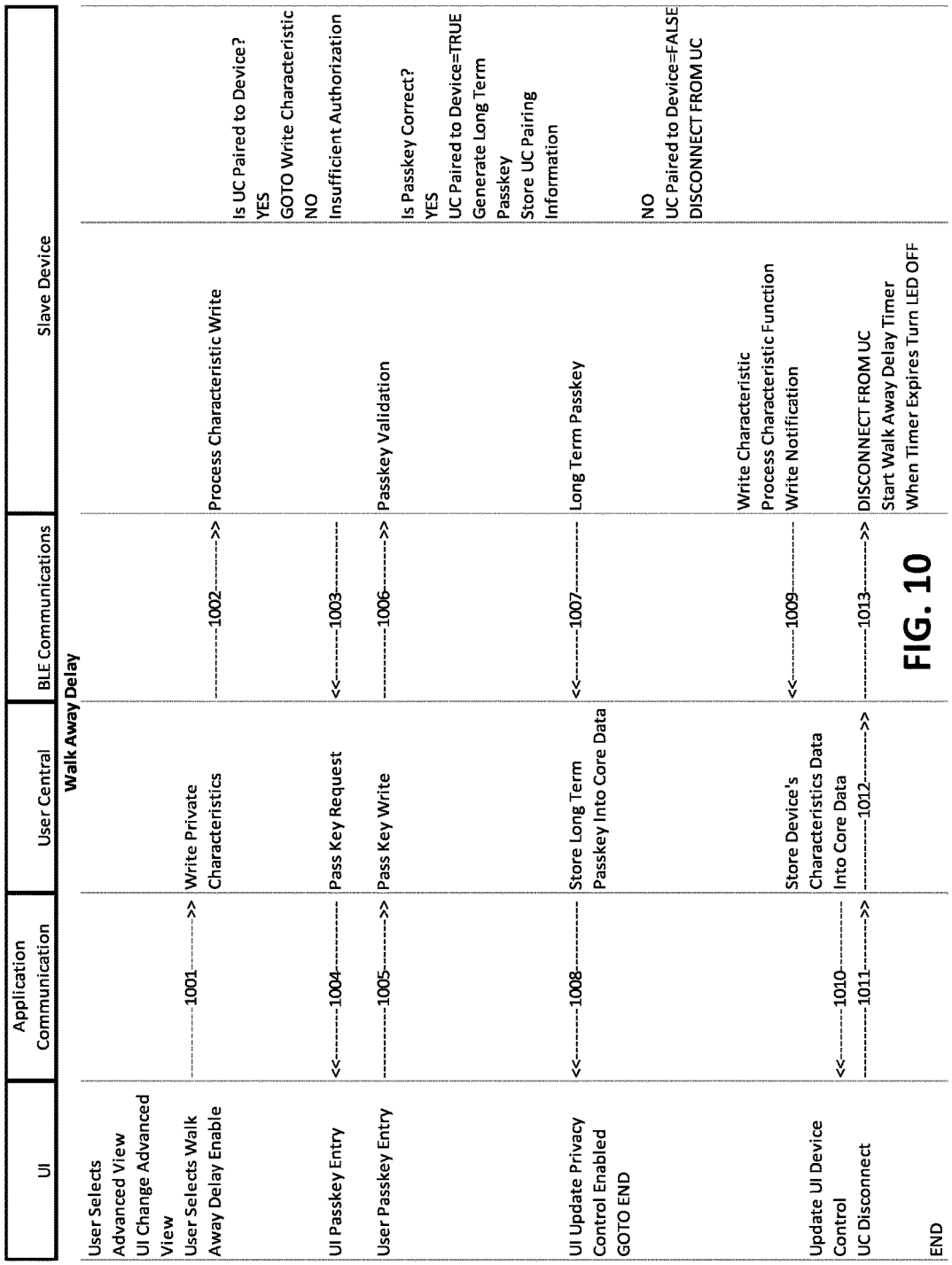
FIG. 10 is a flow diagram of a system algorithm to write a Device Characteristic Walk Away Delay Value.

Referring to FIG. 10, a flow diagram for the interaction between the UI, Application Communication, UC, BLE Communications, and Slave Device (the smart bulb) for the "Walk Away Delay" Value is defined, requiring "Passkey Entry."

In this example, the user UI has selected a specific Device Control Icon (1001) to write the "Walk Away Delay" Characteristic to enable the feature in the device. The UC issues a "Walk Away Enable" characteristic write (1002) and the Device will first determine if the Device is configured to be Private. When a device is Private, all Public Characteristics are disabled. Note that this is a behavior of the preferred embodiment, and in many other BLE Slave Device implementations, when the Device is not paired, only the Private Characteristics are disabled, not the Public Characteristics. The UC must be paired to the Device to be able to access Private Characteristics that mirror the functionality of the previous Public Characteristics. If the UC is not paired to the Device then the Device will respond with an Insufficient Authorization message.

Since the "Walk Away" enable Characteristic is a private characteristic, the UC must be paired to the Device. In this first case, the UC is not paired, and the Device responds with an Insufficient Authorization message (1003). This causes the UC to generate a Pass Key Request (1004) to the UI. The UI responds with the Passkey Write (1005) to the UC, and the UC forwards (1006) this to the Slave Device for processing. The Slave Device validates the Passkey, accepts the pairing request, and generates a Long Term key, which it passes back to the UC (1007) for storage in core data. The UC informs the UI (1008) that the Passkey/Privacy Control request was successful.

With the UC is paired to the Device, the Device will process the written Characteristic from the UC. The Device will respond with a notification (1009) once the Characteristic is accepted. The Application will take the data from the UC (1010) and update the UI Detail View based upon the values.

When the connection is dropped between the UC and the Device (1011, 1012, 1013), the Device will commence the Walk Away Timer. When the timer expires, the smart bulb will turn off.

Public & Private Characteristics

The following is a list of characteristics that are Public (by default) in the disclosed embodiment:
LIGHT_SWITCH
DIMMER_SETTING
STATUS
ACCESS
TEMPERATURE
TIMER_1_ON
TIMER_1_OFF
TIMER_1_DIMMER
POWER_CONSUME
LIGHT_NAME
GROUP_NAME
ROOM_NAME The following is a list of characteristics that are Private (by default) in the disclosed embodiment:
TIMESTAMP
WAL_K AWAY
LIGHT_NAME
GROUP_NAME
ROOM_NAME
TIMER_2_ON
TIMER_2_OFF
TIMER_2_DIMMER
TIME_ON
TIME_OFF
PRIVATE_PAIRING
MANAGEMENT_KEY
PUBLIC_ACCESS
TIMER_1_ENABLE
TIMER_2_ENABLE
DISCOVERED_DEVICES_TABLE
MUSA_STATUS_CONFIG
ACCESS_KEY
MASTER_KEY
ADMIN_KEY
USER_KEY
GUEST_KEY[0 . . . 15]

Specialized Hardware Features

"Momentary On"

A bulb (or appliance) may be momentarily turned on for a programmable period of time based on a numbers of conditions. These include, but are not limited to:

The mobile/app being in close proximity, based on RSSI, but without an active connection;

The mobile/app being in close proximity, as well as authorized, and having the appropriate configuration programmed in both the App and the device;

An instruction by the user via a mobile/app with a connection to the device;

Motion detection (either local or remote);

A push button on the device itself;

Remote access via an Internet, cellular or telephony connection; etc.

Programmable State After Power Outage

The smart bulb can be programmed to return to a default state after a power interruption. For instance, it may be preferable in some situations to have the bulb turn on at full brightness after power is interrupted and then restored. However, in some instances (a vacation home for instance), it may be preferable for the bulb to remain off, and simply resume its original programming. This may also be affected by whether the real time clock (RTC) in the device can be maintained during the power interruption. In one aspect, if the RTC value is lost, such as if the RTC is not battery backed, or the outage is sufficient to drain the RTC backup battery, the default for the device may be to turn on after power is restored. However, if the RTC is battery backed, and upon restoration of power it is still valid, the default for the device may be to turn off (stay off), or resume its normal programmed operation for that time of day (which may in fact be to turn on). A variety of default states can be made available in the event of power fail/restoration, such as turn on at a specified brightness level, blink or flash on/off at a predetermined rate for a predetermined period, set a flag in the device's advertisement data, etc.

Emergency Lighting Capability

Emergency lighting systems are generally intended to provide lighted exits and evacuation paths in the event of a serious emergency, due to power failure. The power failure may be short term, such as minor localized power outage, or possibly of a longer duration, such as a significant natural disaster.

FIG. 3 and the accompanying description details how one preferred embodiment can provide emergency lighting based on monitoring a change in power supply conditions. In another embodiment of the LED bulb, LED smart bulb or smart I/O device, all of the LEDs are simply operated by either the primary power source (typically AC), or in the event of failure of the primary power source, by a secondary power source (typically DC) from an integrated battery, for example. In a further embodiment, the LEDs may be operated at a reduced current drive when operated from the internal battery source, in order to prolong battery life. In yet a further embodiment of the LED bulb or LED smart bulb, the LEDs are separated into at least two groups. These groups may be individual LEDs, or a subset of the LEDs in an array. The (at least) two LED groups are implemented on separate electrical circuits. For example, assume that an LED bulb or LED smart bulb has 4 LEDs, and that a minimum of one of these LEDs can be controlled separately (has its own driver circuit). The primary group of LEDs (generally the larger group), operates as normal from the input power to the LED bulb or smart bulb. The secondary group of LEDs (generally the smaller group), operates as normal when input power to the bulb is present, but also incorporates a power monitoring and battery backup charging function, which both maintains the charge of a rechargeable battery, and acts as a switchover device, in the event of a power failure. In the event of power failure, the power monitoring function detects the failure, and switches the secondary LED group to the battery backup power. The secondary group of LEDs, which remains illuminated during the primary power failure, may be operated at a reduced current drive when operated from the internal battery source, in order to prolong battery life. In this way, an efficient emergency lighting system is provided, which uses lower power during the power outage. Clearly, with the provision of a battery backup, in the case of a smart bulb, additional capabilities can be provided. For instance, the communications functions can be operated from the battery backup (either fully, or at a reduced capability), and in the event that a mobile/app device is sensed, or requests the bulb to change state, the current to the secondary LEDs can be increased, or additional LEDs can be turned on, so that additional lighting can be provided to personnel in proximity to the LED light bulb.

Color Temperature Adjustment of LEDs/Light Output

Specialized LEDs are available which can have their color temperature controlled. In one embodiment of the LED bulb or LED smart bulb, the LEDs are controlled by the user, via the mobile/app, to generate the most desirable light, dependent on time of day, mood, etc. The user may be provided with an App that manually allows adjustment, or it can be programmed to operate automatically under autonomous control of the intelligence of the smart light. The App may offer the ability to adjust the color temperature in terms of absolute Kelvin (K), from say warm white at 2700K, to bright white at 5,000K, or by reference to named lighting effects, such as "incandescent", "halogen", "sunrise", "relax", etc. The light could also be programmed to operate over the circadian rhythm.

Integrated Transducer(s)/Monitors

Transducers may be incorporated into the smart bulb (smart device, or smart I/O device) to monitor light, temperature, motion, voltage, power consumption, sound, etc. The device may collect these events and store them locally, for reporting at a later time, or keep the current state, or the worst case state (including time stamp), and report this when connected. Alternatively, external transducer/detectors may be a transmitting device to indicate the an internal state or condition within the smart bulb or smart I/O device to an external entity, via another means, including (but not limited to) a relay contact, an output voltage or current, or another communications mechanism such as RF, infrared, ultrasonic, optical, etc.

Future Device & App Features

Dimmer Ramp/Fade Rate

The smart bulb can be turned on/off, and brightness up/down, via the ramp or fade rate feature. The following are provided:
1. Turn on to preset dimmer level using Ramp Interval
2. Turn off using Ramp Interval.
3. Turn on or off immediately, ignoring Ramp Interval.
4. Turn on immediately.
5. Treat Ramp Interval as a timer and turn off immediately upon expiration. The intent of this is to support delayed-off application such as motion or photo sensing.

The Ramp Scalar sets the units used to scale the Ramp Duration:
0: Seconds (0-127, range~2 minutes)
1: Tenths of a second (0-127, range 12.7 seconds)
2: Minutes (0-127, range~2 hours)
3: 15 minutes (0-127, range 1905 minutes~31 hours)

Master Controller to a Group or Room

An individual mobile/app may take control of a subset of devices, such as those, which have been associated within a group, or room, whenever it is determined it is present and authorized by appropriate overriding privileges.

"Away Mode"

In the "Away Mode" (or "Vacation Mode"), the user is able to train the App to learn specific behaviors, and have these learned, saved, and played back at another time. For example, in one embodiment, the user sets the App into a "Follow Me" learn mode via the UI. The user then walks a path through the premise. As the user moves through the premise, the mobile/app device associates with proximal controllable devices, these appear to the user on the UI, with prompts as to the identity of the device, and what the user would like to have the device do. For instance, the user may be presented with a smart bulb, with its room name and/or group name, and a list of actions that can be performed, such as (but not limited to) turn on for a timed duration, turn on after a delay, turn on/off based on the current proximity detection of the mobile/app, wait a set or random time, wait for further instruction, wait for the mobile/app to go out of range and come in range again, etc.

In such a way, the App and/or the smart bulb (or device or appliance) can learn the behavior. The user can store the behavior as a named behavior, so that different usage patterns can be learned, recorded, and played back in the future.

An additional layer of interconnect is likely to allow the recording and playback of a learned behavior, such as Internet connectivity to collect and store the behavior, and it would require the devices involved in the learning and playback to all be able to be inter-connected. Solutions to these issues are discussed elsewhere in this disclosure.

Voice Activated Control

Voice activation of an App is already a practical reality using existing smart phone technology. In addition to merely activating the App, once the App has been launched, with an appropriate interface to the App, voice commands can be accepted to directly operate the home automation/lighting automation system. Further, with use of voice recognition, or other security measures to access the smart phone, and with the hierarchical access privileges that are detailed in the disclosed embodiment, the user of one smart phone, can be afforded more, or less accessibility to and/or control of the automation system, dependent on priority, hierarchy, security credentials, etc.

Unauthorized Activity

Depending on the security afforded by a mobile/app device, it is possible to log/record the movements of a mobile device in the premises, as the device is interrogated by other wireless devices as it moves through the premise. This activity can be logged, saved, and/or generate a report of either unauthorized activity (light switched on/off when not supposed to be). SMS text, email, instant messaging, launch of an application program or screen pop-up, or any commonly available message service, can respond by authorizing or denying access. (i.e., tell me when event occurs, allow event and then let me override, don't allow event, etc.)

It may also be possible to capture characteristics of an unauthorized mobile/app device, for use later as potential identification. Such as capture a digital "finger print" of an unauthorized device present in the location, or log the locations where the unauthorized device has been observed, by extracting data from the wireless activity from the device. While this may be a security threat to the data on the smart phone and/or the service provider, this may become a necessary and viable threat or security detection mechanism.

Security & Privacy Characteristics

A host server provides Access Key services, which are used by the UC and Devices to create differentiated levels of access and control. Each UC will be assigned an Access Key value, which, is written by the UC to the device's Access Key characteristic after the connection is established. The Device firmware will use the Access Key value to determine what access and control the UC will have over the device.

There are 4 types of Access Keys described in the preferred embodiment. More or less could be provided. There is a balance between the complexities of managing multi-level security and the need to provide sufficiently differentiated user classes to make them useful.

Each device will support multiple Access Keys. This will permit different levels of access and authorization to specific feature. For instance, a home owner or parent may have full access to all features, but only grant restricted access to children in the household or regular visitors to the household, such as a baby sitter, dog walker, etc.

Master Access Key

There is only one UC that can have a Master Access Key. The UC with the Master Access Key is called the Master UC. It provides unlimited access and control of the smart bulbs (or appliances). A UC with the Master Access Key will be able to change functions such as (but not limited to) Access Keys, Access Key timers, Passkeys, Bulb Name, Group Name, Room Name, Location, Walk Away Delay, Proximity Thresholds, Private Services, Public Services, and other features. In addition, the Master UC will be able to upgrade the firmware in the smart bulbs (or appliances), via the Bluetooth interface.

Administration Access Key

Provides the administration level access and control of the smart bulbs (or appliances). A UC with the Administration Access Key will be able to change Passkeys, Bulb Name, Group Name, Room Name, Location, Walk Away Delay, Proximity Thresholds, Private Services, Public Services, and potentially some other features.

User Access Key

Provides the user level access and control of the bulb. A UC with the User Access Key will be able to change Public Services.

Guest Access Key

Provides time limited guest level access and control of the bulb. A UC with the Guest Access Key will be able to change Public Services for a limited time. When the Master UC programs the Guess Access Key, it will also program Grant Time access value, which determines how long the Guest Access Key is valid. The Master UC is able to assign Grant Time access for an guest user for a specific period, either one time, or at a set time interval on specific day(s), outside of which the Passkey is either expired/retired, or inactive.

Each device will contain in secure memory the Access Key table characteristic values for each Access Key type.

Key Distribution

A Host Server can be instructed to push/program new Access Keys to devices via the Master UC either one time, or periodically. Multiple Guest Access Keys can be programmed into a single device. In order for the UC to update the device's Access Key table characteristic, the Master UC must be connected via secure network connection to the Host Server (via the Internet, cellular network, telephony network, etc.). Once the Master UC has successfully written the Access Key table characteristic to a device, it will indicate to the Host Sever to update all UCs that are part of the system.

Proximity/Indoor Location Operation

A primary objective of the overall system is to be able to change the lighting conditions based on the mobile/app proximity, remote access, access control/authorization and preferences. In the event no access control/authorization difference can be detected, choosing the lighting priority of the mobile/app with the optimal proximity information. Alternatively, overriding the lighting preference of the optimal proximity (closest) device, and returning lighting control to a device with higher access control.

A limitation of Bluetooth in most mobile/app implementations is the restriction on the number of simultaneous connections that can be maintained and/or serviced at any one time. In many implementations, the maximum may be as low as 10, although efforts are underway to grow this significantly, from as low as 20 to as high as 128 (or above). From a practical perspective, it is important for a variety of reasons, to reduce the number of connections. These include moderating the processing power required in the various devices, utilizing the available time slices for communication as efficiently as possible, and to allow physical topology extension of the wireless network.

The Core Connection Handler Architecture

Figure 11:
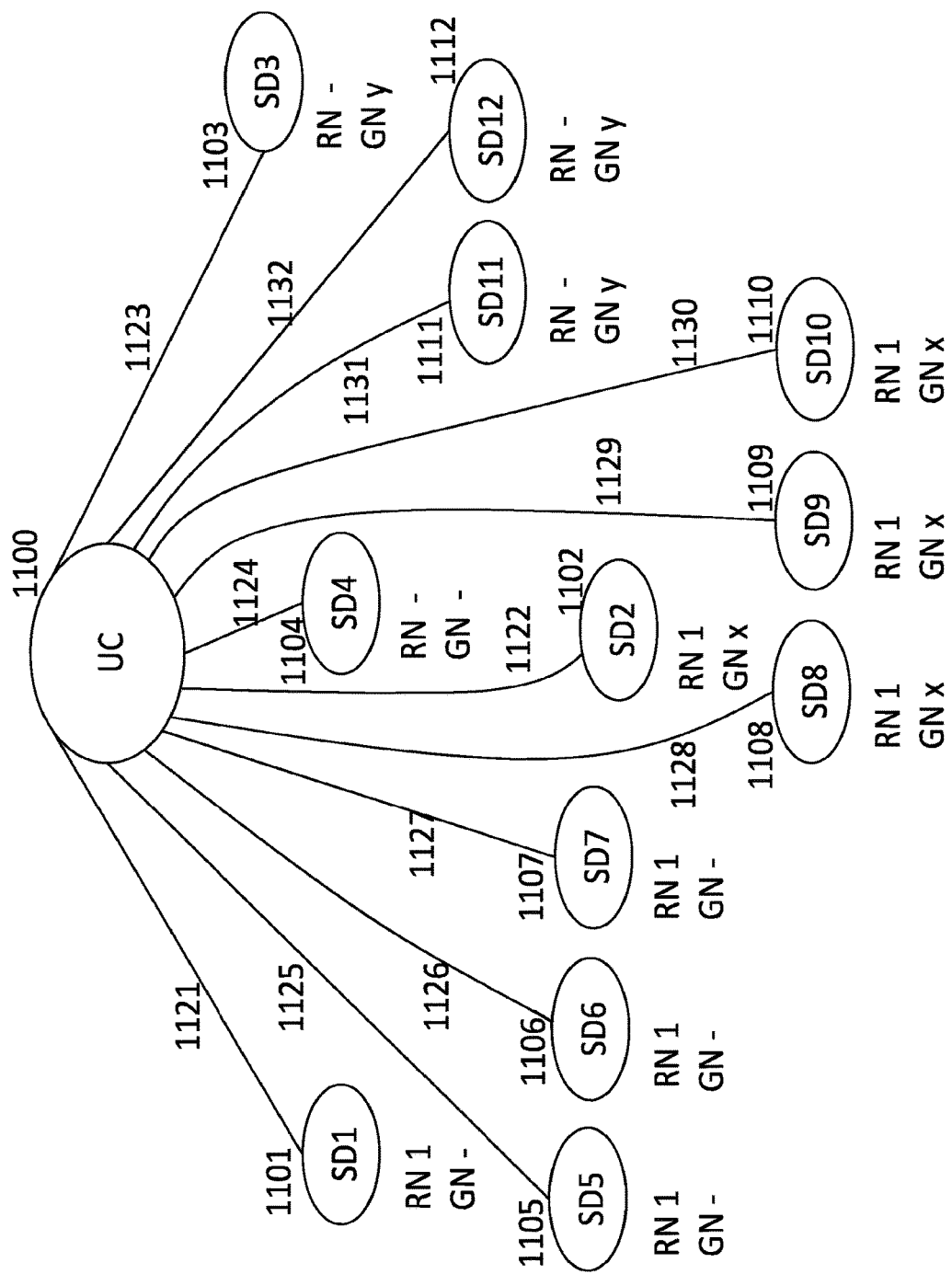
FIG. 11 is simple topology diagram for the interaction between App and Slave Devices.

Referring to FIG. 11, a diagram of the connections between the mobile/app, herein defined as the "User Central", and the smart bulbs (or appliances), herein referred to as "Slave Devices", is shown. This architecture is simple, with only two classes of devices. The UC is the central coordinator that can discover and connect to the in range Slave Devices.

The key objective or use case for the user experience is that as a user moves through their home, the User Central will connect to, and the UI will display, the most geographically relevant devices for control of lighting (and/or other devices) in that location.

Components

The following components are defined in FIG. 11. Members can be a User-Central (UC), or a Slave Device (SD).

A User Central (UC) device is defined as a mobile/app device that coordinates system communications based on user input (via the smart phone or tablet touchscreen), and drives proximity threshold actions. In one embodiment, the User Central device is a smart phone (such as but not limited to, an iPhone or an Android), well known to those in the industry. UC devices will scan to locate advertising Slave Devices. When a UC finds nearby Slave Devices, it will initiate a request to gain more information before creating a connection. Once a connection is established, the UC may already know the device, or if unknown, will retrieve additional information from the Slave Device. A UC is able to communicate with another UC.

A Slave Device is defined as a smart bulb or appliance. A Slave Device will only initiate transmit activity to advertise its capabilities. Otherwise, all other transmissions are the result of an enquiry and/or command initiated by a User Central device.

Advertisement Rules

Slave Devices will transmit advertisement data when not connected to a UC. The advertisement data will include flags that indicate Bulb ON/OFF Status, Bulb Private Status, and Bulb Connection Status. Once a connection with a UC is established, the Slave Device will cease transmission of advertisements, and only respond to routine requests from the UC.

Operational Example

In the event that no UC is present, the Slave Devices operate autonomously. If there is a UC present, it will take control of the configuration of the available in range devices. In the event more than one UC is present, the UCs will coordinate to determine which UC should control which (sub)set of devices, based on a variety of rules.

In the case a new (but authorized) UC attempts to join/configure a network of smart bulbs, each SD will send advertisements, which the UC will receive (for in range SDs), and will attempt to establish a connection with.

Referring again to FIG. 11, the simplistic case is shown where all Bluetooth connections between the User Central (1100) and the Slave Devices SD1 (1101) through SD12 (1112) are mapped one-to-one, each with an individual connection (respectively connections 1121, 1122, 1123, 1124, 1125, 1126, 1127, 1128, 1129, 1130, 1131 and 1132). In this case, there are 12 separate open connections that the User Central has to manage. Under each Slave Device, the Room Name and Group Name associated with each device is listed. For instance, SD1 (1101), SD5 (1105), SD6 (1106) and SD7 (1107) have Room Name set to "1", but no Group Name assigned (in the nomenclature for FIG. 11, the "-" symbol implies unassigned). SD2 (1102), SD8 (1108), SD9 (1109) and SD10 (1110) have Room Name set to "1", and Group Name set to "x". SD3 (1103), SD11 (1111), and SD12 (1112) have Room Name unassigned, and Group Name set to "y". While SD4 (1104) has both Room Name and Group Name unassigned.

Smart Home Overlay Architecture

Figure 12:
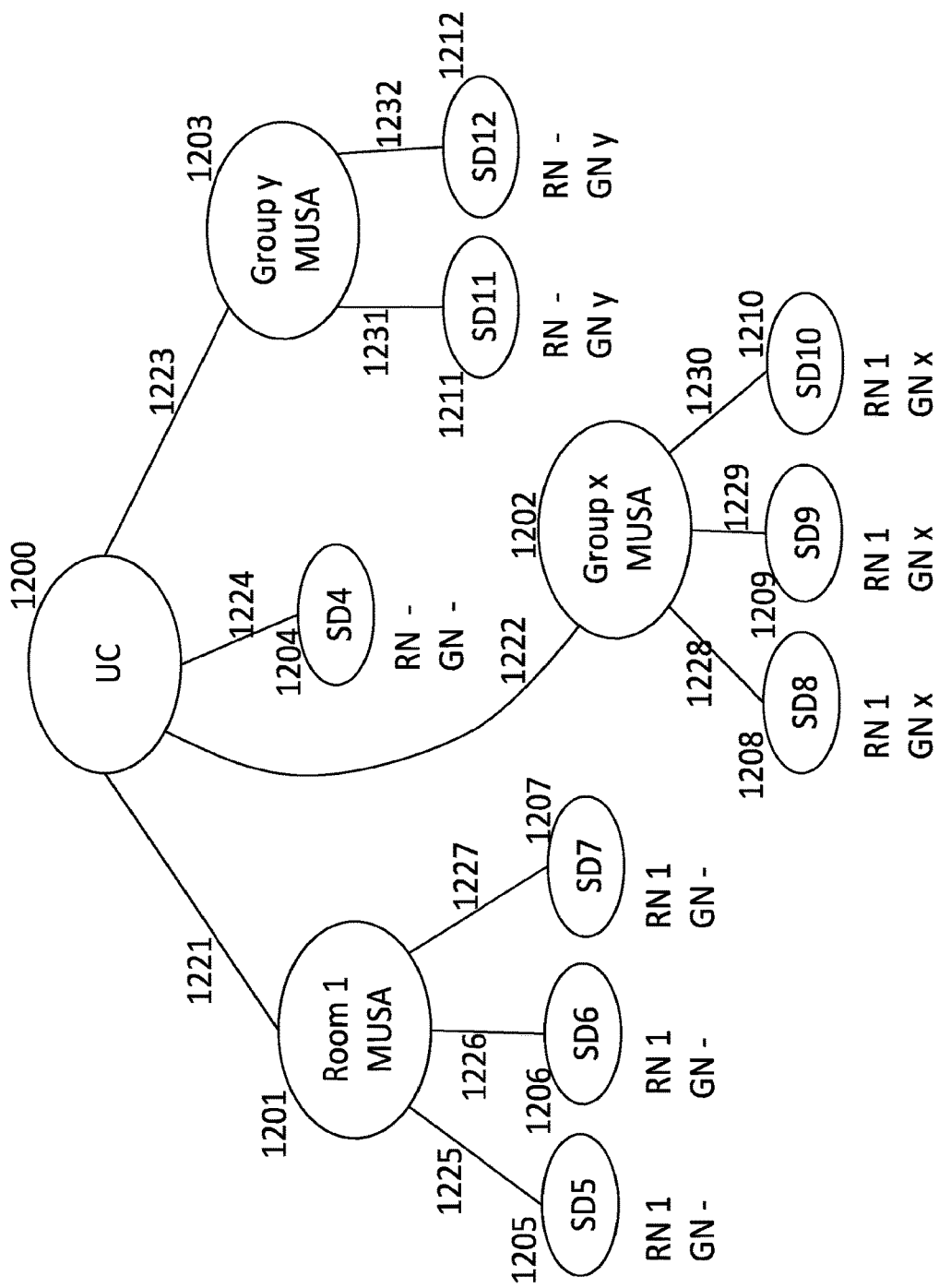
FIG. 12 is simple topology diagram for the interaction between App and Dual Mode Devices.

Referring to FIG. 12, an alternate diagram of the connections between the User Central and the Slave Devices, is shown. The architecture is more advanced, introducing a third class of device. It is the UC that can discover and activate the additional capabilities of the new devices, and configure the topology to optimize connections to the in range devices. This enhanced functionality is referred to as the Smart Home Overlay (SHOL) protocol.

The key objective or use case for the user experience remains that as a user moves through their home, the User Central will connect to, and the UI will display, the most geographically relevant devices for control of lighting (and/or other devices) in that location.

Components

The following components are defined in FIG. 12. Members can be a User-Central (UC), a Master Unified Slave Arbiter (MUSA), or a Slave Device (SD).

A User Central (UC) device is defined as a mobile/app device that coordinates system communications based on user input (via the smart phone or tablet touchscreen), and drives proximity threshold actions. In one embodiment, the User Central device is a smart phone (such as but not limited to, an iPhone or an Android), well known to those in the industry. UC devices will scan to locate advertising Slave Devices. When a UC finds nearby Slave Devices, it will initiate a request to gain more information before creating a connection. Once a connection is established, the UC may already know the device, or if unknown, will retrieve additional information from the Slave Device. A UC is able to communicate with another UC.

A Slave Device is defined as a smart bulb or appliance. A Slave Device will only initiate transmit activity to advertise its capabilities. Otherwise, all other transmissions are the result of an enquiry and/or command initiated by a User Central device or a MUSA device.

A MUSA device is a "dual mode" Bluetooth device, embedded within a smart bulb or appliance. This is to say that it capable of operating as a normal Slave Device, or (based on UC configuration) as an intermediary between the User Central device and other Slave Devices. In the MUSA (non Slave Device) mode, it acts as a master coordinator to other Slave Devices, and as a Slave Device to the User Central. The MUSA will relay commands from the Used Central, to the Slave Devices in its group, and will also relay advertisements and responses back from the Slave Devices in its group, to the User Central. The MUSA is also able to act as a downstream group multicast replicator, for messages from the UC, directed to the Slave Devices in the MUSA's Group(s). This allows the UC to send one message to a Group (turn on/off light, for instance), and the MUSA replicates this to the appropriate Slave Device connections beneath it.

Two types of MUSA devices are defined, a Room MUSA and a Group MUSA. Note that the terms Room and Group are actually attributes of the MUSA that are assigned by the App, for the convenience of the User Interface, and there is no implementation difference. However, there are differences in the operation of the MUSA dependent on this attribute.

The Room MUSA maintains connections and coordinates all communications to the lower hierarchy connections within the same Room Name, which can consist of Group MUSAs within a Room Name, and Slave Devices that are members of the same Room Name, but are not members of a Group Name.

The Group MUSA maintains connections and coordinates all communications to lower hierarchy connections within the same Group Name, which consist of Slave Devices that are part of the Group MUSAs own Group Name.

Advertisement Rules

MUSA devices will transmit advertisement data when connected or not connected to other devices. The advertisement data will include flags that indicate it is a MUSA device, Bulb ON/OFF Status, Bulb Private Status, and Bulb Connection Status.

Slave Devices will transmit advertisement data when connected or not connected to other devices. The advertisement data will include flags that indicate it is a Slave Device (non MUSA device), Bulb ON/OFF Status, Bulb Private Status, and Bulb Connection Status. A Slave device that is connected to a UC or MUSA will set a "Connected" bit in its advertisement data. When this bit is set, another UC or MUSA receiving the advertisement data will not attempt to establish a connection to it. An optional feature for a Slave Devices is to suppress advertisement data, if it has established an active connection with another device (UC or MUSA).

The SHOL protocol and messaging establishes some additional rules:

1. The maximal hierarchy of the topology is 2 MUSAs. The UC connects to a Room MUSA, which connects to one or more Group MUSAs below it, which connects to SDs. The reduced topology of a UC, connected to a Group MUSA, connected to SDs is also supported.
2. A Room MUSA cannot connect to another Room MUSA, and a Group MUSA cannot connect to another Group MUSA (loop prevention).
3. Any device, whether UC, MUSA or SD, can only support a single connection to another device at any one time (duplicate path control).
4. A UC or MUSA receiving an advertisement with the Connected bit set; will not attempt to initiate a connection with the device.
5. UC to UC communication is permitted/required (UC hand off/exchange).

Operational Example

Referring to FIG. 12, the alternate SHOL approach is taken, where more intelligence is applied to the problem, with an understanding of the user needs, and the typical spatial layout of a household. In the following example, the topology configuration decisions are made by the UC, acting as the centralized administrator. It is the UC that can discover and activate the additional capabilities of the (dual mode) MUSA devices. This functionality, combined with additional connectivity rules, form the basis of the Smart Home Overlay (SHOL) protocol.

In the event that no UC is present, the MUSA and Slave Devices operate autonomously. If there is a UC present, it will take control of the configuration of the available in range devices. In the event more than one UC is present, the UCs will coordinate to determine which UC should control which (sub-)set of devices, based on a variety of rules.

In the case a new (but authorized) UC attempts to join/configure a network of smart bulbs, or if a UC with the Smart Home Overlay (SHOL) protocol is initially learning the device characteristics of a network with SHOL enabled devices, the Bluetooth network will essentially behave as in the case of FIG. 11, where each SD will send advertisements, which the UC will receive (for in range MUSAs and SDs). In this phase, any MUSA devices will be operating in their Slave Device mode, but indicating in their advertisement they are "MUSA capable".

Once the UC has gathered information from the available MUSA and Slave Devices, it will decide, based on Room and Group membership, RSSI, and device capabilities, how to configure the MUSA devices, to guarantee connectivity to all in range devices, and to minimize connections to itself. In one embodiment, this may be performed with the user operating the mobile/app, to perform "RSSI Fingerprinting" (see additional explanation in "User Central System Proximity Acquisition & Rules").

In FIG. 12, the UC has configured MUSA devices (1201, 1202, and 1203) to intercede between the UC (1200) and the multiple Slave Devices SD5 (1205) through SD12 (1212). Now, the User Central (1200) has only 4 separate open connections to manage, shown as connection 1221 to Room 1 MUSA (1201), connection 1222 to Group x MUSA (1202), connection 1223 to Group y MUSA (1203), and connection 1224 to SD4 (1204).

Slave Devices SD5 (1205), SD6 (1206) and SD7 (1207) will have open connections (1225, 1226 and 1227 respectively) to Room 1 MUSA (1201) and optionally may suspend (or not be capable of) sending advertisement data. Similarly, Slave Devices SD8 (1208), SD9 (1209) and SD10 (1210) will have open connections (1228, 1229 and 1230 respectively) to Group x MUSA (1202); Slave Devices SD11 (1211) and SD12 (1212) will have open connections (1231 and 1232 respectively) to Group y MUSA (1203), and optionally may suspend (or not be capable of) sending advertisement data. Room 1 MUSA (1201) will aggregate data from SD5 (1205), SD6 (1206) and SD7 (1207), and report it to the UC (1200) when requested. Similarly, Group x MUSA (1202) will aggregate data from SD8 (1208), SD9 (1209) and SD10 (1210); Group y MUSA (1203) will aggregate data from SD11 (1211), SD12 (1212); and will report this data to the UC (1200) when requested. Slave Device SD4 (1204) retains a single direct connection (1224) to the UC (1200).

Figure 13:
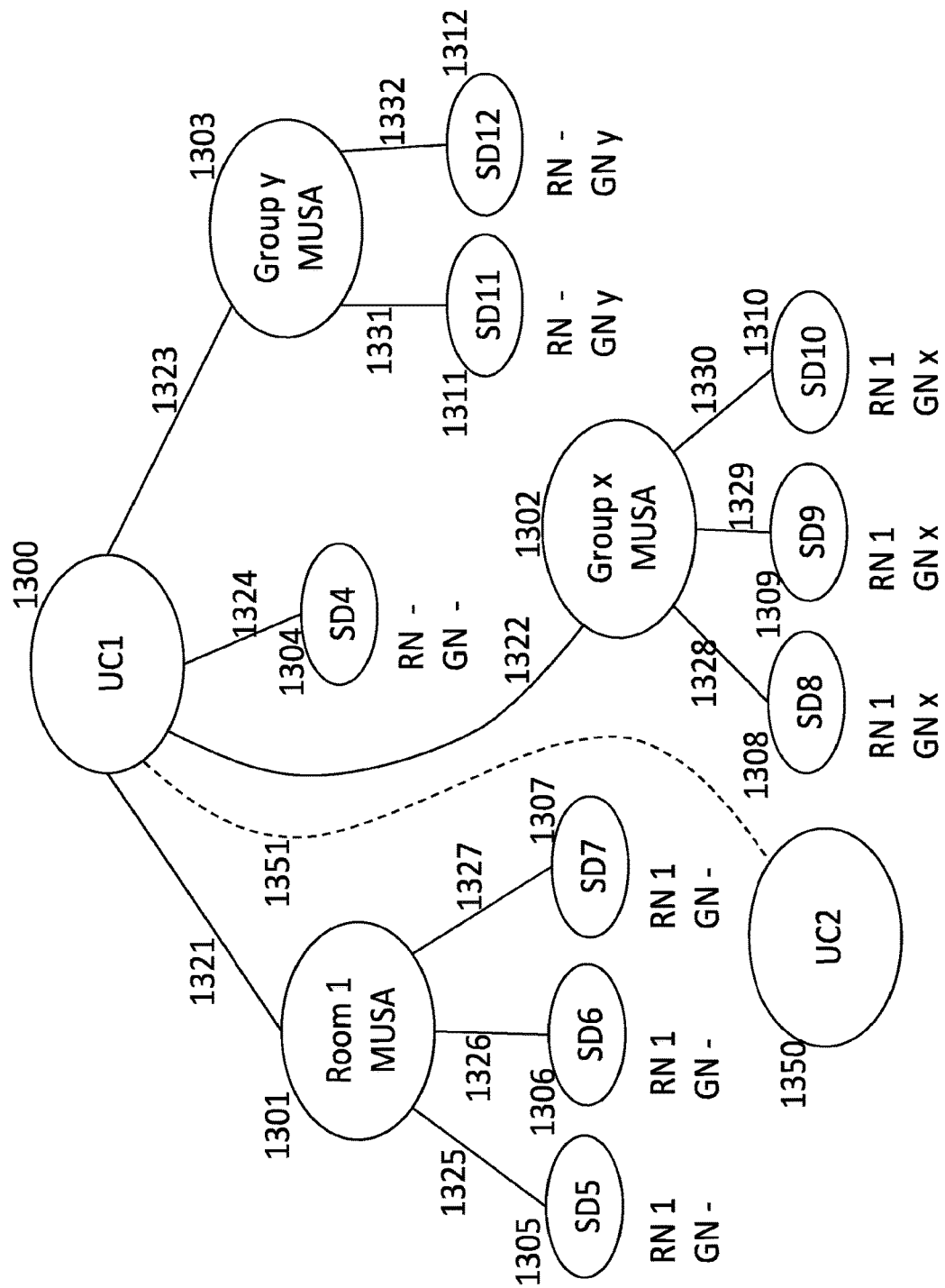
FIG. 13 is a simple topology diagram for the initial phase of User Control hand-off.

FIG. 13 shows an example of two UCs in the premise, and the hand-off process as UC2 (1350) takes control of Group x MUSA (1302) from UC1 (1300). In this example, UC1 remains connected (1321) to Room 1 MUSA (1301), which in turn maintains Slave Devices SD5 (1305), SD6 (1306) and SD7 (1307) via their connections (1325, 1326 and 1327 respectively); UC1 remains connected (1323) to Group y MUSA (1303), which in turn maintains Slave Devices SD11 (1311) and SD12 (1312) via their connections (1331 and 1332 respectively); and UC1 (1300) remains connected (1324) to SD4 (1304).

UC1 (1300) still maintains an open connection (1322) to Group x MUSA (1302). In this example, UC2 (1350) has entered the proximal area near Group x MUSA (1302), and will scan for devices, by monitoring the connections (or advertisements, if supported while connected) between Group x MUSA (1302), and Slave Devises SD8 (1308), SD9 (1309) and SD10 (1310). UC2 (1350) will build a table populated with data such as Room and Group membership, RSSI, device capabilities, to the extent it is able using the advertisements available. At this time, UC2 (1350) will not attempt to connect to any devices, since they will be advertising they are already connected (or there will be no advertisement from the device).

UC2 (1350) will establish a temporary connection (1351) to UC1 (1300), and their tables will be compared. Based on predefined rules (see additional explanation in "User Central System Proximity Acquisition & Rules"), UC1 (1300) and UC2 (1350) will determine which device will control the devices that are duplicated in the tables.

In this example, it is assumed that UC2 (1350) is elected as the correct master for Group x MUSA (1302), and UC1 breaks its connection (1322) to Group x MUSA (1302). Prior to a connection being established between Group x MUSA (1302) and UC2 (1350), Group x MUSA (1302) maintains connections (1328, 1329 and 1330) to SD8 (1308), SD9 (1309) and SD10 (1310). UC2 (1350) now breaks the temporary connection (1351) with UC1 (1300).

Figure 14:
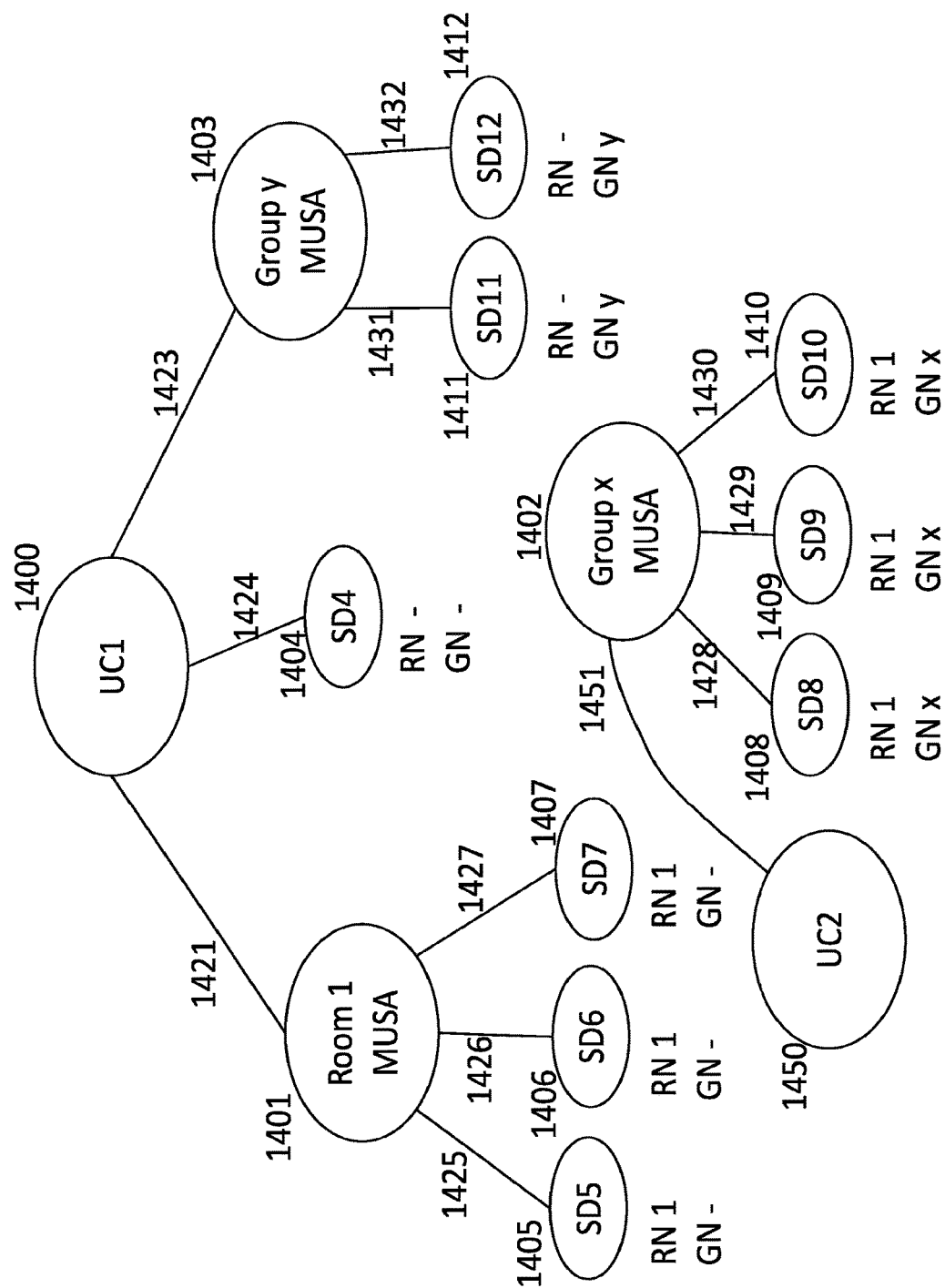
FIG. 14 is a simple topology diagram for the completion phase of User Control hand-off.

Referring to FIG. 14, UC2 (1450) now has no connection to UC1 (1400), and has established a connection with Group x MUSA (1402) via a new connection (1451). In this example, UC1 remains connected (1421) to Room 1 MUSA (1401), which in turn maintains Slave Devices SD5 (1405), SD6 (1406) and SD7 (1407) via their connections (1425, 1426 and 1427 respectively); UC1 remains connected (1423) to Group y MUSA (1403), which in turn maintains Slave Devices SD11 (1411) and SD12 (1412) via their connections (1431 and 1432 respectively); and UC1 (1400) remains connected (1424) to SD4 (1404).

In an alternate embodiment, in the event two UC devices were unable to directly connect to each other, a special request may be made to a MUSA local to the new (not connected) UC, to tunnel a "reconfiguration request" to the remote UC, to allow table entry exchange.

User Central System Proximity Acquisition & Rules

Each Slave Device and MUSA Device will measure the RSSI value of all in range devices, and maintain a "Discovered Devices" table consisting of the names of the devices and their corresponding filtered RSSI value. Filtering of the RSSI value for each in range device is necessary, in order to estimate the relative proximity, in the presence of errors including noise, and is a well-known technique used in guidance, navigation and control systems. Such filtering algorithms include, but are not limited to, band pass filter, Kalman filter, recursive total least squares filter, double exponential smoothing filter, or other filtering/estimation techniques.

Devices are made aware of other devices by entries in the RSSI table; entries are present even if a device does not have an active connection.

A variety of rules can be used to control the hand-off between UCs, these include:
1. First come first served—the UC that established the connection to the SD/MUSA first, retains control.
2. Access Key priority based—the UC with the highest Access Key priority level to the SD/MUSA retains or takes control.
3. RSSI based—the UC with the highest RSSI level to the SD/MUSA retains or takes control.

The User Central retrieves the Discovered Devices table from MUSA devices or Slave Devices either directly or via a MUSA device. The User Central will request MUSA and Slave Devices with an established open connection directly; otherwise, it will use a MUSA to proxy the request to Slave Devices it does not have an open connection to. The User Central uses the Discovered Devices table data to calculate the relative distances between all the devices within a location, based on an algorithm such as, but not limited to, Trilateration based RSSI, Dead reckoning, Neural Networks, and RSSI Fingerprinting.

In one embodiment, "RSSI Fingerprinting" can be as simple as having the user place the UC in a room or location in the premise, where the user would normally be, such as watching TV, or lying in bed. The user would activate the "Finger Printing" capability in the App, and wait a short time while the UC established connections and relative RSSI values to the proximal devices. The user would enter the location of the Room or Group, corresponding to an existing named Room or Group in the App. When the App returns to the location at a future time, and sees substantially corresponding devices and RSSI values, it will automatically present the user with the appropriate menu on the UI to control the location. In another embodiment, the App may suggest to the user the Room or Group that it believes it is in, based on the Room/Group device associations. In this way, the user may determine that the current Finger Printing location is non-optimal to control the Room or Group.

User Central System Proximity Determination

It is desirable to have the UI of the User Central device, present the user with the most relevant room control screen, as the user roams the premise. For instance, if the user is in the family room of the premise, and this can be determined, then it would be desirable to present control of the lighting (or other functions) relative to this location. One method to calculate the User Central location is to use a token based system such that higher RSSI devices will be counted with more weight over a period of time called the "Convergence Period". The convergence period is chosen as a number of "x" samples, such that measured and weighted RSSI data is summed up in buckets for each known Group Name and Room Name. With each new sample, the Room Name and Group Name RSSI convergence period buckets are updated to reflect the inputs from the latest "x" samples [where x=any integer number dependent on noise environment, and other factors]. The decision rule to determine which Room Name and/or Group Name is the closest to the User Central device, is derived from the Room/Group Name with the highest RSSI value, and this will be the default UI view displayed to the user, when the UI is in the "Auto Mode". Auto Mode is selected by the user via the UI, and enabled on a User Central basis for a specific location.

Reverse Proximity Control

There is a desire to allow a User Central device that has no connection established with a Slave Device, to still be able to control limited aspects of the Slave Device based on proximity. A typical example would be an authorized user, who is returning to the premise and wants some lights to turn on automatically, but has not activated the App, or the App is in the background and is not actively searching for connections.

The User Central must preconfigure this capability, at a time when it has an established connection, and has the appropriate privileges via Access Key control. The User Central writes a Private Characteristic called the "Action Key" to the Slave Device(s) and/or MUSA(s) that are required to have this feature. The user must also program the desired feature that it to be programmed (such as turn on a light). The Action Key provides the seed association for a Secure Rolling Code Algorithm, similar to that used in garage door openers. The User Central and the Slave Device(s) and/or MUSA(s) will now be trained to each other.

When the "Reverse Proximity" advertisement feature is enabled in the App, the User Central will continue to periodically generate an advertisement containing a unique key, even when the App is turned off or in the background. The advertised key is used to signal nearby Slave Devices and/or MUSA devices to execute the specific programmed action (such as turn on a light), without a connection between the devices being established. The frequency of the transmission of the advertised key is programmable, and can be varied over a wide range (320 ms to >30 s) dependent on the application and environment.

In another embodiment, the Slave Device that is programmed for Reverse Proximity operation will also generate a message to any attached Room or Group MUSA, with which the Slave Device does have a connection. The Room or Group MUSA will replicate this message to other Slave Devices in the peer Room or Group. Hence, the lights in an entire room or area can be turned on by programming a single Slave/MUSA Device.

Future UI Features

User Central UI Views

Top View

Figure 15:
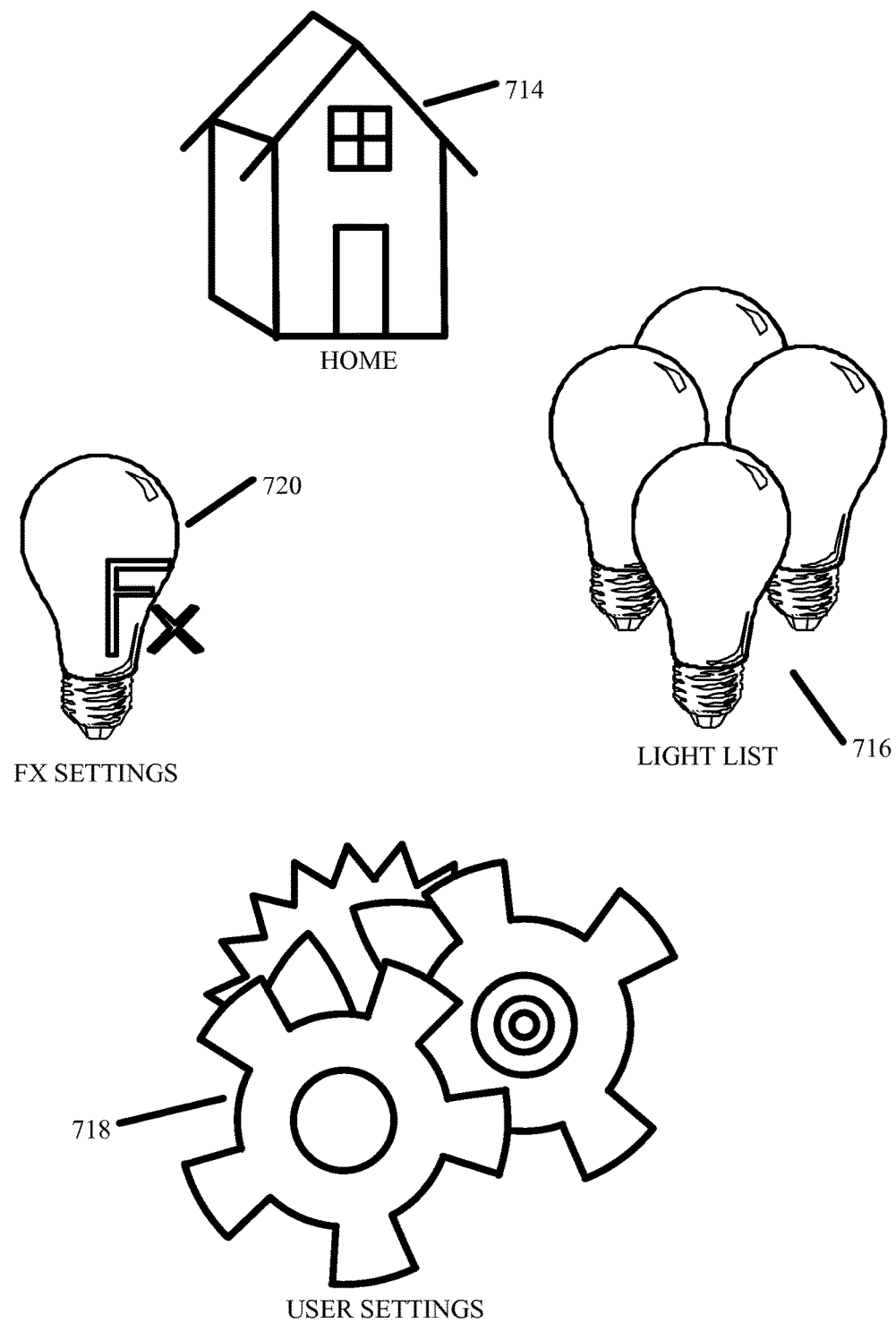
FIG. 15 is a view of the Top View of the Smart Lights App.

The following components are defined in the Top View of FIG. 15. The Top View of the Smart Lights App contains four icons. The top icon is an icon of a home (714). The right icon is an icon of four bulbs (716). The bottom icon is a picture of Gears (718). The left icon is a picture of a Bulb with the 3D letters FX or with animated effects (720). Each of the icons will bring a specific user view to the foreground.

Figure 16A:
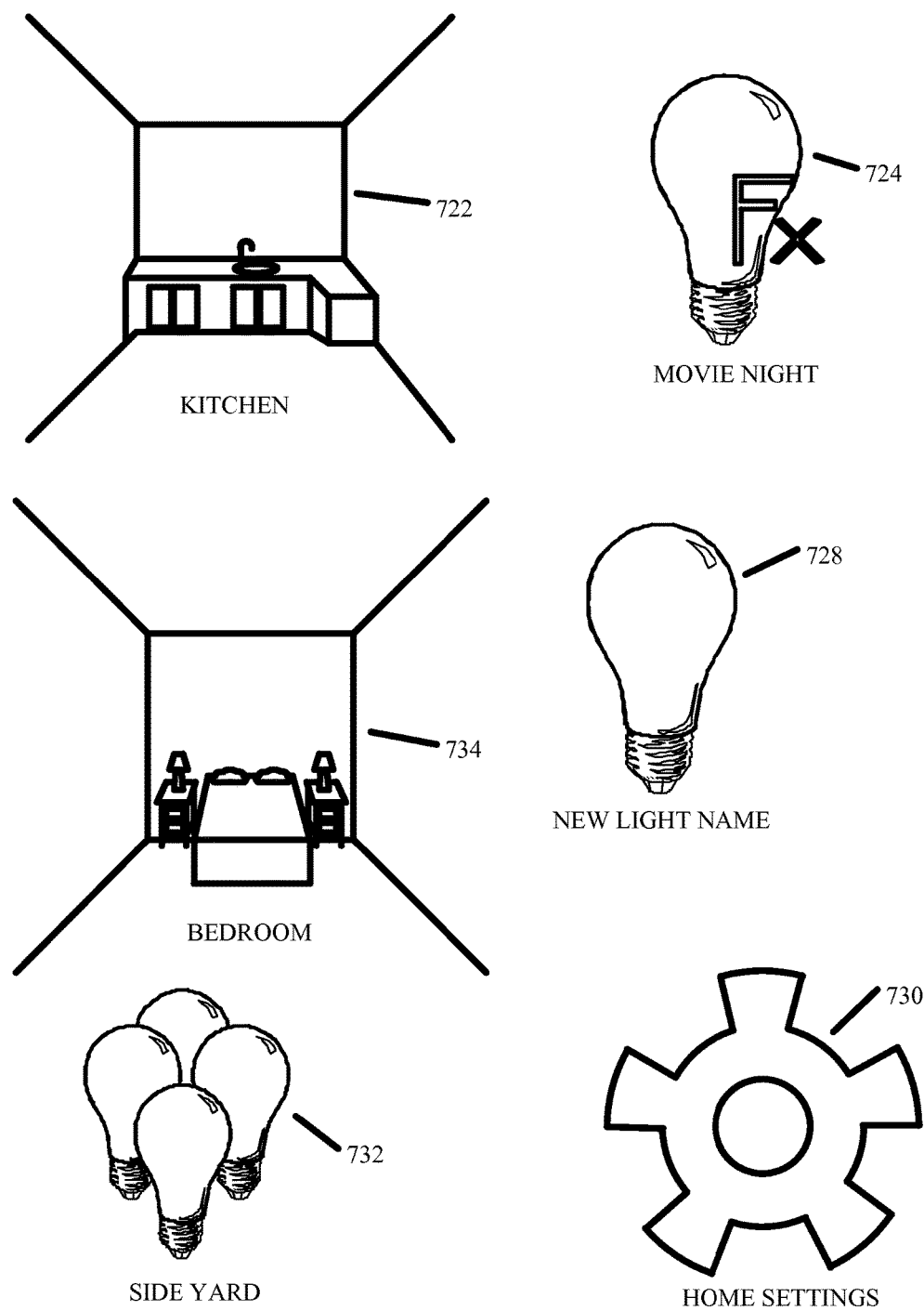
FIG. 16A is a view of the Home View of the Smart Lights App.

The Home icon (714) when selected goes to Home View in FIG. 16A.

The Group Of Bulbs icon (716) when selected goes to Main View (such as the UI formatting depicted in FIG. 5B).

The Gear icon (718) when selected goes to the User Settings View of the application of similar design as FIG. 5O.

The Bulb FX icon (720) when selected goes to FX List View (not shown but described later).

Home View Icons and Functions

The following components are defined in the Home View of FIG. 16A. The Home View shows a collection view of the rooms of the home (722, 734), the groups of lights with the room name home (732), FX of lights at the home level (724), bulbs with the room name equal to home or are not assigned to groups or rooms (728), and the Gear icon (730).

The displayed room, group and bulbs will have a name below the icon.

Figure 17:
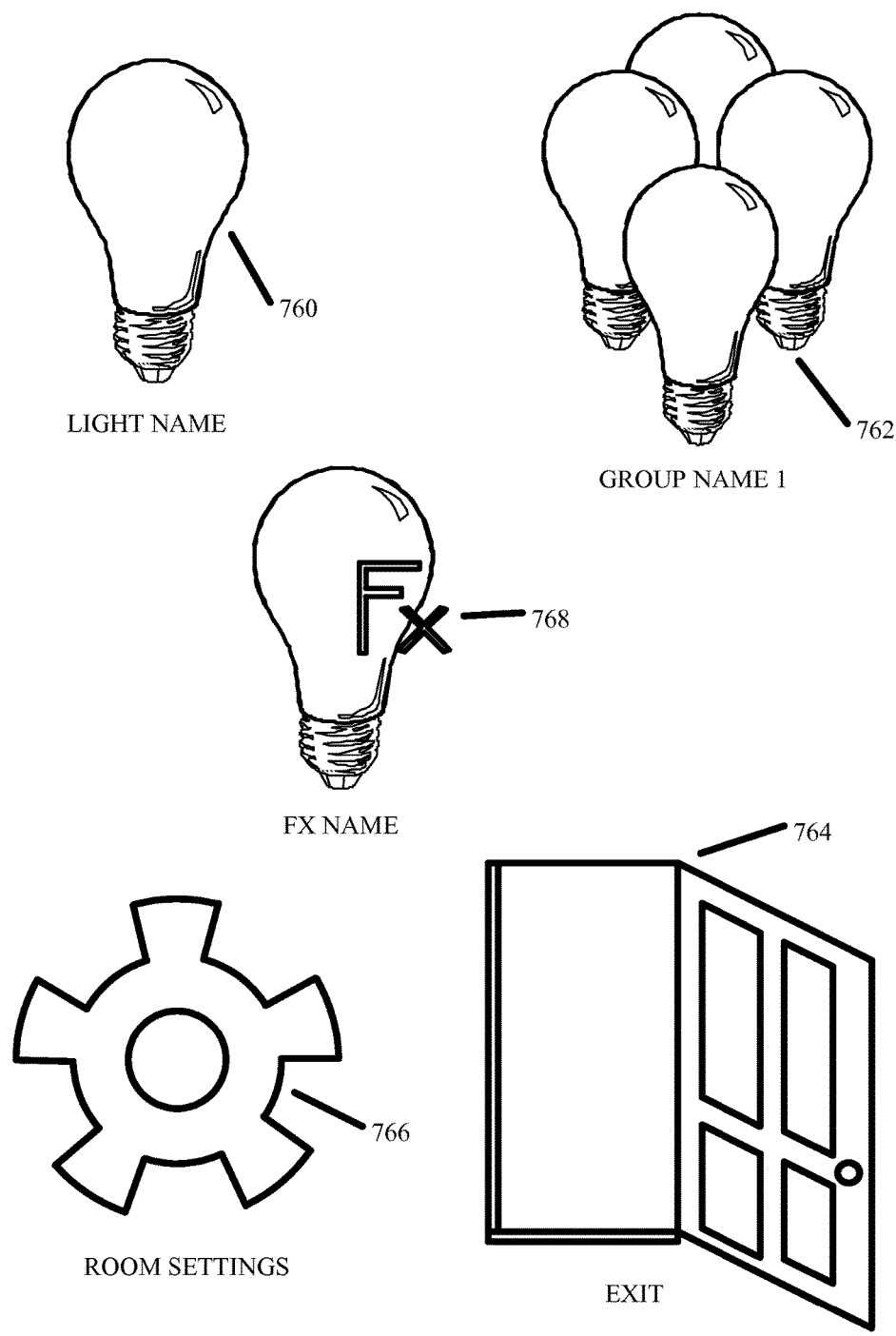
FIG. 17 is a view of the Room View of the Smart Lights App.

The Room icon (722, 734) when selected goes to the Room View FIG. 17.

Figure 18:
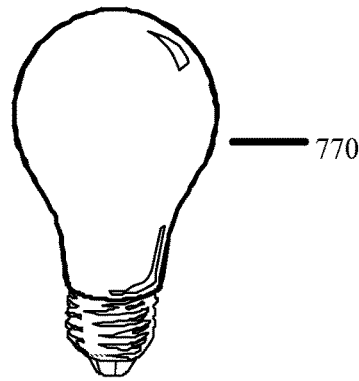
FIG. 18 is a view of the Group View of the Smart Lights App.
Figure 18:
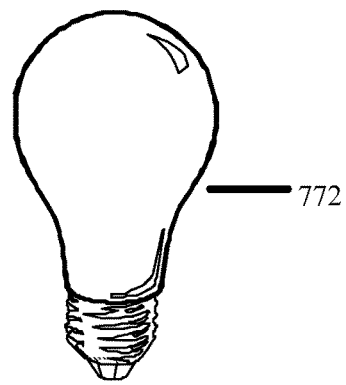
Figure 18:
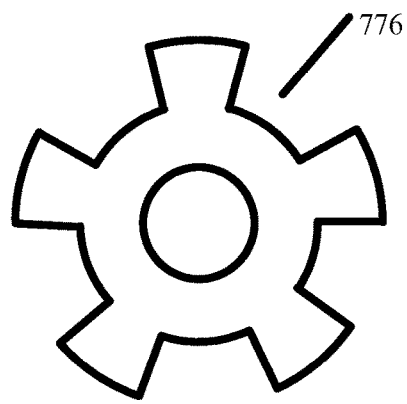
Figure 18:
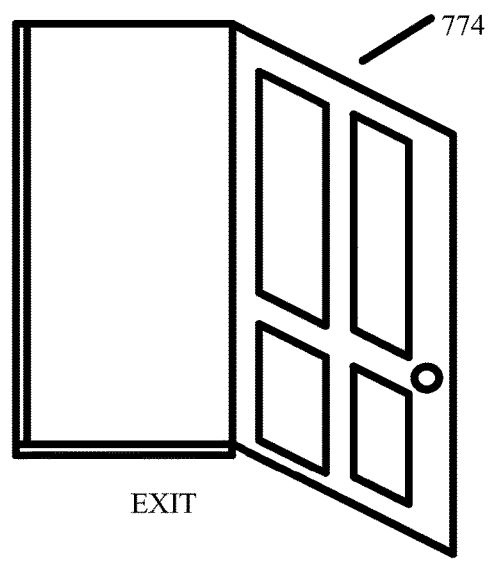

The Group icon (732) when selected goes to the Group View FIG. 18.

The Bulb icon (728) when selected goes to the Detail View (such as FIG. 5T).

There can be numerous FX icons (724) each with a unique name below.

The FX icon (724) when selected implements the pre-saved configurations.

Also visible in the Home View is the Settings Gear icon (730). The Gear icon (730) when selected goes to the Home Control View to be implemented similarly to FIG. 16B.

Home Control View Icons and Functions

Figure 16B:
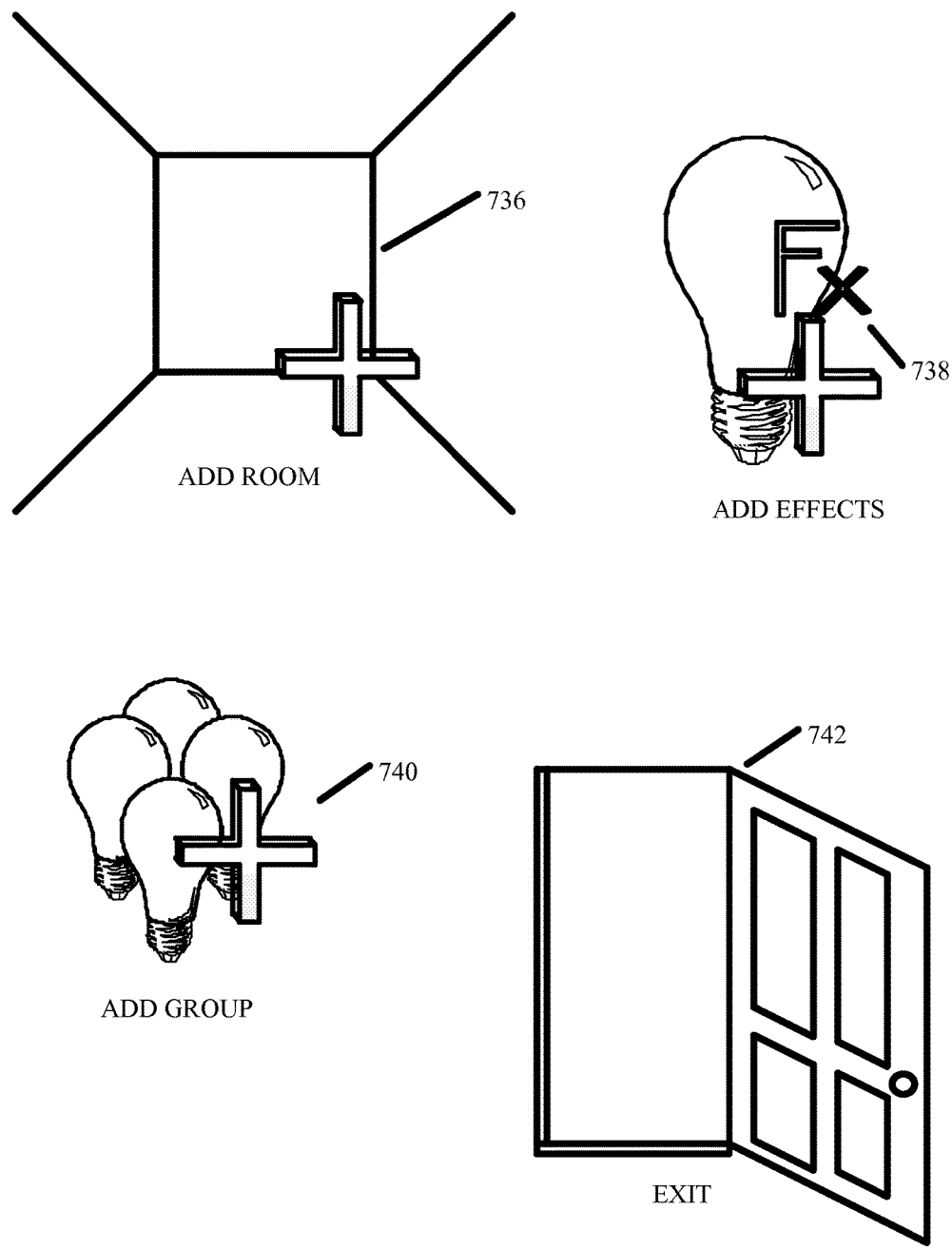
FIG. 16B is a view of the Home Control View of the Smart Lights App.

The following components are defined in the Home Control View of FIG. 16B.

ROOMplus icon (736) when selected goes to RoomCreateView (not shown) to create a room level item and a new room icon will appear in the Home View of FIG. 16A.

GROUPplus icon (740) when selected goes to a GroupCreateView (not shown) to create a group level item with the Room Name "Home" and a new group icon will appear in the Home View of FIG. 16A.

FXplus icon (738) when selected goes to a FXCreateView (not shown) to create a snapshot of all the current light settings in the home and a new FX icon will appear in the Home View FIG. 16A from which the snapshot can be played.

EXITdoor icon (742) when selected goes to Home View of FIG. 16A. If an item is dragged over to the ExitDoor icon (742), it will be deleted. An alternate embodiment is to touch the icon and hold down until all the items "wiggle" and a small "x" appears in the top left corner of the icon—when the user selects the small "x" the icon is deleted.

Room View Icons and Functions

The following components are defined in the Room View of FIG. 17. The Room View shows a collection view of the groups of lights (762) with the same group name and room name, bulbs with the room name (760) and FX icon of the room (768).

The displayed groups and bulbs will have a name below the icon.

The Group icon (762) when selected goes to the group view FIG. 18.

The Bulb icon (760) when selected goes to the Detail View (such as FIG. 5T).

There can be numerous FX icons (768) each with a unique name below. The FX icon (768) when selected implements the pre-saved configurations.

The Gear icon (766) when selected goes to the Room Settings View (not shown but described). The following Room Setting View controls are defined. GROUPplus icon (similar embodiment to FIG. 16B, 740) when selected goes to a GroupCreateView (not shown) to create a group level item with the Group Name "#user input" and a new group icon with the name "#user input" will appear in the Room View of FIG. 17. FXplus icon (similar embodiment to FIG. 16B, 738) when selected goes to a FXCreateView (not shown) to create a snapshot of all the current light settings in the room (all bulbs with the Room Name) and a new FX icon with the name "#user input" will appear in the Room View of FIG. 17 from which the snapshot can be played. EXITdoor icon (similar embodiment to FIG. 16B, 742) when selected goes back to the Room View of FIG. 17.

The EXITdoor icon (764) when selected goes to the Home View of FIG. 16A. If an item is dragged over to the ExitDoor icon (764), it will be deleted. An alternate embodiment is to touch and hold down the icon until all the items "wiggle" and a small "x" appears in the top left corner of the icon—when the user selects the small "x" the icon is deleted.

Group View Icons and Functions

The following components are defined in the Group View of FIG. 18. The Group View shows a collection of lights of the group name (770, 772), the EXITdoor (774), and Gear (776) icons.

The displayed Bulb icons (770, 772) will have a name below the icon.

The Bulb icon (770, 772) when selected goes to the Detail View (such as FIG. 5T).

There can be numerous FX icons each with a unique name below (not shown in FIG. 18 but similar embodiment to FIG. 17, 768).

The FX icon when selected implements the pre-saved configurations.

The Gear icon (776) when selected goes to the Group Settings View (not shown but described). The following Group Setting View controls are defined. Bulbplus icon (not shown) when selected shows a list of available bulbs that can be added to the group. GROUPplus icon (similar embodiment to FIG. 16B, 740) when selected goes to a GroupCreateView (not shown) to create a group level item with the Group Name "#user input" and a new group icon with the name "#user input" will appear in the Group View of FIG. 18. FXplus (similar embodiment to FIG. 16B, 738) when selected goes to a FXCreateView to create a snapshot of all the current light settings in the group (all bulbs with the Group Name) and a new FX icon with the name "#user input" will appear in the Group View of FIG. 18, from which the snapshot can be played. EXITdoor icon (similar embodiment to FIG. 16B, 742) when selected goes back to the Group View of FIG. 18.

EXITdoor icon (774) when selected goes to Room/Home View, dependent on which view was used to enter the Group View. If an item is dragged over the EXITdoor icon (774), it will be deleted. An alternate embodiment is to touch and hold down the icon until all the items "wiggle" and a small "x" appears in the top left corner of the icon—when the user selects the small "x" the icon is deleted.

FX List View

FX List View will list all of the effects from the Top View, Home View, Room View, and Group View.

There are numerous gestures that are unique to the embodiment, such as:

1. Touch—Toggles On or Off RoboSmart Devices that are members of the Room, and enables a dimmer control panel below the selected items.
2. Two finger tap brings up a slider, then Single Finger Slide for Dimmer control for RoboSmart Devices that are the Slave Device or members of the Room or Group.
3. Double finger touch slide across the icon controls the dimming for the RoboSmart Devices.
4. Double Tap—Executes an action (go into a home, room, group, exit, etc.).
5. Hold Item—Brings up ability to delete an item by putting an "x" in the upper left hand corner of the icon.

Future Topology, Routing & Range Extension Features
Bluetooth Dynamic Automation Network (BDAN)

Bluetooth (BLE) devices are used in direct, point-to-point connections today. In lighting and other automation tasks, however, this topology is range-limited and cumbersome. The Dynamic Automation Network addresses these issues.

In traditional BLE operation, a Peripheral device advertises a set of capabilities. A Central devices scans for Peripheral advertisements and establishes connections with desired peripherals. Once a connection is established, the Central and Peripheral devices can exchange data. Typical implementations are restricted to small numbers of peripherals, generally less than 10, connected to a Central device. The Peripheral device must be in close relative proximity to the Central device, limited by radio signal strength. In the event the Central device wishes, an operation to occur simultaneously on multiple Peripheral devices there is no mechanism to do so, making it difficult to perform an operation such as dimming a number of lights in unison.

The Bluetooth Dynamic Automation Network (BDAN) utilizes the existing BLE devices and protocols to form physical connections and introduces a new logical "Transport" layer, implemented on the BLE devices in software, to address these issues.

In a BDAN, standard BLE devices are considered "slaves" and operate using their standard protocols and capabilities. BLE devices augmented with BDAN support, termed Master Unified Slave Arbiters ("MUSAs") are deployed and can automatically discover each other, and any slaves in radio proximity. The MUSAs organize themselves into a transport network, allowing themselves and the slaves to be discovered by any BLE device within radio proximity of any MUSA, extending the effective BLE range, limited only by the maximum number of network hops permissible for a given application. Slave devices remain in a connected state with their corresponding MUSA. The MUSA in turn may be connected to other MUSA devices or to a User Central (UC). Connections are established through the BDAN, across MUSAs to slaves.

A physical device, such as a light bulb, may implement both MUSA and slave functionality. In the descriptions that follow there is a logical separation of MUSA and slave role, but there may or may not be physical separation.

Figure 19:
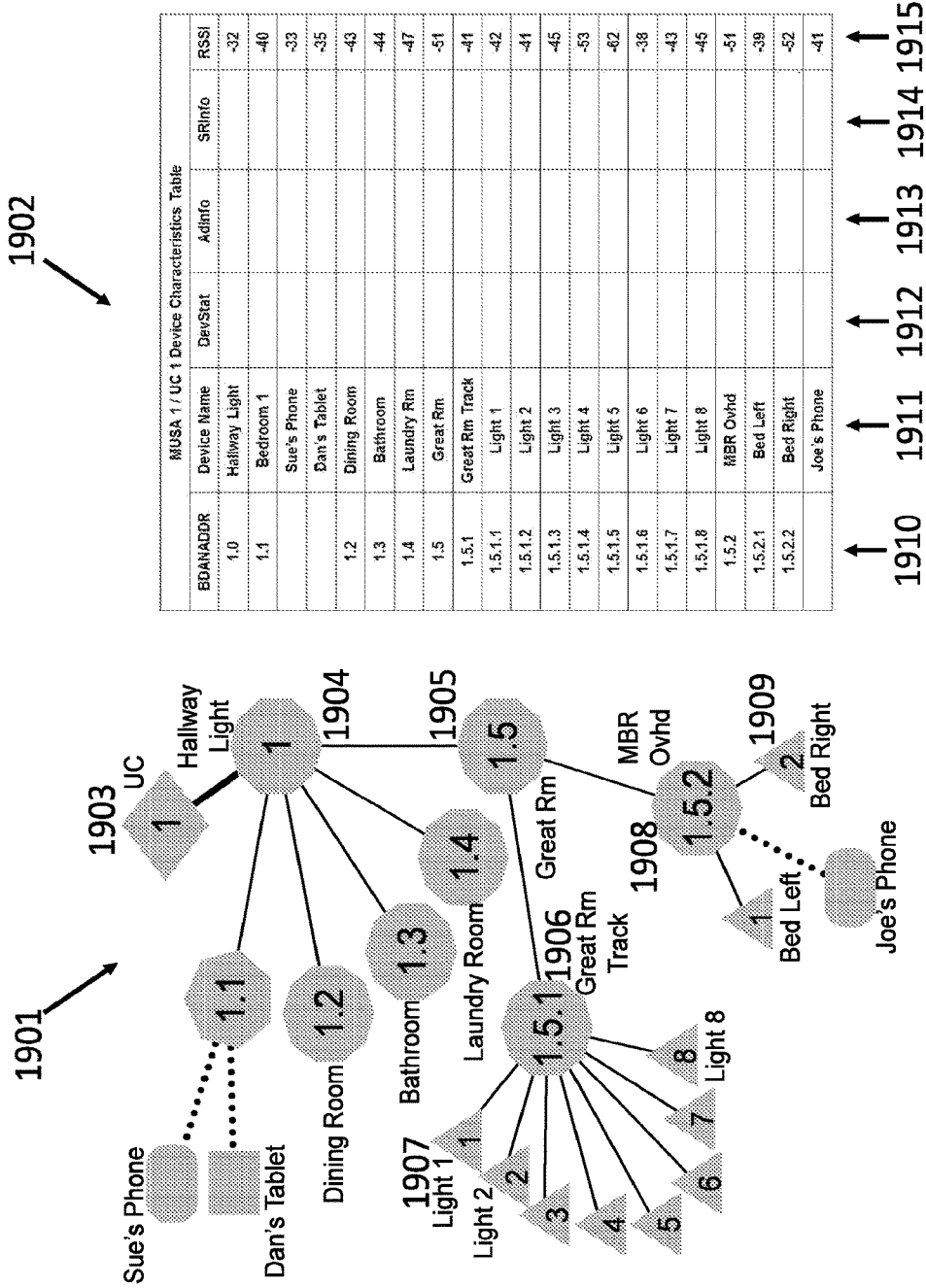
FIG. 19 is an example of the Device Characteristics table.

Each MUSA maintains a Device Characteristics Table ("DCT") which allows it to make intelligent packet forwarding decisions for each subtended slave device. FIG. 19 shows the topology of an example home automation network (1901), as well as the organization of some of the information contained in the DCT (1902) for each device, which typically includes:

Device Name (1911)—The BLE Device Name of the slave.
Connection Status (not shown)—An indicator of the connection status of the peripheral. A status of CONNECTED indicates the slave is currently connected to a UC. An AVAILABLE status indicates the slave is available for use by a UC.
BDAN Address (BDANADDR) (1910)—A 2 byte value organized as 4 four-bit fields, providing an address space of $16^4$ directly addressable entities. This address is used for routing within the BDAN. For example, the connection path to reach Light 1 (1907) for UC1 (1903) is defined by Hallway Light (1904), Great Rm (1905), Great Rm Track (1906), finally to Light 1 (1907). Similarly, the connection path to reach Bed Right (1909) for UC1 (1903) is defined by Hallway Light (1904), Great Rm (1905), MBR Ovhd (1908), finally to Bed Right (1909). The BDAN Address is allocated only when the Slave is connected to the MUSA. A generic BLE device may exist in the DCT with no connection for purposes of remote discovery. Only BDAN-aware slaves will receive an address.
Group Membership (not shown)—A 2 byte value denoting the groups to which a slave belongs. The Group Membership value comprises room and scene information.
BLE Device Address (not shown)—The native BLE device address.
Receive Signal Strength Indication (RSSI) (1915)—The weighted average of the most recent window of signal strength measurements.
Advertisement Info (AdInfo) (1913)—All information carried in the slave's Advertisement packets.
Scan Response Info (SRInfo) (1914)—All information carried in the slave's Scan Response packets.
Device Status (DevStat) (1912)—Device specific status including alarm indications.

An UC application which normally scans for BLE peripherals may, upon detection of a MUSA, initiate a new command to enumerate the slaves of that MUSA ("Device Discovery"). In response to this command, the MUSA will send a "Device Characteristic Report" to the UC containing the contents of the DCT. A UC may then initiate a connection with any slave device which both has a network connection and an UNCONNECTED connection status.

This embodiment dynamically creates a mesh by measuring the proximity of slave devices to MUSA devices and creating appropriate transient connections from the MUSA to multiple slaves supporting the forwarding of messages.

When a MUSA is deployed (a "new MUSA") it begins scanning for slave devices and other MUSAs ("existing MUSAs"), building a database containing identification and signal strength of discovered devices. A negotiation process then occurs between the new and existing MUSA devices to identify the most appropriate MUSA for control of each slave device. The new MUSA reads the signal strength table from each existing MUSA and identifies all slave devices for which it has greater signal strength than any existing MUSA. For each such slave device, the new MUSA connects with the existing MUSA currently controlling the device and initiates a takeover of the slave device. Prior to initiating a takeover, a number of signal strength samples are collected to prevent spurious takeover attempts.

After the deployment process is complete, the MUSAs will periodically execute the scan and takeover process, continually migrating slave devices to the MUSA with the highest signal strength. The frequency of the scan and takeover process is implementation dependent. The initial implementations will scan at a rate not to exceed every 10 minutes (the "scan interval"). Since it is undesirable to have multiple MUSAs scanning at the same time, each MUSA will negotiate a start time within the scan interval (a "scan timeslot") for its scanning process. Two MUSAs may not initiate a scan within 1 minute of each other. In networks larger than 8 MUSAs the scan interval must be increased appropriately.

All slave devices that participate in the BDAN must be connected to a MUSA. In the event a MUSA is capacity limited and cannot accommodate all the slave devices for which it has the highest signal strength it shall not initiate a takeover on any slave device for which it does not have capacity. It is possible that a slave device is unreachable through the BDAN in the event it is only visible to one MUSA and that MUSA is out of capacity. A MUSA shall give priority to such slave devices over devices with multiple available paths.

Once the BDAN is established a UC can use the BDAN Mesh to exchange BLE messages with any connected slave device as if the device were directly connected. The data available from the Signal Strength Report contains all information advertised by every slave device, and the connection to each device is pre-established.

Cloud Connectivity

The BDAN provides connectivity within a property to local BLE devices. To extend control remotely, or to provide interoperability with Wi-Fi and other legacy networks an "Intelligent Gateway" is required. The Intelligent Gateway supports the connection of a remote UC to the BDAN and also supports reporting from Slave and MUSA devices to cloud based data collection services.

When used as a remote application the UC inserts a "tunneling shim" on the BLE API calls, redirecting the API invocations over TCP/IP to an Intelligent Gateway co-located with the BDAN. The Gateway executes the BT API calls on behalf of the remote UC and returns the results. Operational parameters must be adjusted to account for significantly longer latency. This method of operation supports control applications and connectivity between remote UC's and BDAN Slave Devices.

For data collection applications it is desirable for Slave Devices to send unsolicited status reports to the cloud for archival purposes. This requires the establishment of a connection from the Slave to the data repository. For this application the Intelligent Gateway is configured with the parameters for the repository. Status updates from the Slave to the Gateway are forwarded automatically to the repository.

Examples of data reported include instantaneous and interval based power consumption and control events (on/off, parameter setting).

Analysis of the collected data is anticipated to result in the discovery of power and device utilization patterns, and correlation of usage patterns with external climatic conditions and other events. Cloud based and controller based applications are expected to use this information to improve energy efficiency and user experience in residential and commercial deployments.

Looking at usage patterns over time for autonomous control, i.e., turn on coffee pot when the master bath shower light/fan is on.

Commercial & Business Applications
Commercial & Industrial Lighting

Figure 20:
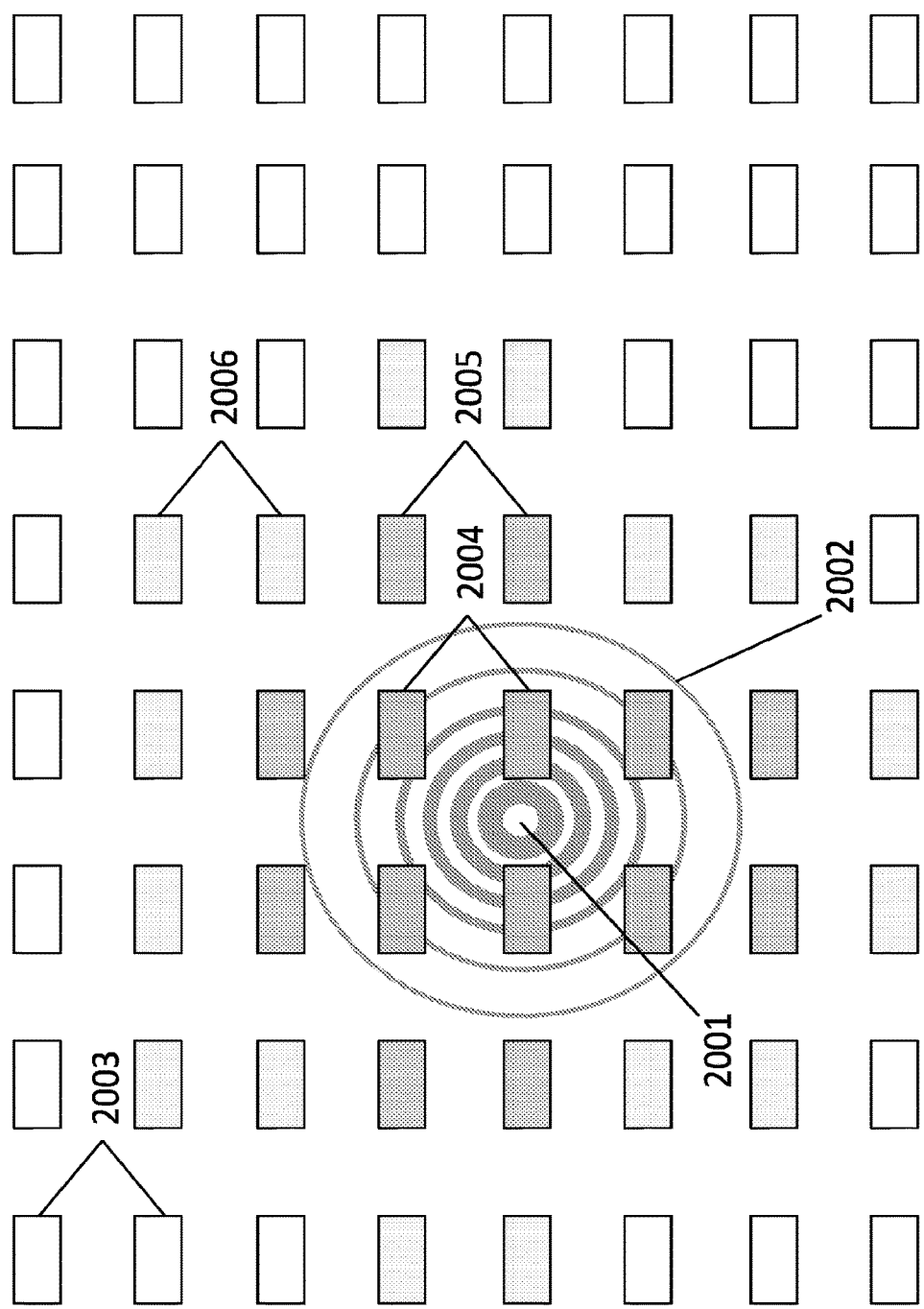
FIG. 20 is an example of a commercial/industrial application for the technology.

Referring to FIG. 20, a simplistic diagram of a large floor space area is shown, such as a commercial building office, warehouse, data center or the like. The user (2001) with their associated mobile/app or fob/app, moves through the location. An oversimplification of the RF signal pattern emanating from the mobile/app or fob/app is approximated by the concentric circles (2002). The lighting fixtures (2003) are distributed throughout the celling space in the location in rows/columns, as is typical in such facilities. Each of the light fixtures (2003) are equipped with an embedded version of the BT Module (or substantially equivalent), as disclosed in FIG. 3B, suitable for control of such lighting fixtures. As the user moves through the location, the proximity of the user's mobile/app or fob/app is detected by the light fixtures nearby. In the example in FIG. 20, it can be seen by the shading level, that the number of light fixtures that illuminate the area around the user can be dependent on the RSSI observed by the light fixture. For instance, the closest light fixtures (2004) see a high RSSI value, other light fixtures (2005) see a medium RSSI value, and yet other light fixtures (2006) see a low RSSI value. By adjusting the proximity controls in the App, the light pattern surrounding the user can be adapted accordingly.

While other techniques, such as motion detectors (typically Passive Infra-Red, or PIR), can be incorporated into either the light fixture, or in locations that operate a group of light fixtures, these have issues when the users in the location are predominantly sedentary, such as at a computer, or on the phone. Most office workers have experienced the issue of the lights going off when sitting in their work cubicle, where the remedy is to stand up and make sufficient movement for the PIR controller to be triggered again.

Since in many industrial and commercial buildings, access security typically has other measures, the authorization level of the users mobile/app or fob/app can be used to operate (or deny) the user, illumination in specific areas of the location. For instance, a guest user may be assigned a fob/app with a restricted level of access.

Other capabilities are also possible. For instance, if the user has an emergency situation, their location can be detected and/or triangulated using a variety of methods. Once the location is known a lighted path (either illuminated, or illuminated in a different way, such as flashing or a different color) can be used to direct emergency personnel to the location of the situation, using the optimal route. This is especially valuable in large campus environments, where personal may not be in their normal building location.

Such a capability requires either a panic button feature, reverse E911, or other mechanism to detect the emergency condition, and requires the light fixtures to be controllable from a supervisory system, capable of communicating and or operating the light fixtures in an override mode, all of which are readily achievable.

Targeted Advertising

Businesses would like to know when a potential customer is nearby in order to be able to provide offers to these potential customers and possibly generate more business. Existing cellular telephone, smart phone, smart pad and other portable communications devices do permit location of the device by use of GPS signals received by the device and location information being transmitted from the device to remote systems. However, when potential customers are indoors, such as but not limited to inside a shopping mall or other enclosed space, GPS signals are typically not strong enough to reach the customer's device and thus it is difficult if not impossible to use conventional techniques to locate and identify potential customers. Without the ability to locate and identify customers near the business, the business will not be able to provide targeted advertising or offers that might encourage the potential customer to enter the business.

It is known to use Wi-Fi devices indoors or in locations where good GPS signals are not available. Having a number of Wi-Fi transceivers located about a space can permit triangulation of a device's location. Alternatively, signal strength for a particular device and transceiver could be used to identify devices and potential customers within a radius of a business. However, there are many variables and environmental conditions that may affect the signal strength sent by and received by a portable device. Variation in signal strength could lead to incorrect calculation of distance from the business wishing to provide the potential customer with an offer.

Improvements to conventional approaches to identifying portable communications devices near a business and then providing targeted offers to coupons to the user of that device are desirable.

As stated above, businesses would like to know when a potential customer is nearby to provide offers to attract that potential customer into their shop.

The system and method of the present disclosure may include an LED light bulb or LED light source and electronics that will broadcast a short range light or radio signal that may be picked up by nearby mobile communications devices. Location or identification information may be transmitted to the mobile device via the signal. The mobile communications device may be running an appropriate software application that will be able to connect to the system of the present disclosure and receive location data from the system. The mobile communications device running the App may be able to use the location information received from the system of the present disclosure to determine an indoor location of the mobile communications device that might not be otherwise possible if the device relied solely on GPS or other longer range location systems.

The system and method of the present disclosure may allow a business to install a LED light bulb or LED light source and configure it via a software application to provide this location information to a nearby mobile communications device along with RF RSSI. From this location information, the mobile software App may calculate an approximate user location. The calculated location can then be used to push advertisements and coupons to the user's mobile device, based on local businesses. The offers presented to the potential customer can be further refined by additional profile information that has been collected about or provided by the potential customer, providing the customer has "opted-in" to such a service.

With an LED light bulb or LED light source that sends location data to a nearby mobile device the system and method of the present disclosure may be simple to configure to provide location information to a nearby mobile device.

The LED light bulb or source may also be able to receive data directly from the mobile device as well. The portion of the system installed by a business may include an LED or other light source with supporting electronics that can be programmed with location information for that specific business. The installed light source and electronics may then be able to share that location data to nearby mobile devices. The software App on the nearby mobile devices may then exchange data with a remote database to determine the physical location of the mobile device. From that information, the system can compare the location information against a database of participating businesses to determine if the mobile device is within a specified distance of one of the participating businesses. If the device is within the specified distance, an offer or other information regarding the business may be sent to the mobile device, either through the software of the system or as a general SMS text, e-mail, instant message or other type of standard communications path.

The system may further apply different filters or rules to determine if the mobile device detected belongs to a user with a profile that might change the nature of the offer, coupon or content of the message sent to the mobile device when the mobile device is within the specified distance. Some businesses may choose to not send out general offers but may be more discriminating and only send offers to a subset of local devices. Some may choose to send richer content to the mobile device so that audio and/or video may be played/displayed. The database receiving the location information from the mobile device may be linked to a database containing the user profile associated with the mobile device and also a desired user profile sought by the business. Comparison of these two profiles may then be used to determine if the local mobile device should be sent an offer or other message from the nearby business.

Figure 21B:
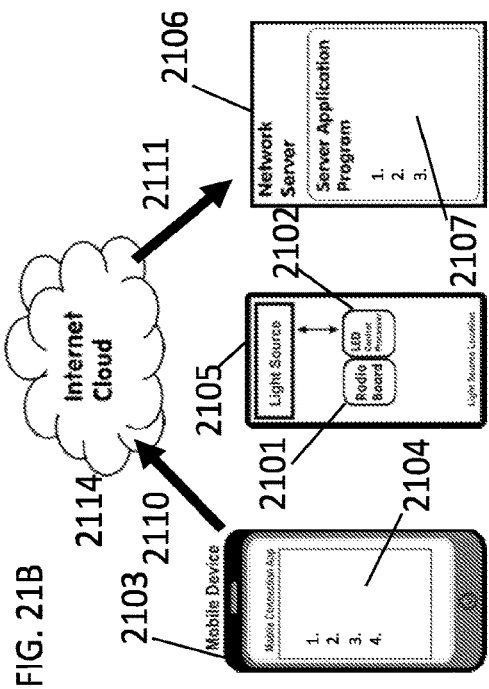
FIG. 21A through FIG. 21D are an example of a targeted advertising application for the technology.
Figure 21A:
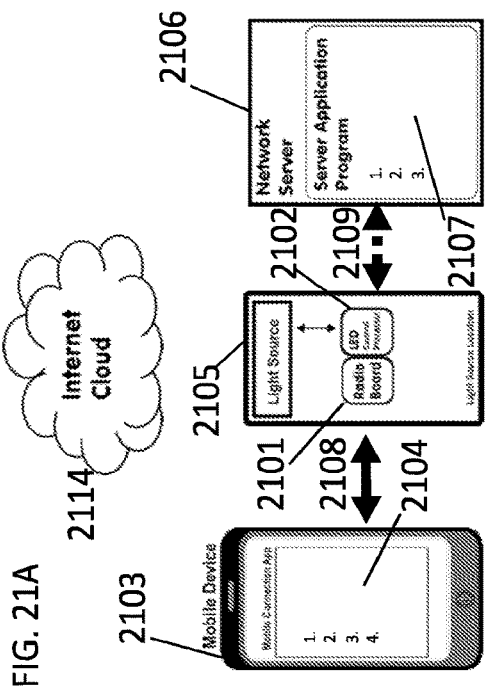

FIG. 21A through 21D shows an exemplary embodiment of the system and method of the present disclosure. It is not intended to limit the present disclosure to the disclosed embodiment. A person with skill in the technical areas relating to the present disclosure may extend the concepts of the present disclosure. Referring to FIG. 21A, the following components are defined: Radio Board (2101); LED Control Processor Board (2102); Mobile Communications Device (2103); Mobile Device Application (2104); LED Light Source (2105); Location Advertisement Server (2106); and Location Advertisement Server Application (2107).

The relationship between the various components may be but is not limited to the following: Radio Board (2101) may be enclosed in the LED light source (2105); LED Control Processor board (2102) may be enclosed in the LED light source (2105); the LED light source (2105) may contain a power supply for both the LED lights and the radio board; the mobile communications device (2103) may contain a radio receiver that is able to receive signals from the LED light source (2105) and/or radio board (2101); the mobile device application (2104) may enable the mobile device (2103) to read an LED light source (2105) or radio board (2102) advertisement protocol and send that data to the location advertisement server (2106); the LED light source (2105) may contain the LED control processor board (2102) and radio board (2101); the location advertisement server (2106) may be a network based computer server to process LED light source (2105) data sent from the mobile device application (2104) and to then send data back to the mobile device application (2104); and a location advertisement server application (2107) may be software that runs on the location advertisement server (2106) that determines what data should be sent to what mobile device (2103).

One possible method of using the system of the present disclosure (a possible use of a similarly functioning though differently configured system) may be as follows: a business may register their LED light source (2105) with a location advertisement server (2106). The business may provide data that should be sent to the mobile device (2103) when the mobile device is within RF signal range or a specified distance of the LED light source (2105). The registration process for the LED light source (2105) could also include the step of programming it either through wireless communications channel (2018) via a mobile device (2103) that has a specialty equipped mobile application (2104), or through a private wired or wireless network (2109) which may interconnect the LED light source (2105) with other similar devices an internal private data network, and/or the Internet.

The LED light source (2105) may contain a radio board (2101) and an LED control processor (2102). When power is applied to the LED light source (2105), the LED control processor (2102) may configure the radio board (2101) to send advertisement packets. The private wired or wireless network (2109) may or may not be present, but if present may be providing an alternate path to location advertisement server (2106) to access additional data.

The mobile device (2103) may run a mobile device application (2104) that scans for LED light source (2105) advertisement packets, via a wireless communications (2108) such as (but not limited to Bluetooth Low Energy (BLE)).

Referring to FIG. 21B, mobile device (2103) uses data contained in the advertisement packets from LED light source (2105), and may use this to establish a communication path (2110, 2111) through the Cloud (2114) to a location advertisement server (2106). When a mobile device (2103) receives an advertisement packet from the LED light source (2105), it may send that data to the location advertisement server (2106), identifying among other things, its location.

Figure 21D:
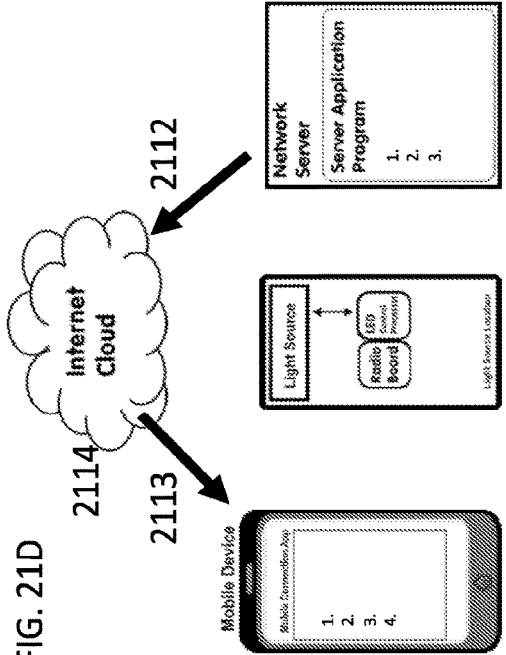
Figure 21C:
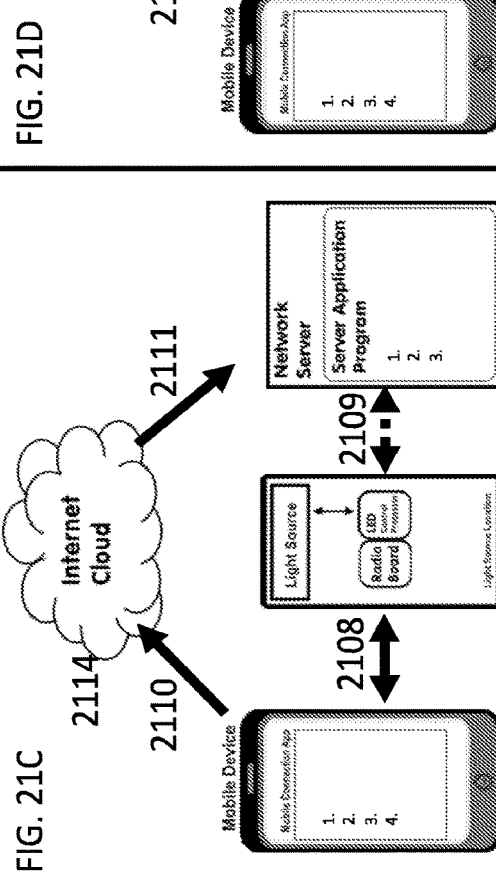

Referring to FIG. 21C, additional data may be exchanged between mobile device (2103) and LED light source (2105), via the wireless communications link (2108), and additional data may also be optionally exchanged between the LED light source (2105) and the location advertisement server (2106) via additional communications path (2109) connected directly or indirectly to local or remote location advertisement server (2106).

Referring to FIG. 21D, the location advertisement server (2106) may then filter the data and send the business data, content, coupon, or any other type of data, back to the mobile device through the return communications path (2112, 2113) through the Cloud (2114), to the mobile device (2103). If the mobile device is within a specified distance from the LED bulb then the location advertisement server will send data to the mobile device.

A system according to the present disclosure may be assembled as follows: the radio board (2101 and the LED Control Processor board (2102) may be installed into the LED light source (2105); the mobile device application (2104) may be installed in the mobile device (2103); the location advertisement server application (2107) may be installed on the location advertisement server (2106); and the location advertisement server (2106) and location advertisement server application (2107) may be part of the system of the present disclosure but are not mandatory.

A special (management) mobile device application (2104) can be used to configure the data that will be advertised by the LED light source (2105) that will be later read by another (consumer) mobile device (2103).

The system and method of the present application may be used as follows: a person will carry a mobile device (2103) running the mobile device application (2104) while indoors. When the mobile device running the mobile device application detects a signal from the LED light source (2105), it may receive data from the LED light source (2105), as described in FIG. 21A. The mobile device (2103) would then send the data to a server (2106), as described in FIGS. 21B and 21C, and receive data back from the server (2106), as described by FIG. 21D. The mobile device may then display the received data for the user of the mobile device (2103) to view.

In an alternate embodiment, the mobile device (2103) could be the initiator of the proximity detection signal. When so configured, either in normal operation, or when a certain mobile application (2104) is running, it would periodically send out advertisement packets, to look for devices such as the LED light source (2105), or other such devices, which have been programmed to respond to such advertisement requests. Once the initial exchange of data was commenced by the mobile device (2103) and responded to by the LED light source (2105), the transaction would proceed in a similar fashion as described.

Additionally, the system and method of the present application could be adapted for use to locate a lost mobile device (2103) by using the LED light source (2105) data to provide location data to a central location server (a remote server running a different server application).

While the invention has been described with reference to preferred embodiments, it is to be understood that the invention is not intended to be limited to the specific embodiments set forth above. Thus, it is recognized that those skilled in the art will appreciate that certain substitutions, alterations, modifications, and omissions may be made without departing from the spirit or intent of the invention.

Accordingly, the foregoing description is meant to be exemplary only, the invention is to be taken as including all reasonable equivalents to the subject matter of the invention, and should not limit the scope of the invention set forth in the accompanying claims.

What is claimed and desired to be secured by Letters Patent of the United States is:

1. A method for electronic advertisement, comprising:
positioning one or more first devices as substantially stationary and operating as wireless radio frequency communication devices;
operating a second device as a mobile wireless radio frequency communication device;
detecting the presence of the one or more first devices within a predetermined radio frequency proximity range of the second device;
exchanging data including location data, between the one or more first devices and the second device and detecting radio frequency (RF) received signal strength indication (RSSI) information;
computing by the second device an estimated physical location based on the location data and RSSI information; and
communicating the estimated physical location by the second device, causing the generation of an electronic targeted advertisement to the second device.

2. The method of claim 1, after exchanging the location data and detecting the RSSI information between the one or more first devices and the second device, further comprising communicating from the one or more first devices to a computer server to generate the electronic targeted advertisement to the second device.

3. The method of claim 1, after exchanging the location data and detecting the RSSI information between the one or more first devices and the second device, further comprising communicating from the second device to a computer server to generate the electronic targeted advertisement to the second device.

4. The method of claim 1, wherein the one or more first devices comprises an LED light source having wireless communications capabilities.

5. The method of claim 1, wherein the second device comprises a mobile device, the mobile device including a mobile phone, smart phone, tablet computer or laptop computer.

6. The method of claim 1, wherein the first one or more devices comprises a smart switch device having wireless communications capabilities.

7. The method of claim 1, wherein the first one or more devices comprises a smart input/output (I/O) device having wireless communications capabilities.

8. The method of claim 1, wherein said exchanged data includes data to authenticate the second device.

9. The method of claim 1, wherein said exchanged data is used to determine the user programmed preferences of the second device.

10. The method of claim 9, wherein data from the targeted electronic advertisement is rejected by the second device based on a set of preprogrammed filters or rules.

11. The method of claim 9, wherein data from the targeted electronic advertisement is accepted and displayed by the second device based on a set of preprogrammed filters or rules.

12. The method of claim 9, wherein data from the targeted electronic advertisement is accepted and stored by the second device based on a set of preprogrammed filters or rules.

13. The method of claim 1, wherein said exchanged data is used to determine the user history of the second device.

14. The method of claim 1, wherein the one or more first devices initiates the transmission of location data.

15. The method of claim 1, wherein the second device initiates the transmission of location data.

16. The method of claim 1, wherein the one or more first devices have their initial location data programmed via wireless communications.

17. The method of claim 1, wherein the one or more first devices have their initial location data programmed via wired communications.

18. A method for operating wireless devices, comprising:
operating one or more first wireless devices in a first autonomous state;
operating the one or more first wireless devices in a second state when a second wireless device is within a predetermined proximity of the one or more first wireless devices; and
reverting back by the one or more first wireless devices to the first autonomous state after a programmable elapsed time triggered when the second wireless device moves outside the predetermined proximity of the one or more first wireless devices, wherein the one or more first wireless devices comprises one or more smart wireless devices.

19. The method of claim 18, further comprising associating the second operating state with an identity of the second device.

20. A smart wireless device, comprising a circuit operated at a first autonomous operating state and a second operating state, the second operating state being initiated by a mobile device when the mobile device is within a predetermined proximity of the smart wireless device; wherein the circuit changes back to the first autonomous operating state after a programmable elapsed time triggered when the mobile device moves outside the predetermined proximity of the smart wireless device.

21. The smart wireless device of claim 20, wherein the second operating state is associated with an identity of the mobile device.

* * * * *